United States Patent
Parsons et al.

(10) Patent No.: US 10,828,538 B2
(45) Date of Patent: Nov. 10, 2020

(54) GOLF CLUB HEADS AND METHODS TO MANUFACTURE GOLF CLUB HEADS

(71) Applicant: Parsons Xtreme Golf, LLC, Scottsdale, AZ (US)

(72) Inventors: Robert R. Parsons, Scottsdale, AZ (US); Michael R. Nicolette, Scottsdale, AZ (US); Bradley D. Schweigert, Anthem, AZ (US)

(73) Assignee: PARSONS XTREME GOLF, LLC, Scottsdale, AZ (US)

( * ) Notice: Subject to any disclaimer, the term of this patent is extended or adjusted under 35 U.S.C. 154(b) by 0 days.

(21) Appl. No.: 16/248,361

(22) Filed: Jan. 15, 2019

(65) Prior Publication Data
US 2019/0336832 A1 Nov. 7, 2019

Related U.S. Application Data

(60) Provisional application No. 62/667,339, filed on May 4, 2018, provisional application No. 62/679,233, filed
(Continued)

(51) Int. Cl.
*A63B 53/04* (2015.01)
*B29C 45/14* (2006.01)
(Continued)

(52) U.S. Cl.
CPC .............. *A63B 53/04* (2013.01); *B29C 45/14* (2013.01); *A63B 53/047* (2013.01);
(Continued)

(58) Field of Classification Search
CPC .............. A63B 2053/005; A63B 53/04; A63B 2053/0412; A63B 53/06; A63B 53/08;
(Continued)

(56) References Cited

U.S. PATENT DOCUMENTS

| 1,133,129 A | 3/1915 | Govan |
|---|---|---|
| 1,534,600 A | 4/1925 | Mattern |

(Continued)

FOREIGN PATENT DOCUMENTS

| DE | 29715997 | 2/1998 |
|---|---|---|
| GB | 2249031 | 4/1992 |

(Continued)

OTHER PUBLICATIONS

American Heritage Dictionary Fifth Edition 2016 Definition of "sone" (1 page).*

(Continued)

*Primary Examiner* — Stephen L Blau

(57) ABSTRACT

Embodiments of golf club heads and methods to manufacture golf club heads are generally described herein. In one example, a golf club head may have a body portion having a toe portion, a heel portion, a top portion, a sole portion, a front portion, a lead edge portion, a back portion, and an interior cavity. The golf club head may also have a polymer material partially or entirely filling the interior cavity. Other examples and embodiments may be described and claimed.

15 Claims, 30 Drawing Sheets

Related U.S. Application Data on Jun. 1, 2018, provisional application No. 62/781,505, filed on Dec. 18, 2018.

(51) Int. Cl.
| | | |
|---|---|---|
| A63B 53/00 | (2015.01) | |
| B29L 31/52 | (2006.01) | |
| A63B 53/08 | (2015.01) | |
| A63B 53/06 | (2015.01) | |
| B29K 63/00 | (2006.01) | |

(52) U.S. Cl.
CPC ....... *A63B 53/0466* (2013.01); *A63B 53/0487* (2013.01); *A63B 53/06* (2013.01); *A63B 53/08* (2013.01); *A63B 2053/005* (2013.01); *A63B 2053/0412* (2013.01); *A63B 2053/0479* (2013.01); *A63B 2053/0491* (2013.01); *B29K 2063/00* (2013.01); *B29L 2031/5227* (2013.01)

(58) Field of Classification Search
CPC .... A63B 2053/0491; A63B 2053/0479; A63B 1/00; B29C 45/14; B29K 2063/00; B29K 2995/0001; B29L 2031/5227; B29L 53/0487; B29L 53/047; B29L 53/0466; B29L 2053/005
See application file for complete search history.

(56) References Cited

U.S. PATENT DOCUMENTS

| | | |
|---|---|---|
| 1,538,312 A | 5/1925 | Neish |
| D138,438 S | 8/1944 | Link |
| 3,020,048 A | 2/1962 | Carroll |
| 3,266,805 A | 8/1966 | Bulla |
| D215,101 S | 9/1969 | Sabat |
| D229,431 S | 11/1973 | Baker |
| D234,609 S | 3/1975 | Raymont |
| D239,550 S | 4/1976 | Timbrook |
| D240,748 S | 7/1976 | Bock |
| 4,085,934 A | 4/1978 | Churchward |
| D253,778 S | 12/1979 | Madison |
| 4,502,687 A | 3/1985 | Kochevar |
| 4,523,759 A | 6/1985 | Igarashi |
| 4,545,580 A | 10/1985 | Tomita |
| D294,617 S | 3/1988 | Perkins |
| 4,754,977 A | 7/1988 | Sahm |
| 4,803,023 A | 2/1989 | Enomoto |
| 4,824,116 A | 4/1989 | Nagamoto |
| 4,928,972 A | 5/1990 | Nakanishi |
| 4,988,104 A | 1/1991 | Shiotani |
| 5,028,049 A | 7/1991 | McKeighen |
| 5,090,702 A | 2/1992 | Viste |
| 5,158,296 A | 10/1992 | Lee |
| 5,176,384 A | 1/1993 | Sata |
| 5,184,823 A | 2/1993 | Desboilles |
| 5,213,328 A | 5/1993 | Long |
| D336,672 S | 6/1993 | Gorman |
| 5,244,211 A | 9/1993 | Lukasiewicz |
| 5,316,297 A * | 5/1994 | Chappell ................ A63B 53/02 473/291 |
| 5,348,302 A | 9/1994 | Sasamoto |
| D351,883 S | 10/1994 | Solheim et al. |
| 5,351,958 A | 10/1994 | Helmstetter |
| 5,419,559 A | 5/1995 | Melanson |
| 5,419,560 A | 5/1995 | Bamber |
| 5,421,577 A | 6/1995 | Kobayashi |
| 5,425,535 A | 6/1995 | Gee |
| D361,358 S | 8/1995 | Simmons |
| 5,447,311 A | 9/1995 | Viollaz |
| 5,451,056 A | 9/1995 | Manning |
| D362,885 S | 10/1995 | Blough et al. |
| 5,485,998 A | 1/1996 | Kobayashi |
| 5,518,243 A | 5/1996 | Redman |
| 5,540,437 A | 7/1996 | Bamber |
| D378,111 S | 2/1997 | Parente et al. |
| 5,637,045 A | 6/1997 | Igarashi |
| 5,647,808 A | 7/1997 | Hosokawa |
| 5,649,873 A | 7/1997 | Fuller |
| 5,669,830 A | 9/1997 | Bamber |
| 5,766,091 A | 6/1998 | Humphrey |
| 5,766,092 A | 6/1998 | Mimeur |
| 5,769,735 A | 6/1998 | Hosokawa |
| 5,772,527 A | 6/1998 | Liu |
| 5,788,584 A | 8/1998 | Parente |
| 5,797,807 A | 8/1998 | Moore |
| 5,827,132 A | 10/1998 | Bamber |
| 5,899,821 A | 5/1999 | Hsu |
| 5,935,016 A | 8/1999 | Antonious |
| 6,012,990 A | 1/2000 | Nishizawa |
| D421,080 S | 2/2000 | Chen |
| 6,064,568 A | 5/2000 | Schmitt |
| D426,276 S | 6/2000 | Besnard et al. |
| 6,077,171 A | 6/2000 | Yoneyama |
| D445,862 S | 7/2000 | Ford |
| 6,162,133 A | 12/2000 | Peterson |
| 6,165,081 A | 12/2000 | Chou |
| D442,659 S | 5/2001 | Kubica et al. |
| 6,231,458 B1 | 5/2001 | Cameron |
| 6,238,302 B1 | 5/2001 | Helmstetter |
| 6,290,609 B1 | 9/2001 | Takeda |
| 6,386,990 B1 | 5/2002 | Reyes |
| D469,833 S | 2/2003 | Roberts et al. |
| D475,107 S | 5/2003 | Madore |
| D478,140 S | 8/2003 | Burrows |
| 6,638,182 B2 | 10/2003 | Kosmatka |
| 6,695,714 B1 | 2/2004 | Bliss |
| 6,702,693 B2 | 3/2004 | Bamber |
| 6,780,123 B2 | 8/2004 | Hasebe |
| 6,811,496 B2 | 11/2004 | Wahl |
| 6,830,519 B2 | 12/2004 | Reed |
| 6,855,067 B2 | 2/2005 | Solheim |
| D502,975 S | 3/2005 | Schweigert et al. |
| D503,204 S | 3/2005 | Nicolette et al. |
| D508,545 S | 8/2005 | Roberts et al. |
| D508,969 S | 8/2005 | Hasebe |
| 6,923,733 B2 | 8/2005 | Chen |
| D514,183 S | 1/2006 | Schweigert et al. |
| 6,984,180 B2 * | 1/2006 | Hasebe ................. A63B 53/04 473/291 |
| D523,501 S | 6/2006 | Nicolette et al. |
| 7,121,956 B2 | 10/2006 | Lo |
| 7,128,663 B2 | 10/2006 | Bamber |
| 7,153,222 B2 | 12/2006 | Gilbert |
| D534,595 S | 1/2007 | Hasebe |
| 7,156,751 B2 | 1/2007 | Wahl |
| 7,169,057 B2 | 1/2007 | Wood |
| 7,182,698 B2 | 2/2007 | Tseng |
| 7,207,900 B2 | 4/2007 | Nicolette |
| D543,601 S | 5/2007 | Kawami |
| 7,281,991 B2 | 10/2007 | Gilbert |
| D555,219 S | 11/2007 | Lin |
| 7,303,486 B2 | 12/2007 | Imamoto |
| 7,351,164 B2 | 4/2008 | Schweigert |
| 7,396,299 B2 | 7/2008 | Nicolette |
| 7,553,241 B2 | 6/2009 | Park |
| 7,582,024 B2 | 9/2009 | Shear |
| 7,588,502 B2 | 9/2009 | Nishino |
| 7,594,862 B2 | 9/2009 | Gilbert |
| 7,611,424 B2 | 11/2009 | Nagai |
| 7,658,686 B2 | 2/2010 | Soracco |
| D618,293 S | 6/2010 | Foster et al. |
| 7,744,484 B1 | 6/2010 | Chao |
| 7,744,486 B2 | 6/2010 | Hou |
| 7,744,487 B2 | 6/2010 | Tavares |
| 7,749,100 B2 | 7/2010 | Tavares |
| 7,794,333 B2 | 9/2010 | Wallans |
| 7,798,917 B2 | 9/2010 | Nguyen |
| 7,803,068 B2 | 9/2010 | Clausen |
| 7,815,521 B2 | 10/2010 | Ban |
| 7,846,040 B2 | 12/2010 | Ban |
| 7,938,738 B2 | 5/2011 | Roach |
| 8,012,040 B2 | 9/2011 | Takechi |
| 8,062,150 B2 | 11/2011 | Gilbert |

(56) References Cited

U.S. PATENT DOCUMENTS

| | | | |
|---|---|---|---|
| 8,088,025 B2 * | 1/2012 | Wahl | B23P 17/04 473/346 |
| 8,092,319 B1 | 1/2012 | Cackett | |
| 8,105,180 B1 | 1/2012 | Cackett | |
| 8,221,262 B1 | 7/2012 | Cackett | |
| 8,246,487 B1 | 8/2012 | Cackett | |
| 8,257,196 B1 | 9/2012 | Abbott | |
| 8,262,506 B2 | 9/2012 | Watson | |
| 8,277,337 B2 | 10/2012 | Shimazaki | |
| 8,328,662 B2 | 12/2012 | Nakamura | |
| 8,376,878 B2 | 2/2013 | Bennett | |
| 8,393,976 B2 | 3/2013 | Soracco | |
| D681,142 S | 4/2013 | Fossum et al. | |
| 8,414,422 B2 | 4/2013 | Peralta | |
| 8,449,406 B1 | 5/2013 | Frame | |
| 8,475,293 B2 | 7/2013 | Morin | |
| 8,506,420 B2 | 8/2013 | Hocknell | |
| 8,535,176 B2 | 9/2013 | Bazzel | |
| 8,545,343 B2 | 10/2013 | Boyd | |
| 8,574,094 B2 | 11/2013 | Nicolette | |
| 8,657,700 B2 | 2/2014 | Nicolette | |
| 8,663,026 B2 | 3/2014 | Blowers | |
| 8,690,710 B2 | 4/2014 | Nicolette | |
| 8,753,230 B2 | 6/2014 | Stokke | |
| 8,790,196 B2 | 7/2014 | Solheim | |
| 8,827,832 B2 | 9/2014 | Breier | |
| 8,827,833 B2 | 9/2014 | Amano | |
| 8,834,292 B2 * | 9/2014 | Tsuji | A63B 53/047 473/332 |
| 8,845,455 B2 | 9/2014 | Ban | |
| 8,858,362 B1 | 10/2014 | Leposky | |
| D722,351 S | 2/2015 | Parsons et al. | |
| D722,352 S | 2/2015 | Nicolette et al. | |
| D723,120 S | 2/2015 | Nicolette et al. | |
| 8,961,336 B1 | 2/2015 | Parsons | |
| D724,164 S | 3/2015 | Schweigert et al. | |
| D725,208 S | 3/2015 | Schweigert | |
| D726,265 S | 4/2015 | Nicolette | |
| D726,846 S | 4/2015 | Schweigert | |
| 9,005,056 B2 | 4/2015 | Pegnatori | |
| D729,892 S | 5/2015 | Nicolette et al. | |
| D733,234 S | 6/2015 | Nicolette | |
| 9,044,653 B2 | 6/2015 | Wahl | |
| D738,449 S | 9/2015 | Schweigert | |
| D739,487 S | 9/2015 | Schweigert | |
| 9,192,830 B2 | 11/2015 | Parsons | |
| 9,192,832 B2 | 11/2015 | Parsons | |
| 9,199,143 B1 | 12/2015 | Parsons | |
| D746,927 S | 1/2016 | Parsons et al. | |
| D748,214 S | 1/2016 | Nicolette et al. | |
| D748,215 S | 1/2016 | Parsons et al. | |
| D748,749 S | 2/2016 | Nicolette et al. | |
| D753,251 S | 4/2016 | Schweigert et al. | |
| D753,252 S | 4/2016 | Schweigert | |
| D755,319 S | 5/2016 | Nicolette et al. | |
| D756,471 S | 5/2016 | Nicolette et al. | |
| 9,345,938 B2 | 5/2016 | Parsons | |
| 9,346,203 B2 | 5/2016 | Parsons | |
| 9,352,197 B2 | 5/2016 | Parsons | |
| D759,178 S | 6/2016 | Nicolette | |
| D760,334 S | 6/2016 | Schweigert et al. | |
| 9,364,727 B2 | 6/2016 | Parsons | |
| 9,399,158 B2 | 7/2016 | Parsons | |
| 9,421,437 B2 | 8/2016 | Parsons | |
| 9,427,634 B2 | 8/2016 | Parsons | |
| 9,440,124 B2 | 9/2016 | Parsons | |
| 9,468,821 B2 | 10/2016 | Parsons | |
| 9,517,393 B2 | 12/2016 | Cardani | |
| 9,533,201 B2 | 1/2017 | Parsons | |
| 9,550,096 B2 | 1/2017 | Parsons | |
| 9,610,481 B2 | 4/2017 | Parsons | |
| 9,630,070 B2 | 4/2017 | Parsons | |
| 9,636,554 B2 | 5/2017 | Parsons | |
| 9,649,540 B2 | 5/2017 | Parsons | |
| 9,649,542 B2 | 5/2017 | Nicolette | |
| 9,662,547 B2 | 5/2017 | Parsons | |
| 9,675,853 B2 | 6/2017 | Parsons | |
| 9,750,993 B2 | 9/2017 | Ritchie | |
| 9,764,194 B2 | 9/2017 | Parsons | |
| 9,782,643 B2 | 10/2017 | Parsons | |
| 9,795,842 B1 | 10/2017 | Parsons | |
| 9,795,843 B2 | 10/2017 | Parsons | |
| 9,814,952 B2 | 11/2017 | Parsons | |
| 10,195,511 B2 * | 2/2019 | Dolige | G09B 19/0038 |
| 2001/0055996 A1 | 12/2001 | Iwata | |
| 2002/0004427 A1 | 1/2002 | Cheng | |
| 2002/0037775 A1 | 3/2002 | Keelan | |
| 2002/0094884 A1 | 7/2002 | Hocknell | |
| 2002/0107087 A1 | 8/2002 | Fagot | |
| 2003/0139226 A1 | 7/2003 | Cheng | |
| 2003/0176231 A1 | 9/2003 | Hasebe | |
| 2003/0194548 A1 | 10/2003 | McLeod | |
| 2004/0082401 A1 | 4/2004 | Takeda | |
| 2004/0092331 A1 | 5/2004 | Best | |
| 2004/0204263 A1 | 10/2004 | Fagot | |
| 2004/0266550 A1 | 12/2004 | Gilbert | |
| 2005/0009632 A1 | 1/2005 | Schweigert | |
| 2005/0014573 A1 | 1/2005 | Lee | |
| 2005/0043117 A1 | 2/2005 | Gilbert | |
| 2005/0119066 A1 | 6/2005 | Stites | |
| 2005/0239569 A1 | 10/2005 | Best | |
| 2005/0255936 A1 | 11/2005 | Huang | |
| 2005/0277485 A1 | 12/2005 | Hou | |
| 2006/0111200 A1 | 5/2006 | Poynor | |
| 2006/0229141 A1 | 10/2006 | Galloway | |
| 2006/0240909 A1 | 10/2006 | Breier | |
| 2007/0032308 A1 | 2/2007 | Fagot | |
| 2007/0225084 A1 | 9/2007 | Schweigert | |
| 2008/0058113 A1 | 3/2008 | Nicolette | |
| 2008/0188322 A1 | 8/2008 | Anderson | |
| 2008/0300065 A1 | 12/2008 | Schweigert | |
| 2008/0318705 A1 | 12/2008 | Clausen | |
| 2008/0318706 A1 | 12/2008 | Larson | |
| 2009/0011858 A1 | 1/2009 | Binette | |
| 2009/0029790 A1 | 1/2009 | Nicolette | |
| 2010/0130306 A1 | 5/2010 | Schweigert | |
| 2010/0178999 A1 | 7/2010 | Nicolette | |
| 2011/0111883 A1 | 5/2011 | Cackett | |
| 2011/0165963 A1 | 7/2011 | Cackett | |
| 2011/0269567 A1 | 11/2011 | Ban | |
| 2011/0294596 A1 | 12/2011 | Ban | |
| 2013/0137532 A1 | 5/2013 | Deshmukh | |
| 2013/0225319 A1 | 8/2013 | Kato | |
| 2013/0225320 A1 * | 8/2013 | Woolley | A63B 60/00 473/342 |
| 2013/0281226 A1 | 10/2013 | Ban | |
| 2013/0288823 A1 | 10/2013 | Hebreo | |
| 2013/0303303 A1 | 11/2013 | Ban | |
| 2013/0310192 A1 | 11/2013 | Wahl | |
| 2013/0316842 A1 | 11/2013 | Demkowski | |
| 2014/0045605 A1 | 2/2014 | Fujiwara | |
| 2014/0080621 A1 | 3/2014 | Nicolette | |
| 2014/0128175 A1 | 5/2014 | Jertson | |
| 2014/0274441 A1 | 9/2014 | Greer | |
| 2014/0274442 A1 | 9/2014 | Honea | |
| 2014/0274451 A1 | 9/2014 | Knight | |
| 2015/0231454 A1 | 8/2015 | Parsons | |
| 2015/0231806 A1 | 8/2015 | Parsons | |
| 2016/0045794 A1 * | 2/2016 | Taylor | A63B 60/52 473/349 |
| 2016/0296804 A1 | 10/2016 | Parsons | |
| 2016/0317883 A1 | 11/2016 | Parsons | |
| 2017/0340928 A1 | 11/2017 | Parsons | |
| 2018/0050243 A1 | 2/2018 | Parsons | |
| 2018/0140910 A1 | 5/2018 | Parsons | |
| 2018/0318673 A1 | 11/2018 | Parsons | |

FOREIGN PATENT DOCUMENTS

| | | |
|---|---|---|
| JP | 02084972 | 3/1990 |
| JP | 08257181 | 10/1996 |
| JP | 10127832 | 5/1998 |
| JP | H10127832 | 5/1998 |
| JP | 10277187 | 10/1998 |

(56) References Cited

FOREIGN PATENT DOCUMENTS

| JP | H10277187 | 10/1998 |
|---|---|---|
| JP | 2001346924 | 12/2001 |
| JP | 2002143356 | 5/2002 |
| JP | 2004313777 | 11/2004 |
| JP | 2005218510 | 8/2005 |
| JP | 2013043091 | 3/2013 |
| WO | 9215374 | 9/1992 |

OTHER PUBLICATIONS

Collins English Dictionary 12th Edition 2014 (1 page).*
Random House Kernerman Webster's College Dictionary 2010 (1 page).*
Taylor Made Golf Company, Inc., https://taylormadegolf.com/on/demandware.static/-/sites-tmag-library/default/v1459859109590/docs/productspecs/tm_S2013_catalog18.pdf., Published Jan. 2013.
Rocketbladez Press Release, "Golfballed", http://golfballed.com/index.php?option=com_content&view=article&id=724:Taylormade- . . . Oct. 13, 2017, Published Jan. 3, 2013.
International Search Report and Written Opinion Received in Connection With the Corresponding Application No. PCT/US2015/016666, dated May 14, 2015 (8 Pages).
U.S. Appl. No. 29/512,313, Nicolette, "Golf Club Head," Filed Dec. 18, 2018.
Kozuchowski, Zak, "Callaway Mack Daddy 2 PM Grind Wedges" (http://golfwrz.com/276203/callaway-mack-daddy-2-pm-grind-wedges/), www.golfwrx.com, Golfwrx Holdings, LLC, Published Jan. 21, 2015.
Wall, Jonathan, "Details: Phil's Prototype Mack Daddy PM-Grind Wedge," (http:/www.pgatour.com/equipmentreport/2015/01/21/callaway-wedge.html), www.pgatour.com, PGA Tour, Inc., Published Jan. 21, 2015.
International Search Report and Written Opinion Received in Connection With Corresponding PCT Application Serial No. PCT/US16/42075 dated Sep. 22, 2016 (13 Pages).
International Search Report and Written Opinion Received in Connection With Corresponding PCT Application Serial No. PCT/US18/23617 dated May 31, 2018 (19 Pages).

* cited by examiner

GOLF CLUB HEADS AND METHODS TO MANUFACTURE GOLF CLUB HEADS

CROSS REFERENCE

This application claims the benefit of U.S. Provisional Application No. 62/667,339, filed May 4, 2018, U.S. Provisional Application No. 62/679,233, filed Jun. 1, 2018, and U.S. Provisional Application No. 62/781,505, filed Dec. 18, 2018. The disclosures of all of the referenced applications are incorporated herein by reference.

COPYRIGHT AUTHORIZATION

The present disclosure may be subject to copyright protection. The copyright owner has no objection to the facsimile reproduction by anyone of the present disclosure and its related documents, as they appear in the Patent and Trademark Office patent files or records, but otherwise reserves all applicable copyrights.

FIELD

The present disclosure generally relates to golf equipment, and more particularly, to golf club heads and methods to manufacture golf club heads.

BACKGROUND

Various materials (e.g., steel-based materials, titanium-based materials, tungsten-based materials, etc.) may be used to manufacture golf club heads. By using multiple materials to manufacture golf club heads, the position of the center of gravity (CG) and/or the moment of inertia (MOI) of the golf club heads may be optimized to impart certain trajectories and spin rates to golf balls by club heads.

Figure 1:
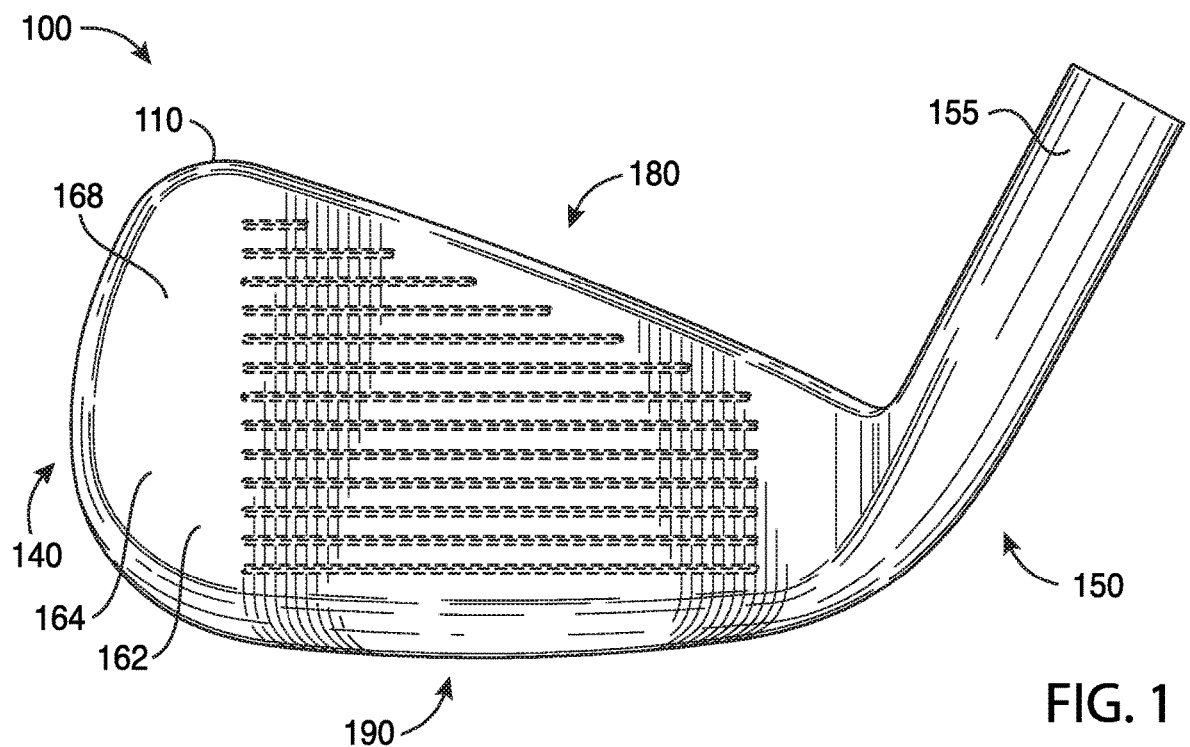
FIG. 1 depicts a front view of a golf club head according to an embodiment of the apparatus, methods, and articles of manufacture described herein.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures may not be depicted to scale. For example, the dimensions of some of the elements in the figures may be exaggerated relative to other elements to help improve understanding of embodiments of the present disclosure.

DESCRIPTION

In general, golf club heads and methods to manufacture golf club heads are described herein. The apparatus, methods, and articles of manufacture described herein are not limited in this regard.

In the example of FIGS. 1-14, a golf club head 100 may include a body portion 110 (FIG. 14) having a toe portion 140, a heel portion 150, a front portion 160 with a face portion 162 (e.g., a strike face) having a front surface 164 and a back surface 166, a back portion 170, a top portion 180, and a sole portion 190. The toe portion 140, the heel portion 150, the front portion 160, the back portion 170, the top portion 180, and/or the sole portion 190 may partially overlap each other. For example, a portion of the toe portion 140 may overlap portion(s) of the front portion 160, the back portion 170, the top portion 180, and/or the sole portion 190. In a similar manner, a portion of the heel portion 150 may overlap portion(s) of the front portion 160, the back portion 170, the top portion 180, and/or the sole portion 190. In another example, a portion of the back portion 170 may overlap portion(s) of the toe portion 140, the heel portion 150, the top portion 180, and/or the sole portion 190. The apparatus, methods, and articles of manufacture described herein are not limited in this regard.

The golf club head 100 may be an iron-type golf club head (e.g., a 1-iron, a 2-iron, a 3-iron, a 4-iron, a 5-iron, a 6-iron, a 7-iron, an 8-iron, a 9-iron, etc.) or a wedge-type golf club head (e.g., a pitching wedge, a lob wedge, a sand wedge, an n-degree wedge such as 44 degrees (°), 48°, 52°, 56°, 60°, etc.). Although FIGS. 1-10 may depict a particular type of club head, the apparatus, methods, and articles of manufacture described herein may be applicable to other types of club heads (e.g., a driver-type club head, a fairway wood-type club head, a hybrid-type club head, a putter-type club head, etc.). The golf club head 100 may have a club head volume less than or equal to 300 cubic centimeters (cm³ or cc). In one example, the golf club head 100 may have a club head volume greater than or equal to 20 cc and less than or equal to 90 cc. In another example, the golf club head 100 may have a club head volume greater than or equal to 100 cc and less than or equal to 200 cc. Alternatively, the golf club head 100 may have a club head volume greater than 300 cc. In one example, the golf club head 100 may have a club head volume of about 460 cc. In another example, the golf club head 100 may have a club head volume greater than 500 cc. The club head volume of the golf club head 1900 may be determined by using the weighted water displacement method (i.e., Archimedes Principle). For example, procedures defined by golf standard organizations and/or governing bodies such as the United States Golf Association (USGA) and/or the Royal and Ancient Golf Club of St. Andrews (R&A) may be used for measuring the club head volume of the golf club head 100. The apparatus, methods, and articles of manufacture described herein are not limited in this regard.

The toe portion 140 may include a portion of the body portion 110 opposite of the heel portion 150. The heel portion 150 may include a hosel portion 155 configured to receive a shaft (not shown) with a grip (not shown) on one end and the golf club head 100 on the opposite end of the shaft to form a golf club. The front surface 164 of the face portion 162 may include one or more score lines, slots, or grooves 168 extending to and/or between the toe portion 140 and the heel portion 150. While the figures may depict a particular number of grooves, the apparatus, methods, and articles of manufacture described herein may include more or less grooves. The face portion 162 may be used to impact a golf ball (not shown). The face portion 162 may be an integral portion of the body portion 110. Alternatively, the face portion 162 may be a separate piece or an insert coupled to the body portion 110 via various manufacturing methods and/or processes (e.g., a bonding process such as adhesive, a welding process such as laser welding, a brazing process, a soldering process, a fusing process, a mechanical locking or connecting method, any combination thereof, or other suitable types of manufacturing methods and/or processes). The face portion 162 may be associated with a loft plane that defines the loft angle of the golf club head 100. The loft angle may vary based on the type of golf club (e.g., a long iron, a middle iron, a short iron, a wedge, etc.). In one example, the loft angle may be between five degrees and seventy-five degrees. In another example, the loft angle may be between twenty degrees and sixty degrees. The apparatus, methods, and articles of manufacture described herein are not limited in this regard.

Figure 6:
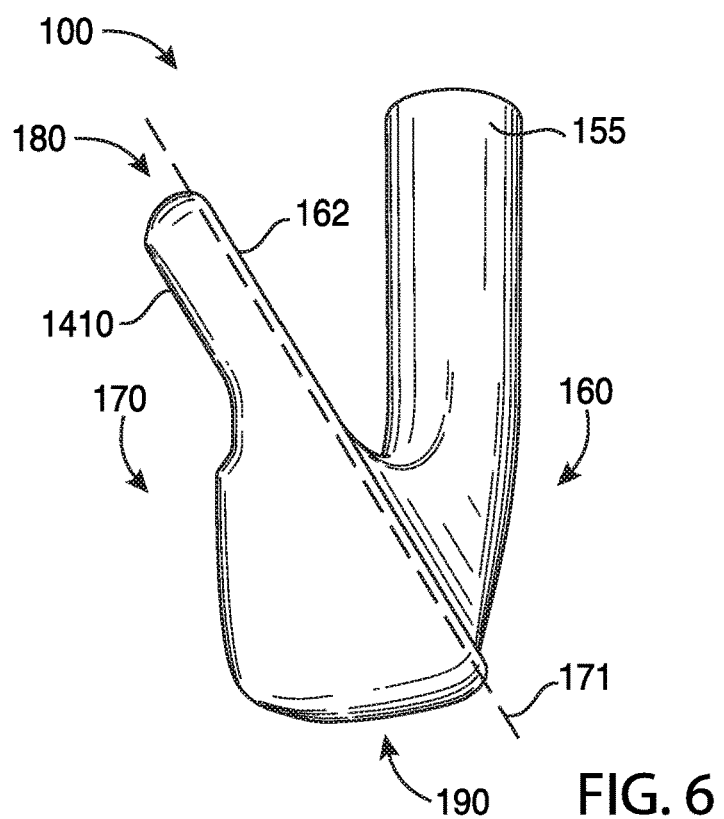
FIG. 6 depicts a toe side view of the example golf club head of FIG. 1.

The back portion 170 may include a portion of the body portion 110 opposite of the front portion 160. In one example, the back portion 170 may be a portion of the body portion 110 behind the back surface 166 of the face portion 162. As shown in FIG. 6, for example, the back portion 170 may be a portion of the body portion 110 behind a plane 171 defined by the back surface 166 of the face portion 162. In another example, the plane 171 may be parallel to the loft plane of the face portion 162. As mentioned above, for example, the face portion 162 may be a separate piece or an insert coupled to the body portion 110. Accordingly, the back portion 170 may include remaining portion(s) of the body portion 110 other than the face portion 162. The apparatus, methods, and articles of manufacture described herein are not limited in this regard.

Figure 14:
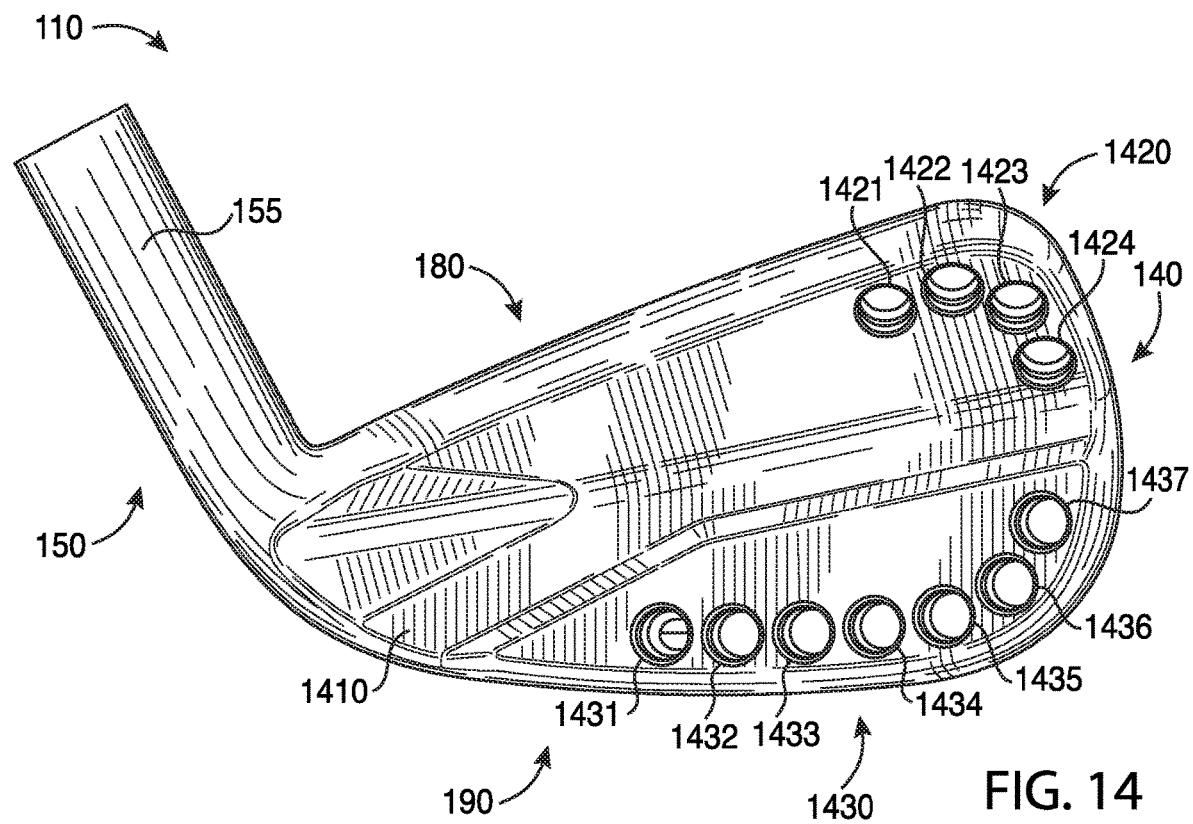
FIG. 14 depicts a rear view of a body portion of the example golf club head of FIG. 1.

Further, the body portion 110 may include one or more ports, which may be exterior ports and/or interior ports (e.g., located inside the body portion 110). The interior walls of the body portion 110 may include one or more ports. In one example, the back portion 170 may include one or more ports (e.g., inside an interior cavity, generally shown as 700 in FIG. 7). In another example, the body portion 110 may include one or more ports along a periphery of the body portion 110. As illustrated in FIG. 14, for example, the body portion 110 may include one or more ports on the back portion 170, generally shown as a first set of ports 1420 (e.g., shown as ports 1421, 1422, 1423, and 1424) and a second set of ports 1430 (e.g., shown as ports 1431, 1432, 1433, 1434, 1435, 1436, and 1437). In another example, one or more ports may be on a back wall portion 1410 of the back portion 170. One or more ports may be associated with a port diameter, which may be defined as the largest distance to and/or between opposing ends or boundaries of a port. For example, a port diameter for a rectangular port (e.g., a slot, slit, or elongated rectangular opening) may refer to a diagonal length of a rectangle. In another example, a port diameter of an elliptical port may refer to the major axis of an ellipse. As shown in FIG. 14, for example, each port may have a circular shape with a port diameter equivalent to a diameter of a circle. In one example, the port diameter of the first set of ports 1420 and/or the second set of ports 1430 may be about 0.25 inch (6.35 millimeters). In another example, the port diameter of the first set of ports 1420 and/or second set of ports 1430 may be greater than or equal to 0.1 inch (2.54 millimeters) and less than or equal to 0.4 inch (10.16 millimeters). Any two adjacent ports of the first set of ports 1420 may be separated by less than or equal to the port diameter. In a similar manner, any two adjacent ports of the second set of ports 1430 may be separated by less than or equal to the port diameter. Some adjacent ports may be separated by greater than the port diameter. In one example shown in FIG. 14, the first set of ports 1420 and the second set of ports 1430 may have uniform port diameters to simplify and speed manufacturing by not requiring tooling changes when proceeding through a manufacturing sequence that involves (i) forming a first set of ports 1420 and (ii) forming a second set of ports 1430. In another example, certain ports formed in the body portion 110 may have non-uniform port diameters to facilitate one of the various cavity filling processes described herein. More specifically, a port that extends from an exterior surface of the body portion 110 into the interior cavity 700 within the body may be enlarged to enhance the port's performance as a filling port by providing a larger cross-sectional area that supports a higher flow rate of filler material and thereby enables a shorter duration filling process. The apparatus, methods, and articles of manufacture described herein are not limited in this regard.

Figure 2:
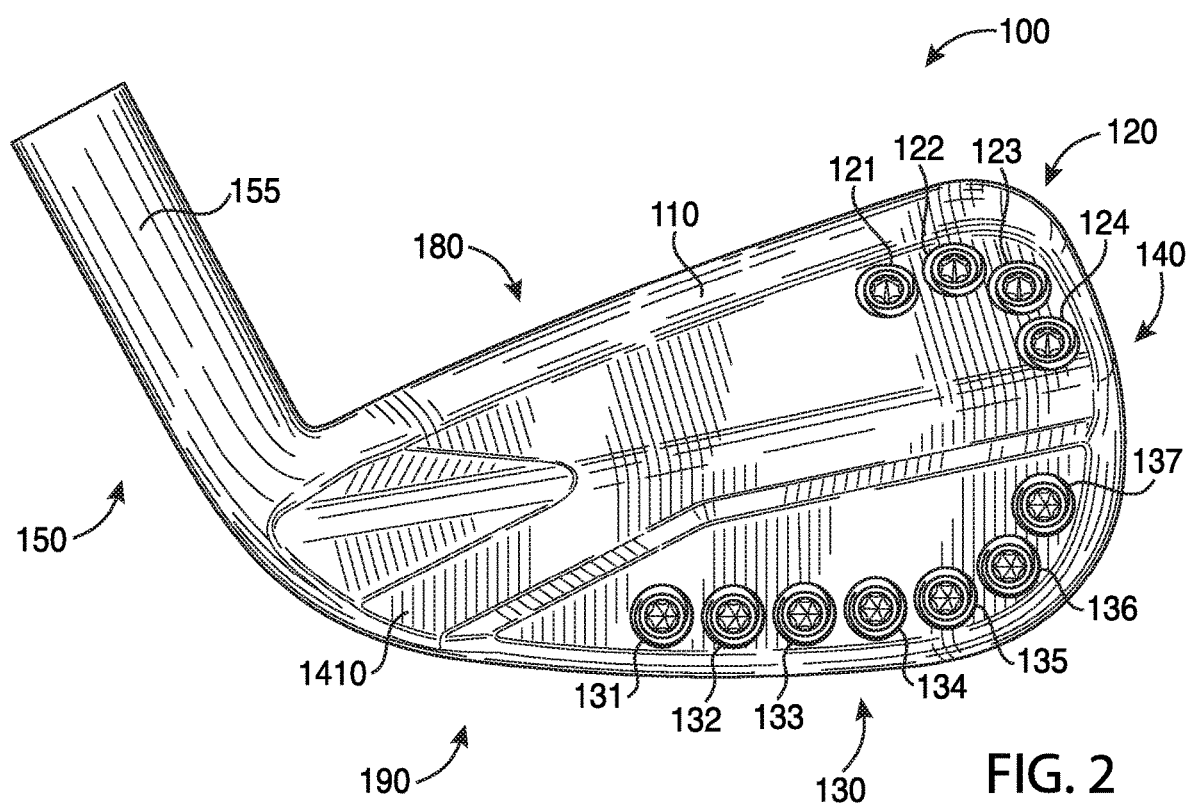
FIG. 2 depicts a rear view of the example golf club head of FIG. 1.
Figure 3:
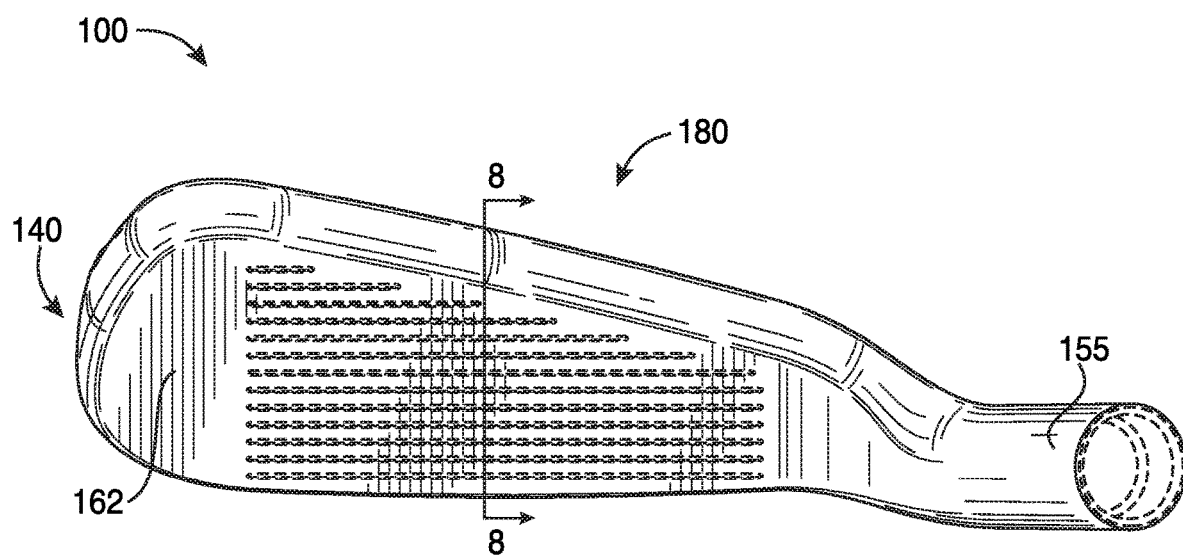
FIG. 3 depicts a top view of the example golf club head of FIG. 1.

The body portion 110 may include one or more mass portions (e.g., weight portion(s)), which may be integral mass portion(s) or separate mass portion(s) that may be coupled to the body portion 110. In the illustrated example as shown in FIG. 2, the body portion 110 may include a first set of mass portions 120 (e.g., shown as mass portions 121, 122, 123, and 124) and a second set of mass portions 130 (e.g., shown as mass portions 131, 132, 133, 134, 135, 136, and 137). While the above example, may describe a particular number or portions of mass portions, a set of mass portions may include a single mass portion or a plurality of mass portions. For example, the first set of mass portions 120 may be a single mass portion or a plurality of mass portions. In a similar manner, the second set of mass portions 130 may be a single mass portion or a plurality of mass portions. Further, the first set of mass portions or the second set of mass portions 130 may be a portion of the physical structure of the body portion 110. The apparatus, methods, and articles of manufacture described herein are not limited in this regard.

The body portion 110 may be made of a first material whereas the first set of mass portions 120 and/or the second set of mass portions 130 may be made of a second material. The first and second materials may be similar or different materials. For example, the body portion 110 may be partially or entirely made of a steel-based material (e.g., 17-4 PH stainless steel, Nitronic® 50 stainless steel, alloy steel 8620, maraging steel or other types of stainless steel), a titanium-based material, an aluminum-based material (e.g., a high-strength aluminum alloy or a composite aluminum alloy coated with a high-strength alloy), any combination thereof, non-metallic materials, composite materials, and/or other suitable types of materials. In one example, one or more mass portions of the first set of mass portions 120 and/or the second set of mass portions 130 may be partially or entirely made of a high-density material such as a tungsten-based material or other suitable types of materials. In another example, one more mass portions of the first set of mass portions 120 and/or the second set of mass portions 130 may be partially or entirely made of other suitable metal material such as a steel-based material, a titanium-based material, an aluminum-based material, any combination thereof, and/or other suitable types of materials. Further, one or more mass portions of the first set of mass portions 120 and/or the second set of mass portions 130 may be made of different types of materials (e.g., metal core and polymer sleeve surrounding the metal core). The body portion 110, the first set of mass portions 120, and/or the second set of mass portions 130 may be partially or entirely made of similar or different non-metal materials (e.g., composite, plastic, polymer, etc.). The apparatus, methods, and articles of manufacture are not limited in this regard.

The body portion (e.g., one generally shown as 110 in FIG. 1) and/or any other portion of a golf club head (e.g., one generally shown as 100 in FIG. 1) according to any of the examples described herein may be constructed from stainless steel material to resist corrosion (e.g., corrosion resistant). In one example, all or one or more portions of the body portion 110 and/or any other portion of the golf club head 100 may be constructed by a forging process. Accordingly, stainless steel material from which all or portions of the body portion and/or any other portion of the golf club head are constructed may be a forgeable stainless steel material. The apparatus, methods, and articles of manufacture are not limited in this regard.

The apparatus, methods, and articles of manufacture described herein may use steel-based material with various ranges of material properties, such as density, tensile strength, yield strength, hardness, elongation, etc. (e.g., different type, grade, alloy, etc. of steel-based material). In one example, the density of steel-based material may be between and including 7.0 g/cm$^3$ and 10.0 g/cm$^3$. In another example, the density of steel-based material may be between and including 7.6 g/cm$^3$ and 9.2 g/cm$^3$. In yet another example, the density of steel-based material may be between and including 7.2 g/cm$^3$ and 8.1 g/cm$^3$. In yet another example, the density of steel-based material may be between and including 7.3 g/cm$^3$ and 7.8 g/cm$^3$. In yet another example, the density of steel-based material may be between and including 7.1 g/cm³ and 7.6 g/cm³. In yet another example, the density of steel-based material may be between and including 7.4 g/cm³ and 8.3 g/cm³. The apparatus, methods, and articles of manufacture described herein are not limited in this regard.

In one example, all or at least one or more portions of the body portion 110 may be constructed with steel-based material having a tensile strength between and including 600 MPa and 1200 MPa ($10^6$ Pascal=$10^6$ N/m²). In another example, all or at least one or more portions of the body portion 110 may be constructed with steel-based material having a tensile strength between and including 620 MPa and 900 MPa. In yet another example, the all or at least one or more portions of the body portion 110 may be constructed with steel-based material having a tensile strength between and including 660 MPa and 800 MPa. In yet another example, all or at least one or more portions of the body portion 110 may be constructed with steel-based material having a tensile strength between and including 680 MPa and 740 MPa. In yet another example, all or at least one or more portions of the body portion 110 may be constructed with steel-based material having a tensile strength between and including 640 MPa and 720 MPa. In yet another example, all or at least one or more portions of the body portion 110 may be constructed with steel-based material having a tensile strength between and including 670 MPa and 770 MPa. The apparatus, methods, and articles of manufacture described herein are not limited in this regard.

In one example, all or at least one or more portions of the body portion 110 may be constructed with steel-based material having a yield strength between and including 500 MPa and 1100 MPa. In another example, all or at least one or more portions of the body portion 110 may be constructed with steel-based material having a yield strength between and including 520 MPa and 800 MPa. In yet another example, all or at least one or more portions of the body portion 110 may be constructed with steel-based material having a yield strength between and including 560 MPa and 700 MPa. In yet another example, all or at least one or more portions of the body portion 110 may be constructed with steel-based material having a yield strength between and including 580 MPa and 690 MPa. In yet another example, all or at least one or more portions of the body portion 110 may be constructed with steel-based material having a yield strength between and including 540 MPa and 660 MPa. In yet another example, all or at least one or more portions of the body portion 110 may be constructed with steel-based material having a yield strength between and including 570 MPa and 670 MPa. The apparatus, methods, and articles of manufacture described herein are not limited in this regard.

In one example, all or at least one or more portions of the body portion 110 may be constructed with steel-based material having a hardness between and including 10 and 50 HRC (Rockwell Hardness in the C scale). In another example, all or at least one or more portions of the body portion 110 may be constructed with steel-based material having a hardness between and including 15 and 40 HRC. In yet another example, all or at least one or more portions of the body portion 110 may be constructed with steel-based material having a hardness between and including 22 and 30 HRC. In yet another example, all or at least one or more portions of the body portion 110 may be constructed with steel-based material having a hardness between and including 12 and 38 HRC. In yet another example, all or at least one or more portions of the body portion 110 may be constructed with steel-based material having a hardness between and including 17 and 33 HRC. In yet another example, all or at least one or more portions of the body portion 110 may be constructed with steel-based material having a hardness between and including 11 and 31 HRC. The apparatus, methods, and articles of manufacture described herein are not limited in this regard.

In one example, all or at least one or more portions of the body portion 110 may be constructed with steel-based material having an elongation between and including 5% and 50%. In another example, all or at least one or more portions of the body portion 110 may be constructed with steel-based material having an elongation between and including 10% and 40%. In yet another example, all or at least one or more portions of the body portion 110 may be constructed with steel-based material having an elongation between and including 13% and 30%. In yet another example, all or at least one or more portions of the body portion 110 may be constructed with steel-based material having an elongation between and including 18% and 37%. In yet another example, all or at least one or more portions of the body portion 110 may be constructed with steel-based material having an elongation between and including 14% and 33%. In yet another example, all or at least one or more portions of the body portion 110 may be constructed with steel-based material having an elongation between and including 7% and 36%. The apparatus, methods, and articles of manufacture described herein are not limited in this regard.

Figure 10:
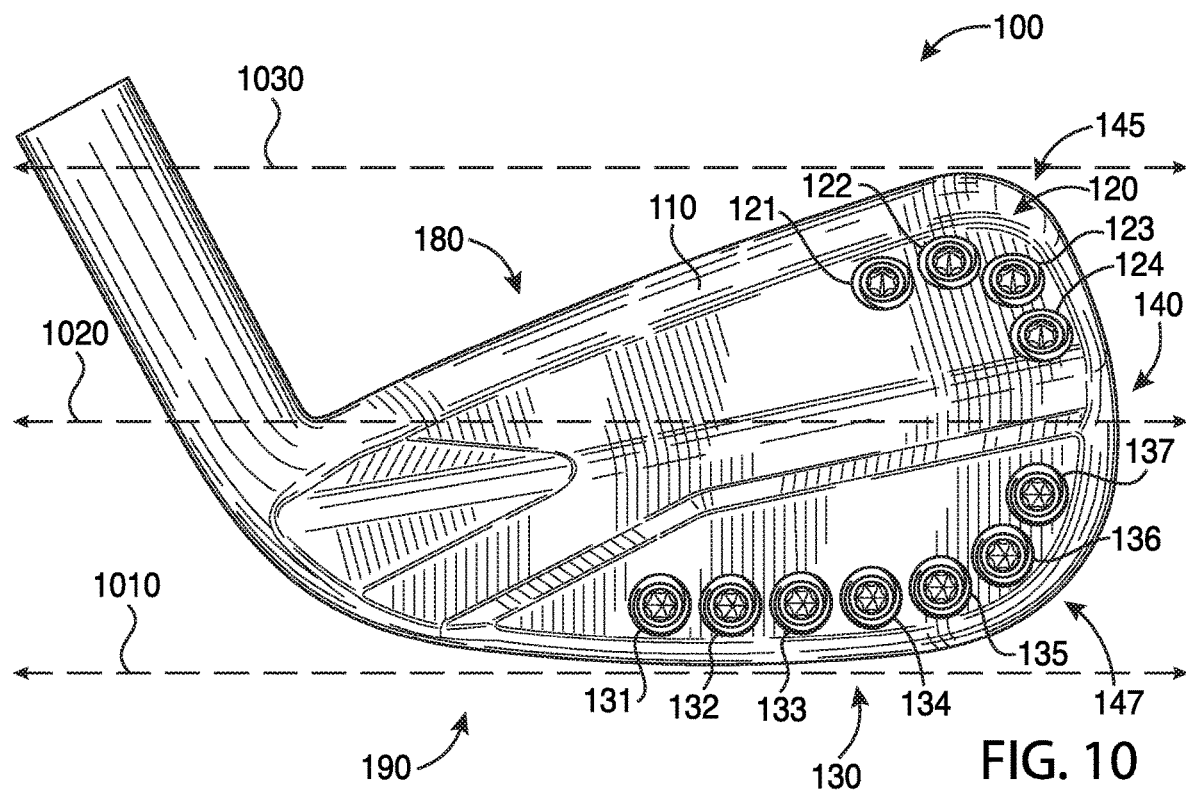
FIG. 10 depicts another rear view of the example golf club head of FIG. 1.

One or more ports may be configured to receive a mass portion having a similar shape as the port. For example, a rectangular port may receive a rectangular mass portion. In another example, an elliptical port may receive an elliptical mass portion. As shown in FIGS. 10 and 14, for example, the first and second sets of ports 1420 and 1430, respectively, may be cylindrical ports configured to receive one or more cylindrical mass portions. In particular, one or more mass portions of the first set of mass portions 120 (e.g., generally shown as mass portions 121, 122, 123, and 124) may be disposed in a port located at or proximate to the toe portion 140 and/or the top portion 180. For example, the mass portion 121 may be partially or entirely disposed in the port 1421. One or more mass portions of the second set of mass portions 130 (e.g., generally shown as mass portions 131, 132, 133, 134, 135, 136, and 137) may be disposed in a port located at or proximate to the toe portion 140 and/or the sole portion 190. For example, the mass portion 135 may be partially or entirely disposed in the port 1435. The first set of mass portions 120 and/or the second set of mass portions 130 may be coupled to the body portion 110 with various manufacturing methods and/or processes (e.g., a bonding process, a welding process, a brazing process, a mechanical locking method, any combination thereof, or other suitable manufacturing methods and/or processes).

Alternatively, the golf club head 100 may not include (i) the first set of mass portions 120, (ii) the second set of mass portions 130, or (iii) both the first and second sets of mass portions 120 and 130, respectively. In particular, the body portion 110 may not include ports at or proximate to the top portion 180 and/or the sole portion 190. For example, the mass of the first set of mass portions 120 (e.g., 3 grams) and/or the mass of the second set of mass portions 130 (e.g., 16.8 grams) may be integral part(s) of the body portion 110 instead of separate mass portion(s). In one example, the body portion 110 may include interior and/or exterior integral mass portions at or proximate to the toe portion 140 and/or at or proximate to the heel portion 150. In another example, a portion of the body portion 110 may include interior and/or exterior integral mass portions extending to and/or between the toe portion 140 and the heel portion 150. The first and/or second set of mass portions 120 and 130, respectively, may affect the mass, the center of gravity (CG), the moment of inertia (MOI), or other physical properties of the golf club head 100 that may dictate club head performance. The apparatus, methods, and articles of manufacture described herein are not limited in this regard.

Figure 11:
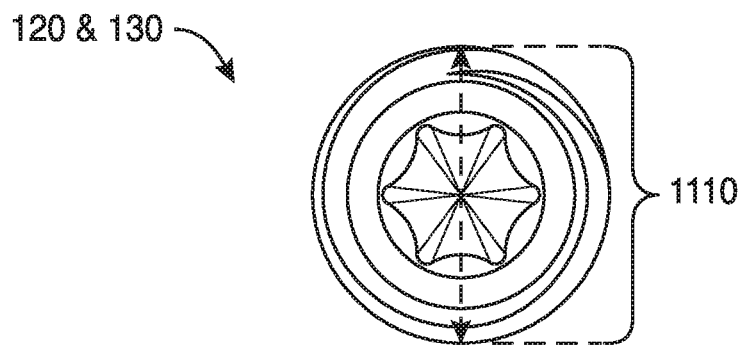
FIG. 11 depicts a top view of a mass portion associated with the example golf club head of FIG. 1.

One or more mass portions of the first set of mass portions 120 and/or the second set of mass portions 130 may have similar or different physical properties (e.g., color, marking, shape, size, density, mass, volume, external surface texture, materials of construction, etc.). Accordingly, the first set of mass portions 120 and/or the second set of mass portions 130 may contribute to the ornamental design of the golf club head 100. In the illustrated example as shown in FIG. 11, one or more mass portions of the first set of mass portions 120 and/or the second set of mass portions 130 may have a cylindrical shape (e.g., a circular cross section). Alternatively, one or more mass portions of the first set of mass portions 120 may have a first shape (e.g., a cylindrical shape) whereas one or more mass portions of the second set of mass portions 130 may have a second shape (e.g., a cubical shape). In another example, the first set of mass portions 120 may include two or more mass portions with different shapes (e.g., the mass portion 121 may be a first shape whereas the mass portion 122 may be a second shape different from the first shape). Likewise, the second set of mass portions 130 may also include two or more mass portions with different shapes (e.g., the mass portion 131 may be a first shape whereas the mass portion 132 may be a second shape different from the first shape). In another example, one or more mass portions of the first set of mass portions 120 and/or the second set of mass portions 130 may have a different color(s), marking(s), shape(s), density or densities, mass(es), volume(s), material(s) of construction, external surface texture(s), and/or any other physical property as compared to one or more mass portions of the first set of mass portions 120 and/or the second set of mass portions 130. The apparatus, methods, and articles of manufacture described herein are not limited in this regard.

Although the above examples may describe mass portions having a particular shape, the apparatus, methods, and articles of manufacture described herein may include mass portions of other suitable shapes (e.g., a portion of or a whole sphere, cube, cone, cylinder, pyramid, cuboidal, prism, frustum, rectangular, elliptical, or other suitable geometric shape). While the above examples and figures may depict multiple mass portions as a set of mass portions, two or more mass portions of the first set of mass portions 120 and/or the second set of mass portions 130 may be a single piece of mass portion. In one example, the first set of mass portions 120 may be a single piece of mass portion instead of a series of four separate mass portions. In another example, the second set of mass portions 130 may be a single piece of mass portion instead of a series of seven separate mass portions. The apparatus, methods, and articles of manufacture described herein are not limited in this regard.

Figure 12:
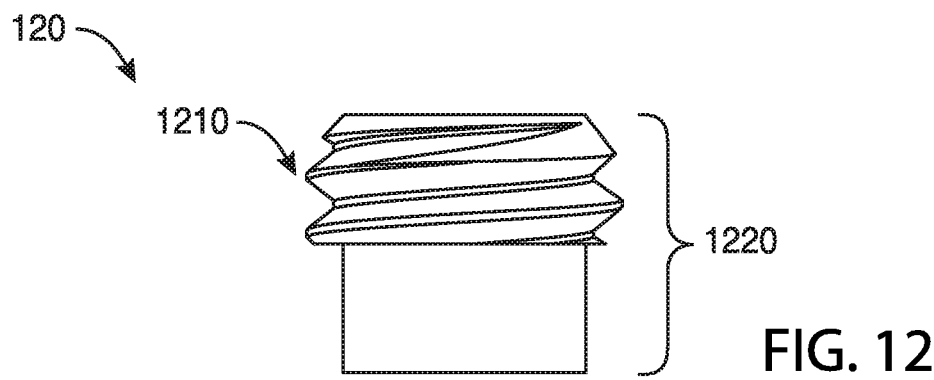
FIG. 12 depicts a side view of a mass portion associated with the example golf club head of FIG. 1.
Figure 13:
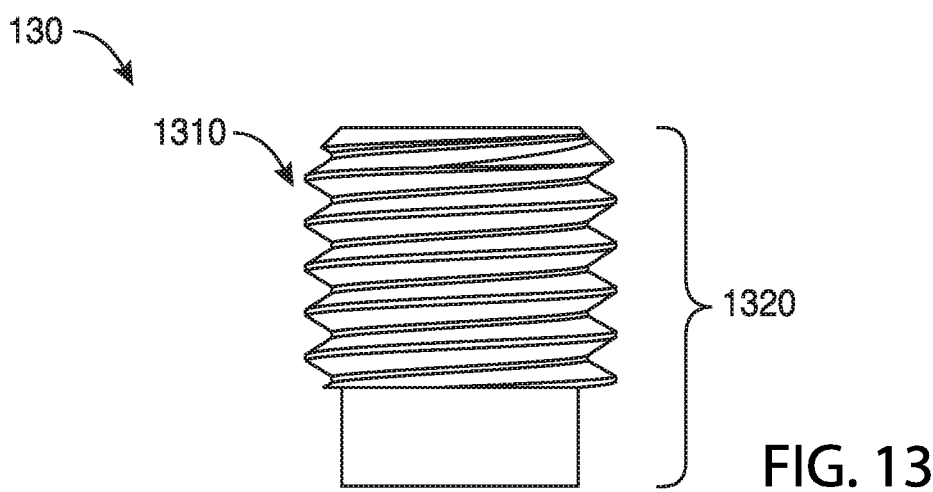
FIG. 13 depicts a side view of another mass portion associated with the example golf club head of FIG. 1.

Referring to FIGS. 12 and 13, for example, the first set of mass portions 120 and/or the second set of mass portions 130 may include threads, generally shown as 1210 and 1310, respectively, to engage with correspondingly configured threads in the ports to secure in the ports of the back portion 170 (e.g., generally shown as 1420 and 1430 in FIG. 14). Accordingly, one or more mass portions as described herein may be shaped similar to and function as a screw or threaded fastener for engaging threads in a port. For example, one or more mass portions of the first set of mass portions 120 and/or the second set of mass portions 130 may be a screw. One or more mass portions of the first set of mass portions 120 and/or the second set of mass portions 130 may not be readily removable from the body portion 110 with or without a tool. Alternatively, one or more mass portions of the first set of mass portions 120 and/or the second set of mass portions 130 may be readily removable (e.g., with a tool) so that a relatively heavier or lighter mass portion may replace one or more mass portions of the first and second sets of mass portions 120 and 130, respectively. In another example, one or more mass portions of the first set of mass portions 120 and/or the second set of mass portions 130 may be secured in the ports of the back portion 170 with epoxy or adhesive so that the one or more mass portions of the first set of mass portions 120 and/or the second set of mass portions 130 may not be readily removable. In yet another example, one or more mass portions of the first set of mass portions 120 and/or the second set of mass portions 130 may be secured in the ports of the back portion 170 with both threads and thread sealant (e.g. acrylic adhesive, cyanoacrylate adhesive, epoxy, thermoplastic adhesive, silicone sealant, or urethane adhesive) so that the one more mass portions of the first set of mass portions 120 and/or the second set of mass portions 130 may not be readily removable. In yet another example, one or more mass portions described herein may be press fit in a port. In yet another example, one or more mass portions described herein may be formed inside a port by injection molding. For example, a liquid metallic material (i.e., molten metal) or a plastic material (e.g. rubber, foam, or any polymer material) may be injected or otherwise introduced into a port. After the liquid material is cooled and/or cured inside the port, the resulting solid material (e.g., a metal material, a plastic material, or a combination thereof) may form a mass portion. The apparatus, methods, and articles of manufacture described herein are not limited in this regard.

In one example, a combination of filler material as described herein and a mass portion may be added to a port in the body portion 110 of the golf club head 100 to provide an acoustically-dampened mass portion. In one example, a process of forming an acoustically-dampened mass portion in the body portion 110 can include (i) adding an amount of filler material to the port and (ii) installing a mass portion in the port to a depth where the mass portion contacts the filler material. In another example, a process of forming an acoustically-dampened mass portion in the body portion 110 can include (i) installing a mass portion in the port to a depth beneath flush with the outer surface of the body portion 110 and (ii) adding an amount of filler material to the port volume present above the mass portion. In yet another example, a process of forming an acoustically-dampened mass portion in the body portion 110 may include (i) adding a first amount of filler material to the port, (ii) installing a mass portion in the port to a depth where the mass portion contacts the filler material and is beneath flush with the outer surface of the body portion 110, and (iii) adding a second amount of filler material to the port volume present above the mass portion. The acoustically-dampened mass portion(s) may dampen vibrations in the club head that would otherwise transfer through the shaft to an individual's hands. By dampening vibrations in the club head, the acoustically-dampened mass portion(s) may provide a club head with improved sound and feel. The filler material may bond to a wall of the port and an external surface of the mass portion, thereby serving to retain the mass portion in the port without need for a mechanical retention feature. The apparatus, methods, and articles of manufacture described herein are not limited in this regard.

As mentioned above, one or more mass portions of the first set of mass portions 120 and/or the second set of mass portions 130 may be similar in some physical properties but different in other physical properties. For example, a mass portion may be made from an aluminum-based material or an aluminum alloy whereas another mass portion may be made from a tungsten-based material or a tungsten alloy. In another example, a mass portion may be made from a polymer material whereas another mass portion may be made from a steel-based material. In yet another example, as illustrated in FIGS. 11-13, one or more mass portions of the first set of mass portions 120 and/or the second set of mass portions 130 may have a diameter 1110 of about 0.25 inch (6.35 millimeters) but one or more mass portions of the first set of mass portions 120 and/or the second set of mass portions 130 may be different in height. In particular, one or more mass portions of the first set of mass portions 120 may be associated with a first height 1220 (FIG. 12), and one or more mass portions of the second set of mass portions 130 may be associated with a second height 1320 (FIG. 13). The first height 1220 may be relatively shorter than the second height 1320. In one example, the first height 1220 may be about 0.125 inch (3.175 millimeters) whereas the second height 1320 may be about 0.3 inch (7.62 millimeters). In another example, the first height 1220 may be about 0.16 inch (4.064 millimeters) whereas the second height 1320 may be about 0.4 inch (10.16 millimeters). Alternatively, the first height 1220 may be equal to or greater than the second height 1320. Although the above examples may describe particular dimensions, one or more mass portions described herein may have different dimensions. The apparatus, methods, and articles of manufacture described herein are not limited in this regard.

Referring to FIG. 10, for example, the golf club head 100 may be associated with a ground plane 1010, a horizontal midplane 1020, and a top plane 1030. In particular, the ground plane 1010 may be a tangential plane to the sole portion 190 of the golf club head 100 when the golf club head 100 is at an address position (e.g., the golf club head 100 is aligned to strike a golf ball). A top plane 1030 may be a tangential plane to the top portion of the 180 of the golf club head 100 when the golf club head 100 is at the address position. The ground and top planes 1010 and 1030, respectively, may be substantially parallel to each other. The horizontal midplane 1020 may be located vertically halfway between the ground and top planes 1010 and 1030, respectively.

Figure 4:
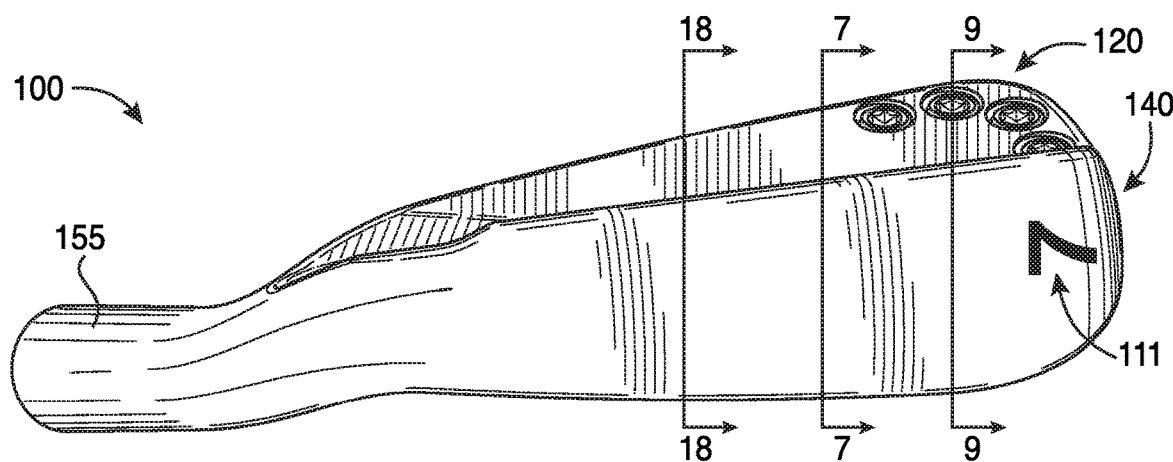
FIG. 4 depicts a bottom view of the example golf club head of FIG. 1.
Figure 5:
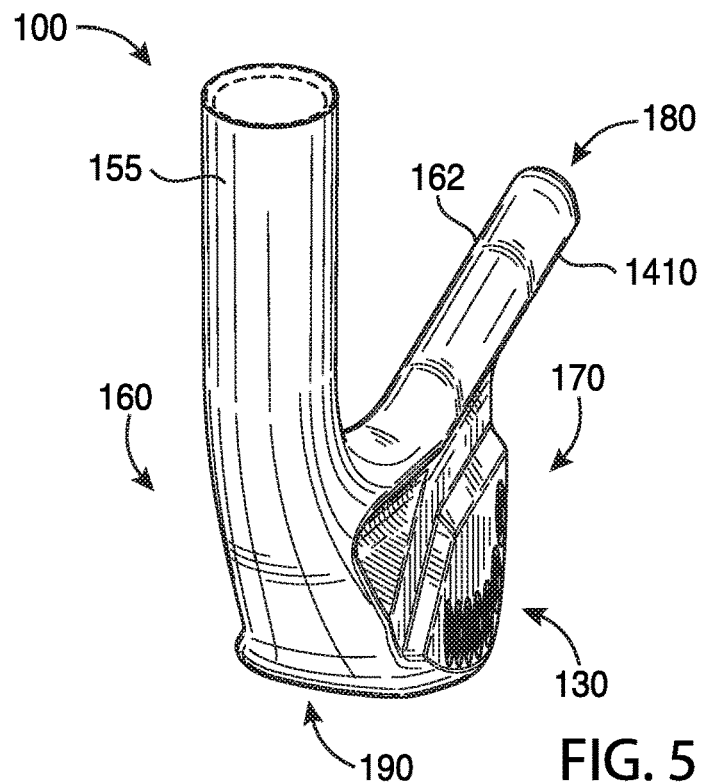
FIG. 5 depicts a heel side view of the example golf club head of FIG. 1.

As described herein, the golf club head 100 may be an iron-type golf club head (e.g., a 1-iron, a 2-iron, a 3-iron, a 4-iron, a 5-iron, a 6-iron, a 7-iron, an 8-iron, a 9-iron, etc.) or a wedge-type golf club head (e.g., a pitching wedge, a lob wedge, a sand wedge, an n-degree wedge such as 44 degrees (°), 48°, 52°, 56°, 60°, etc.). The body portion 110 of the golf club head 100 or any of the golf club heads described herein may include a visual indicator to indicate a particular type of iron-type golf club head or wedge-type golf club head. In particular, the visual indicator 111 may be a number located on a periphery of the body portion 110. For example, the visual indicator 111 may be located on the periphery of the body portion 110 at or proximate to the sole portion 190 and/or the toe portion 140, as shown in FIG. 4. The visual indicator 111 may avoid or substantially avoid contact with the ground plane 1010 at an address position and/or the ground when the golf club head 100 strikes a golf ball to avoid or minimize unwanted wear to the visual indicator. The apparatus, methods, and articles of manufacture described herein are not limited in this regard.

The body portion 110 may include any number of ports (e.g., no ports, one port, two ports, etc.) above the horizontal midplane 1020 and/or below the horizontal midplane 1020. In one example, the body portion 110 may include a greater number of ports below the horizontal midplane 1020 than above the horizontal midplane 1020. In the illustrated example as shown in FIG. 14, the body portion 110 may include four ports (e.g., generally shown as ports 1421, 1422, 1423, and 1424) above the horizontal midplane 1020 and seven ports (e.g., generally shown as ports 1431, 1432, 1433, 1434, 1435, 1436, and 1437) below the horizontal midplane 1020. In another example (not shown), the body portion 110 may include two ports above the horizontal midplane 1020 and five ports below the horizontal midplane 1020. In yet another example (not shown), the body portion 110 may not have any ports above the horizontal midplane 1020 but have one or more ports below the horizontal midplane 1020. Accordingly, the body portion 110 may have more ports below the horizontal midplane 1020 than above the horizontal midplane 1020. Further, the body portion 110 may include a port at or proximate to the horizontal midplane 1020 with a portion of the port above the horizontal midplane 1020 and a portion of the port below the horizontal midplane 1020. Accordingly, the port may be (i) above the horizontal midplane 1020, (ii) below the horizontal midplane 1020, or (iii) both above and below the horizontal midplane 1020. The apparatus, methods, and articles of manufacture described herein are not limited in this regard.

To provide optimal perimeter weighting for the golf club head 100, the first set of mass portions 120 (e.g., generally shown as mass portions 121, 122, 123, and 124) may be configured to counter-balance the mass of the hosel 155. For example, as shown in FIG. 10, the first set of mass portions 120 (e.g., generally shown as mass portions 121, 122, 123 and 124) may be located at or near the periphery of the body portion 110 and extend to and/or between the top portion 180 and the toe portion 140. In other words, the first set of mass portions 120 may be located on the golf club head 100 at a generally opposite location relative to the hosel 155. In another example, at least a portion of the first set of mass portions 120 may extend at or near the periphery of the body portion 110 and extend along a portion of the top portion 180. In yet another example, at least a portion of the first set of mass portions 120 may extend at or near the periphery of the body portion 110 and extend along a portion of the toe portion 140. Further, the first set of mass portions 120 may be above the horizontal midplane 1020 of the golf club head 100. For example, the first set of mass portions 120 may be at or near the horizontal midplane 1020. In another example, a portion of the first set of mass portions 120 may be at or above the horizontal midplane 1020 and another portion of the first set of mass portions 120 may be at or below the horizontal midplane 1020. Accordingly, a set of mass portions, which may be a single mass portion, may have portions above the horizontal midplane 1020 and below the horizontal midplane 1020. The apparatus, methods, and articles of manufacture described herein are not limited in this regard.

At least a portion of the first set of mass portions 120 may be at or near the toe portion 140 to increase the MOI of the golf club head 100 about a vertical axis of the golf club head 100 that extends through the CG of the golf club head 100. Accordingly, the first set of mass portions 120 may be at or near the periphery of the body portion 110 and extend through the top portion 180 and/or the toe portion 140 to counter-balance the mass of the hosel 155 and/or increase the MOI of the golf club head 100. The locations of the first set of mass portions 120 (i.e., the locations of the first set of ports 1420) and the physical properties and materials of construction of the first set of mass portions 120 may be determined to optimally affect the mass, mass distribution, CG, MOI, structural integrity and/or or other static and/or dynamic characteristics of the golf club head 100. The apparatus, methods, and articles of manufacture described herein are not limited in this regard.

The second set of mass portions 130 (e.g., generally shown as mass portions 131, 132, 133, 134, 135, 136, and 137) may be configured to place the CG of the golf club head 100 at an optimal location and optimize the MOI of the golf club head 100. Referring to FIG. 10, all or a substantial portion of the second set of mass portions 130 may be generally at or near the sole portion 190. For example, the second set of mass portions 130 (e.g., generally shown as mass portions 131, 132, 133, 134, 135, 136, and 137) may be at or near the periphery of the body portion 110 and extend from the sole portion 190 to the toe portion 140. As shown in the example of FIG. 10, the mass portions 131, 132, 133, and 134 may be located at or near the periphery of the body portion 110 and extend along the sole portion 190 to lower the CG of the golf club head 100. The mass portions 135, 136 and 137 may be located at or near the periphery of the body portion 110 and extend to and/or between the sole portion 190 and the toe portion 140 to lower the CG and increase the MOI of the golf club head 100. For example, the MOI of the golf club head 100 about a vertical axis extending through the CG may increase due to the presence of the mass portions. To lower the CG of the golf club head 100, all or a portion of the second set of mass portions 130 may be located closer to the sole portion 190 than to the horizontal midplane 1020. For example, the mass portions 131, 132, 133, 134, 135, and 136 may be closer to the sole portion 190 than to the horizontal midplane 1020. The locations of the second set of mass portions 130 (i.e., the locations of the second set of ports 1430) and the physical properties and materials of construction of the second set of mass portions 130 may be determined to optimally affect the mass, mass distribution, CG, MOI, structural integrity and/or or other static and/or dynamic characteristics of the golf club head 100. The apparatus, methods, and articles of manufacture described herein are not limited in this regard.

Figure 7:
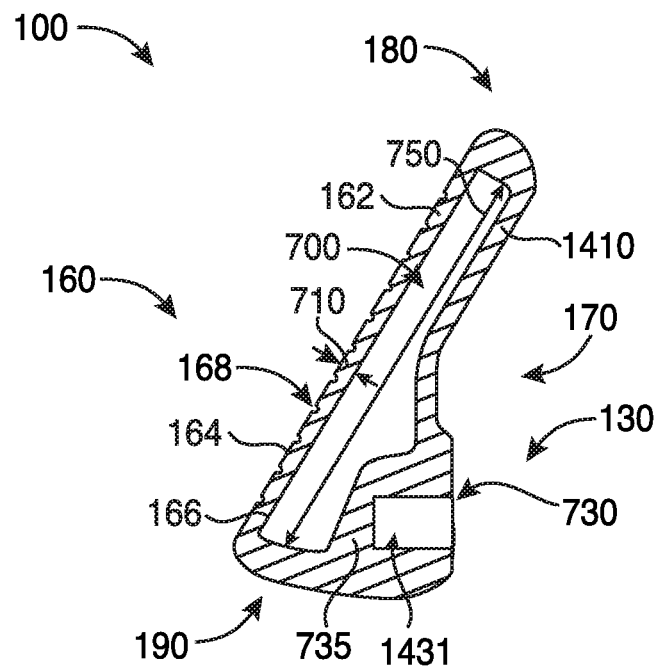
FIG. 7 depicts a cross-sectional view of the example golf club head of FIG. 4 along line 7-7.
Figure 8:
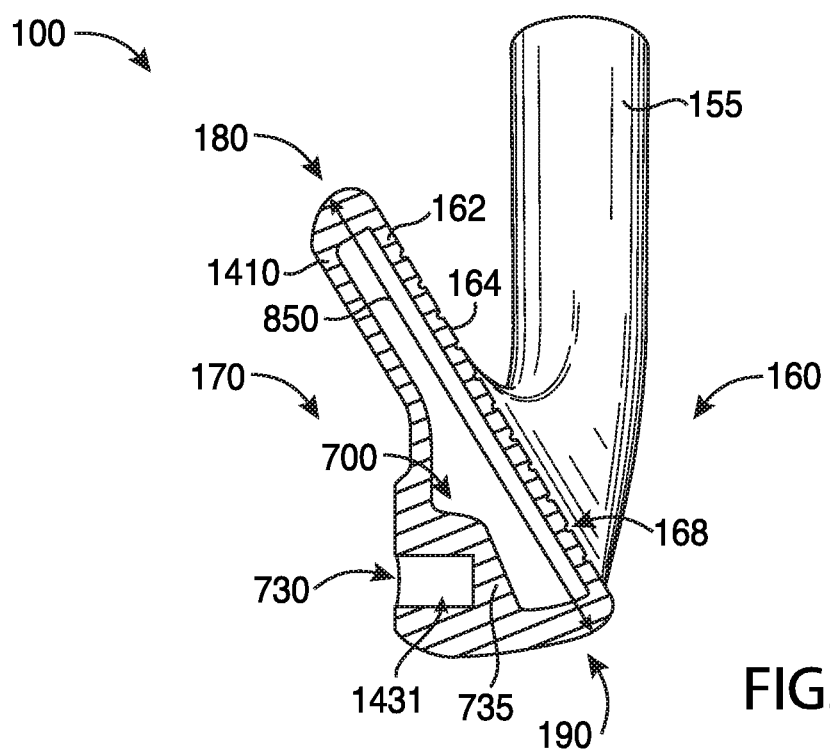
FIG. 8 depicts a cross-sectional view of the example golf club head of FIG. 3 along line 8-8.
Figure 9:
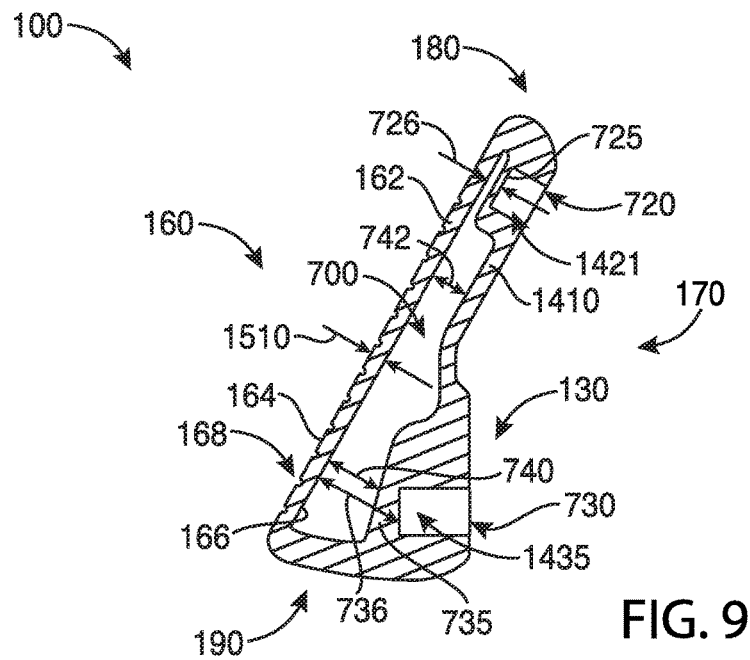
FIG. 9 depicts a cross-sectional view of the example golf club head of FIG. 4 along line 9-9.

Turning to FIGS. 7-9, for example, one or more mass portions of the first set of mass portions 120 and/or the second set of mass portions 130 may be located away from the back surface 166 of the face portion 162 (e.g., not directly coupled to each other). That is, one or more mass portions of the first set of mass portions 120 and/or the second set of mass portions 130 and the back surface 166 may be partially or entirely separated by an interior cavity 700 of the body portion 110. For example, one or more ports of the first and second sets of ports 1420 and 1430 may include an opening (e.g., generally shown as 720 and 730) and a port wall (e.g., generally shown as 725 and 735). The port walls 725 and 735 may be integral portions of the back wall portion 1410 (e.g., a section of the back wall portion 1410) or the body portion 110 depending on the location of each port. The opening 720 may be configured to receive a mass portion such as mass portion 121. The opening 730 may be configured to receive a mass portion such as mass portion 135. The opening 720 may be located at one end of the port 1421, and the port wall 725 may be located or proximate to at an opposite end of the port 1421. In a similar manner, the opening 730 may be located at one end of the port 1435, and the port wall 735 may be located at or proximate to an opposite end of the port 1435. The port walls 725 and 735 may be separated from the face portion 162 (e.g., separated by the interior cavity 700). The port wall 725 may have a distance 726 from the back surface 166 of the face portion 162 as shown in FIG. 9. The port wall 735 may have a distance 736 from the back surface 166 of the face portion 162. The distances 726 and 736 may be determined to optimize the location of the CG of the golf club head 100 when the first and second sets of ports 1420 and 1430, respectively, receive mass portions as described herein. According to one example, the distance 736 may be greater than the distance 726 so that the CG of the golf club head 100 may be moved toward the back portion 170. As a result, a width 740 of a portion of the interior cavity 700 below the horizontal midplane 1020 may be greater than a width 742 of the interior cavity 700 above the horizontal midplane 1020. The apparatus, methods, and articles of manufacture described herein are not limited in this regard.

As described herein, the CG of the golf club head 100 may be relatively farther back away from the face portion 162 and relatively lower towards a ground plane (e.g., one shown as 1010 in FIG. 10) with all or a substantial portion of the second set of mass portions 130 being at or closer to the sole portion 190 than to the horizontal midplane 1020 and the first and second sets of mass portions 120 and 130, respectively being away from the back surface 166 than if the second set of mass portions 130 were directly coupled to the back surface 166. The body portion 110 may include any number of mass portions (e.g., no mass portions, one mass portion, two mass portions, etc.) and/or any configuration of mass portions (e.g., mass portion(s) integral with the body portion 110) above the horizontal midplane 1020 and/or below the horizontal midplane 1020. The locations of the first and second sets of ports 1420 and 1430 and/or the locations (e.g., internal mass portion(s), external mass portion(s), mass portion(s) integral with the body portion 110, etc.), physical properties and materials of construction of the first set of mass portions 120 and/or the second set of mass portions 130 may be determined to optimally affect the mass, mass distribution, CG, MOI characteristics, structural integrity and/or or other static and/or dynamic characteristics of the golf club head 100. Different from other golf club head designs, the interior cavity 700 of the body portion 110 and the location of the first set of mass portions 120 and/or the second set of mass portions 130 along the periphery of the golf club head 100 may result in a golf ball traveling away from the face portion 162 at a relatively higher ball launch angle and a relatively lower spin rate. As a result, the golf ball may travel farther (i.e., greater total distance, which includes carry and roll distances). The apparatus, methods, and articles of manufacture described herein are not limited in this regard.

While the figures may depict ports with a particular cross-section shape, the apparatus, methods, and articles of manufacture described herein may include ports with other suitable cross-section shapes. In one example, the ports of the first and/or second sets of ports 1420 and 1430 may have U-like cross-section shape. In another example, the ports of the first and/or second set of ports 1420 and 1430 may have V-like cross-section shape. One or more of the ports associated with the first set of mass portions 120 may have a different cross-section shape than one or more ports associated with the second set of mass portions 130. For example, the port 1421 may have a U-like cross-section shape whereas the port 1435 may have a V-like cross-section shape. Further, two or more ports associated with the first set of mass portions 120 may have different cross-section shapes. In a similar manner, two or more ports associated with the second set of mass portions 130 may have different cross-section shapes. The apparatus, methods, and articles of manufacture described herein are not limited in this regard.

The first and second sets of mass portions 120 and 130, respectively, may be similar in mass (e.g., all of the mass portions of the first and second sets of mass portions 120 and 130, respectively, weigh about the same). Alternatively, the first and second sets of mass portions 120 and 130, respectively, may be different in mass individually or as an entire set. In particular, one or more mass portions of the first set of mass portions 120 (e.g., generally shown as 121, 122, 123, and 124) may have relatively less mass than one or more portions of the second set of mass portions 130 (e.g., generally shown as 131, 132, 133, 134, 135, 136, and 137). For example, the second set of mass portions 130 may account for more than 50% of the total mass from mass portions of the golf club head 100. As a result, the golf club head 100 may be configured to have at least 50% of the total mass from mass portions disposed below the horizontal midplane 1020. Two or more mass portions in the same set may be different in mass. In one example, the mass portion 121 of the first set of mass portions 120 may have a relatively lower mass than the mass portion 122 of the first set of mass portions 120. In another example, the mass portion 131 of the second set of mass portions 130 may have a relatively lower mass than the mass portion 135 of the second set of mass portions 130. Accordingly, more mass may be distributed away from the CG of the golf club head 100 to increase the MOI about the vertical axis through the CG. The apparatus, methods, and articles of manufacture described herein are not limited in this regard.

In one example, the golf club head 100 may have a mass in the range of about 220 grams to about 330 grams based on the type of golf club (e.g., a 4-iron versus a lob wedge). The body portion 110 may have a mass in the range of about 200 grams to about 310 grams with the first set of mass portions 120 and/or the second set of mass portions 130 having a mass of about 20 grams (e.g., a total mass from mass portions). One or more mass portions of the first set of mass portions 120 and/or the second set of mass portions 130 may have a mass greater than or equal to about 0.1 gram and less than or equal to about 20 grams. In one example, one or more mass portions of the first set of mass portions 120 may have a mass of about 0.75 gram whereas one or more mass portions of the second set of mass portions 130 may have a mass of about 2.4 grams. The sum of the mass of the first set of mass portions 120 or the sum of the mass of the second set of mass portions 130 may be greater than or equal to about 0.1 grams and less than or equal to about 20 grams. In one example, the sum of the mass of the first set of mass portions 120 may be about 3 grams whereas the sum of the mass of the first set of mass portions 130 may be about 16.8 grams. The total mass of the second set of mass portions 130 may weigh more than five times as much as the total mass of the first set of mass portions 120 (e.g., a total mass of the second set of mass portions 130 of about 16.8 grams versus a total mass of the first set of mass portions 120 of about 3 grams). The golf club head 100 may have a total mass of 19.8 grams from the first and second sets of mass portions 120 and 130, respectively (e.g., sum of 3 grams from the first set of mass portions 120 and 16.8 grams from the second set of mass portions 130). Accordingly, in one example, the first set of mass portions 120 may account for about 15% of the total mass from mass portions of the golf club head 100 whereas the second set of mass portions 130 may be account for about 85% of the total mass from mass portions of the golf club head 100. The apparatus, methods, and articles of manufacture described herein are not limited in this regard.

By coupling the first set of mass portions 120 and/or the second set of mass portions 130, respectively, to the body portion 110 (e.g., securing the first set of mass portions 120 and/or the second set of mass portions 130 in the ports on the back portion 170), the location of the CG and the MOI) of the golf club head 100 may be optimized. In particular, as described herein, the first set of mass portions 120 may lower the location of the CG towards the sole portion 190 and further back away from the face portion 162. Further, the first set of mass portions 120 and/or the second set of mass portions 130 may increase the MOI as measured about a vertical axis extending through the CG (e.g., perpendicular to the ground plane 1010). The MOI may also be higher as measured about a horizontal axis extending through the CG (e.g., extending towards the toe and heel portions 140 and 150, respectively, of the golf club head 100). As a result, the golf club head 100 may provide a relatively higher launch angle and a relatively lower spin rate than a golf club head without the first and/or second sets of mass portions 120 and 130, respectively. The apparatus, methods, and articles of manufacture described herein are not limited in this regard.

Although the figures may depict the mass portions as separate and individual parts that may be visible from an exterior of the golf club head 100, the two or more mass portions of the first set of mass portions 120 and/or the second set of mass portions 130 may be a single piece of mass portion that may be an exterior mass portion or an interior mass portion (i.e., not visible from an exterior of the golf club head 100). In one example, all of the mass portions of the first set 120 of mass portions (e.g., generally shown as 121, 122, 123, and 124) may be combined into a single piece of mass portion (e.g., a first mass portion). In a similar manner, all of the mass portions of the second set of mass portions 130 (e.g., generally shown as 131, 132, 133, 134, 135, 136, and 137) may be combined into a single piece of mass portion as well (e.g., a second mass portion). In this example, the golf club head 100 may have only two mass portions. In another example (not shown), the body portion 110 may not include the first set of mass portions 120, but may include the second set of mass portions 130 in the form of a single piece of internal mass portion that may be farther from the heel portion 150 than the toe portion 140. In yet another example (not shown), the body portion 110 may not include the first set of mass portions 120, but may include the second set of mass portions 130 with a first internal mass portion farther from the heel portion 150 than the toe portion 140 and a second internal mass portion farther from the toe portion 140 than the heel portion 150. The first internal mass portion and the second internal mass portion may be (i) integral parts of the body portion 110 or (ii) separate from the body portion 110 and coupled to the body portion 110. The apparatus, methods, and articles of manufacture described herein are not limited in this regard.

While the figures may depict a particular number of mass portions, the apparatus, methods, and articles of manufacture described herein may include more or less number of mass portions. In one example, the first set of mass portions 120 may include two separate mass portions instead of three separate mass portions as shown in the figures. In another example, the second set of mass portions 130 may include five separate mass portions instead of seven separate mass portions as shown in the figures. Alternatively as mentioned above, the apparatus, methods, and articles of manufacture described herein may not include any separate mass portions (e.g., the body portion 110 may be manufactured to include the mass of the separate mass portions as integral part(s) of the body portion 110). The apparatus, methods, and articles of manufacture described herein are not limited in this regard.

Referring to FIGS. 7-9, for example, the body portion 110 may be a hollow body including the interior cavity 700 extending between the front portion 160 and the back portion 170. Further, the interior cavity 700 may extend between the top portion 180 and the sole portion 190. The interior cavity 700 may be associated with a cavity height 750 ($H_C$), and the body portion 110 may be associated with a body height 850 ($H_B$). While the cavity height 750 and the body height 850 may vary between the toe and heel portions 140 and 150, the cavity height 750 may be at least 50% of a body height 850 ($H_C > 0.5*H_B$). For example, the cavity height 750 may vary between 70%-85% of the body height 850. With the cavity height 750 of the interior cavity 700 being greater than 50% of the body height 850, the golf club head 100 may produce relatively more consistent feel, sound, and/or result when the golf club head 100 strikes a golf ball via the face portion 162 than a golf club head with a cavity height of less than 50% of the body height. The apparatus, methods, and articles of manufacture described herein are not limited in this regard.

In one example, the interior cavity 700 may be unfilled (i.e., empty space). The body portion 110 with the interior cavity 700 may weigh about 100 grams less than the body portion 110 without the interior cavity 700. Alternatively, the interior cavity 700 may be partially or entirely filled with a cavity filling or filler material (i.e., a cavity filling portion), which may include one or more similar or different types of materials. In one example, the filler material may include an elastic polymer or an elastomer material (e.g., a viscoelastic urethane polymer material such as Sorbothane® material manufactured by Sorbothane, Inc., Kent, Ohio), a thermoplastic elastomer material (TPE), a thermoplastic polyurethane material (TPU), other polymer material(s), bonding material(s) (e.g., adhesive), and/or other suitable types of materials that may absorb shock, isolate vibration, and/or dampen noise. For example, at least 50% of the interior cavity 700 may be filled with a TPE material to absorb shock, isolate vibration, and/or dampen noise when the golf club head 100 strikes a golf ball via the face portion 162. The apparatus, methods, and articles of manufacture described herein are not limited in this regard.

In another example, the filler material may be a polymer material such as an ethylene copolymer material that may absorb shock, isolate vibration, and/or dampen noise when the golf club head 100 strikes a golf ball via the face portion 162. In particular, at least 50% of the interior cavity 700 may be filled with a high density ethylene copolymer ionomer, a fatty acid modified ethylene copolymer ionomer, a highly amorphous ethylene copolymer ionomer, an ionomer of ethylene acid acrylate terpolymer, an ethylene copolymer comprising a magnesium ionomer, an injection moldable ethylene copolymer that may be used in conventional injection molding equipment to create various shapes, an ethylene copolymer that may be used in conventional extrusion equipment to create various shapes, an ethylene copolymer having high compression and low resilience similar to thermoset polybutadiene rubbers, and/or a blend of highly neutralized polymer compositions, highly neutralized acid polymers or highly neutralized acid polymer compositions, and fillers. For example, the ethylene copolymer may include any of the ethylene copolymers associated with DuPont™ High-Performance Resin (HPF) family of materials (e.g., DuPont™ HPF AD1172, DuPont™ HPF AD1035, DuPont® HPF 1000 and DuPont™ HPF 2000), which are manufactured by E.I. du Pont de Nemours and Company of Wilmington, Del. The DuPont™ HPF family of ethylene copolymers are injection moldable and may be used with conventional injection molding equipment and molds, provide low compression, and provide high resilience, i.e., relatively high coefficient of restitution (COR). The apparatus, methods, and articles of manufacture described herein are not limited in this regard.

For example, the filler material may have a density of less than or equal to 1.5 g/cm$^3$. The filler material may have a compression deformation value ranging from about 0.0787 inch (2 mm) to about 0.1968 inch (5 mm). The filler material may have a surface Shore D hardness ranging from 40 to 60. As mentioned above, the filler material may be associated with a relatively high coefficient of restitution (COR). The filler material may be associated with a first COR ($COR_1$) and the face portion 2462 may be associated with a second COR ($COR_2$), which may be similar or different from the first COR. The first and second CORs may be associated with a COR ratio (e.g., $COR_{12}$ ratio=$COR_1/COR_2$ or $COR_{21}$ ratio=$COR_2/COR_1$). In one example, the COR ratio may be less than two (2). In another example, the COR ratio may be in a range from about 0.5 to about 1.5. In yet another example, the COR ratio may be in a range from about 0.8 to about 1.2. The apparatus, methods, and articles of manufacture described herein are not limited in this regard.

The golf club head 100 may be associated with a third COR ($COR_3$), which may be similar or different from the first COR and/or the second COR. As mentioned above, the filler material may be associated with the first COR. The first and third CORs may be associated with a COR ratio (e.g., $COR_{13}$ ratio=$COR_1/COR_3$ or $COR_{31}$ ratio=$COR_3/COR_1$). In one example, the COR ratio may be less than two (2). In another example, the COR ratio may be in a range from about 0.5 to about 1.5. In yet another example, the COR ratio may be in a range from about 0.8 to about 1.2. The apparatus, methods, and articles of manufacture described herein are not limited in this regard.

The CORs of the filler material, the face portion 162, and/or the golf club head 100 (e.g., the first COR ($COR_1$), the second COR ($COR_2$), and/or the third COR ($COR_3$), respectively) may be measured by methods similar to methods that measure the COR of a golf ball and/or a golf club head as defined by one or more golf standard organizations and/or governing bodies (e.g., United States Golf Association (USGA)). In one example, an air cannon device may launch or eject an approximately 1.55 inch (38.1 mm) spherical sample of the filler material at an initial velocity toward a steel plate positioned at about 4 feet (1.2 meters) away from the air cannon device. The sample may vary in size, shape or any other configuration. A speed monitoring device may be located at a distance in a range from 2 feet (0.6 meters) to 3 feet (0.9 meters) from the air cannon device. The speed monitoring device may measure a rebound velocity of the sample of the filler material after the sample of the filler material strikes the steel plate. In one example, the rebound velocity may be greater than or equal to 2 meters per second (m/s). In another example, the rebound velocity may be greater than or equal to 2.5 m/s. In yet another example, the rebound velocity may be greater than or equal to 3 m/s. The COR may be the rebound velocity divided by the initial velocity. The apparatus, methods, and articles of manufacture described herein are not limited in this regard.

In one example, an air cannon device may launch or eject a testing golf ball (e.g., as defined by the USGA) at an initial velocity toward a plate-shaped sample of the filler material with a rigid backing (e.g., a metal plate) positioned at about 4 feet (1.2 meters) away from the air cannon device. The plate-shaped sample of the filler material may have sufficient thickness depending on the elasticity of the filler material so that the striking golf ball compresses the filler material within the elastic range of the filler material. The thickness of the plate-shaped sample of the filler material may vary based on the elasticity of the filler material. For example, the plate-shaped sample of the filler material may have a thickness ranging from about 1 inch to about 5 inches. A speed monitoring device may be located at a distance in a range from 2 feet (0.6 meters) to 3 feet (0.9 meters) from the air cannon device. The speed monitoring device may measure a rebound velocity of the golf ball after the golf ball strikes the plate-shaped sample of the filler material. The method of measuring COR of the filler material may be repeated with multiple samples of the same brand and model of golf balls (i.e., identical or substantially identical golf balls). In one example, the rebound velocity may be greater than or equal to 2 meters per second (m/s). In another example, the rebound velocity may be greater than or equal to 2.5 m/s. In yet another example, the rebound velocity may be greater than or equal to 3 m/s. The COR may be the rebound velocity divided by the initial velocity. The apparatus, methods, and articles of manufacture described herein are not limited in this regard.

In another example, a drop test procedure may be used to determine the COR of the filler material. An approximately 1.68 inch (42.6 mm) spherical sample of the filler material may be dropped onto a horizontally positioned steel plate from a certain drop distance. A bounce distance, which is the distance by which the spherical sample of the filler material bounces from the steel plate may be measured. The COR may be the bounce distance divided by the drop distance. The apparatus, methods, and articles of manufacture described herein are not limited in this regard.

In yet another example, a drop test procedure may be used to determine the COR of the filler material. A USGA testing golf ball may be dropped onto a horizontally positioned plate-shaped sample of the filler material with a rigid backing (e.g., a metal plate) from a certain drop distance. The plate-shaped sample of the filler material may have sufficient thickness depending on the elasticity of the filler material so that the dropped golf ball compresses the filler material within the elastic range of the filler material. In one example, the plate-shaped sample of the filler material may have a thickness ranging from about 1 inch to about 5 inches. A bounce distance, which may be the distance by which the golf ball bounces from the plate-shaped filler material is then measured. The method of measuring COR of the filler material may be repeated with multiple samples of the same brand and model of golf balls (i.e., identical or substantially identical golf balls). The COR may be the bounce distance divided by the drop distance. The apparatus, methods, and articles of manufacture described herein are not limited in this regard.

In one example, the filler material may have a COR value in a range from approximately 0.50 to approximately 0.95 when measured with an initial velocity in a range from 100 ft/s (30.48 m/s) to 250 ft/s (76.2 m/s). In another example, the filler material may have a COR value in a range from approximately 0.65 to approximately 0.85 when measured with an initial velocity in a range from 100 ft/s (30.48 m/s) to 150 ft/s (45.72 m/s). In another example, the filler material may have a COR value in a range from approximately 0.75 to approximately 0.8 when measured with an initial velocity in a range 100 ft/s (30.48 m/s) to 150 ft/s (45.72 m/s). In another example, the filler material may have a COR value in a range from approximately 0.55 to approximately 0.90 when measured with an initial velocity in a range from 100 ft/s (30.48 m/s) and 250 ft/s (76.2 m/s). In another example, the filler material may have a COR value in a range from approximately 0.75 to approximately 0.85 when measured with an initial velocity in a range 110 ft/s (33.53 m/s) to 200 ft/s (60.96 m/s). In yet another example, the filler material may have a COR value in a range from approximately 0.8 to approximately 0.9 when measured with an initial velocity of about 125 ft/s (38.1 m/s). Further, the filler material may have a COR value greater than or equal to 0.8 at an initial velocity of about 143 ft/s (43.6 m/s). While a particular example may be described above, other methods may be used to measure the CORs of the filler material, the face portion 162, and/or the golf club head 100. The apparatus, methods, and articles of manufacture described herein are not limited in this regard.

When the face portion 162 of the golf club head 100 strikes a golf ball, the face portion 162 and the filler material may deform and/or compress. The kinetic energy of the impact may be transferred to the face portion 162 and/or the filler material. For example, some of the kinetic energy may be transformed into heat by the filler material or work done in deforming and/or compressing the filler material. Further, some of the kinetic energy may be transferred back to the golf ball to launch the golf ball at a certain velocity. A filler material with a relatively higher COR may transfer relatively more kinetic energy to the golf ball and dissipate relatively less kinetic energy. Accordingly, a filler material with a relatively high COR may generate relatively higher golf ball speeds because a relatively greater part of the kinetic energy of the impact may be transferred back to the golf ball to launch the golf ball from the golf club head 100.

The filler material may include a bonding portion. In one example, the bonding portion may be one or more bonding agents including thermoset polymers having bonding properties (e.g., one or more adhesive or epoxy materials). For example, the bonding agent may assist in bonding or adhering the filler material to at least the back surface 166 of the face portion 162. The bonding agent may also absorb shock, isolate vibration, and/or dampen noise when the golf club head 100 strikes a golf ball via the face portion 162. Further, the bonding agent may be an epoxy material that may be flexible or slightly flexible when cured. In one example, the filler material may include any of the 3M™ Scotch-Weld™ DP100 family of epoxy adhesives (e.g., 3M™ Scotch-Weld™ Epoxy Adhesives DP100, DP100 Plus, DP100NS and DP100FR), which are manufactured by 3M corporation of St. Paul, Minn. In another example, the filler material may include 3M™ Scotch-Weld™ DP100 Plus Clear adhesive. In yet another example, the filler material may include low-viscosity, organic, solvent-based solutions and/or dispersions of polymers and other reactive chemicals such as MEGUM™, ROBOND™, and/or THIXON™ materials manufactured by the Dow Chemical Company, Auburn Hills, Mich. In yet another example, the filler material may be LOCTITE® materials manufactured by Henkel Corporation, Rocky Hill, Conn. The apparatus, methods, and articles of manufacture described herein are not limited in this regard.

Further, the filler material may include a combination of one or more bonding agents such as any of the bonding agents described herein and one or more polymer materials such as any of the polymer materials described herein. In one example, the filler material may include one or more bonding agents that may be used to bond the polymer material to the back surface 166 of the face portion 162. The one or more bonding agents may be applied to the back surface 166 of the face portion 162. The filler material may further include one or more polymer materials may partially or entirely fill the remaining portions of the interior cavity 700. Accordingly, two or more separate materials may partially or entirely fill the interior cavity 700. The apparatus, methods, and articles of manufacture described herein are not limited in this regard.

The filler material may only include one or more polymer materials that adhere to inner surface(s) of the interior cavity 700 without a separate bonding agent (e.g., an adhesive or epoxy material). For example, the filler material may include a mixture of one or more polymer materials and one or more bonding agents (e.g., adhesive or epoxy material(s)). Accordingly, the mixture including the one or more polymer materials and the one or more bonding agents may partially or entirely fill the interior cavity 700 and adhere to inner surface(s) of the interior cavity 700. In another example, the interior cavity 700 may be partially or entirely filled with one or more polymer materials without any bonding agents. In yet another example, the interior cavity 700 may be partially or entirely filled with one or more bonding agents and/or adhesive materials such as an adhesive or epoxy material. The apparatus, methods, and articles of manufacture described herein are not limited in this regard.

Figure 15:
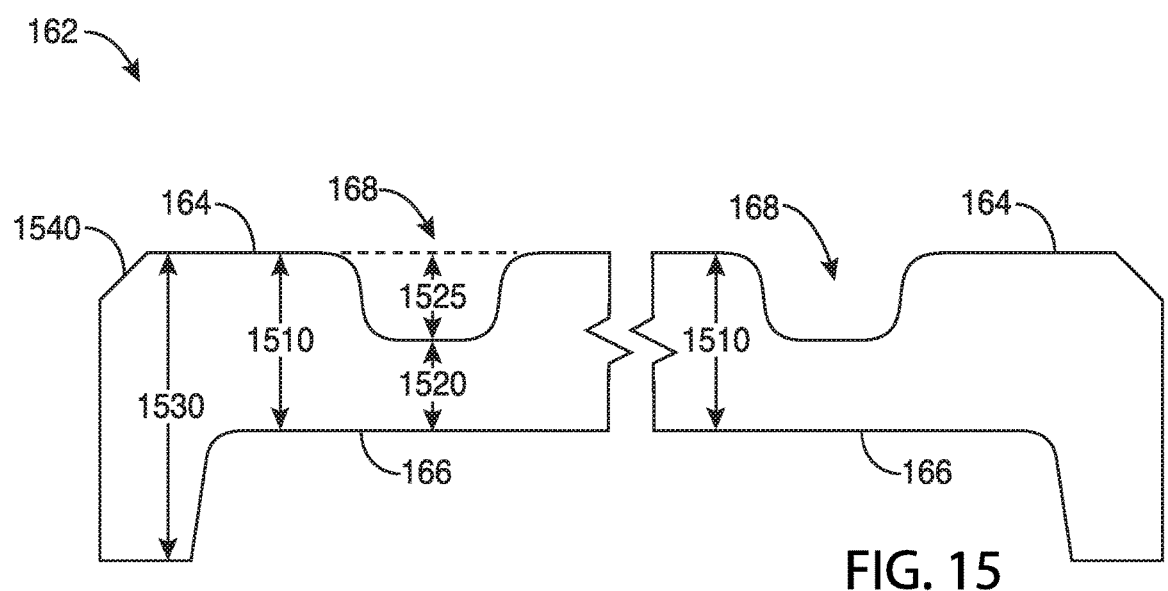
FIG. 15 depicts a cross-sectional view of a face portion of the example golf club head of FIG. 1.

Turning to FIG. 15, for example, a thickness of the face portion 162 may be a first thickness 1510 ($T_1$) or a second thickness 1520 ($T_2$). The first thickness 1510 may be a thickness of a section of the face portion 162 adjacent to a groove 168 whereas the second thickness 1520 may be a thickness of a section of the face portion 162 below the groove 168. For example, the first thickness 1510 may be a maximum distance between the front surface 164 and the back surface 166. The second thickness 1520 may be based on the groove 168. In particular, the groove 168 may have a groove depth 1525 ($D_{groove}$). The second thickness 1520 may be a maximum distance between the bottom of the groove 168 and the back surface 166. The sum of the second thickness 1520 and the groove depth 1525 may be substantially equal to the first thickness 1510 (e.g., $T_2+D_{groove}=T_1$). Accordingly, the second thickness 1520 may be less than the first thickness 1510 (e.g., $T_2<T_1$).

To lower and/or move the CG of the golf club head 100 further back, mass from the front portion 160 of the golf club head 100 may be removed by using a relatively thinner face portion 162. For example, the first thickness 1510 or the second thickness 1520 may be less than or equal to 0.1 inch (2.54 millimeters). In another example, the first thickness 1510 may be about 0.075 inch (1.905 millimeters) (e.g., $T_1=0.075$ inch). With the support of the back wall portion 1410 to form the interior cavity 700 and filling at least a portion of the interior cavity 700 with an elastic polymer material, the face portion 162 may be relatively thinner (e.g., $T_1<0.075$ inch) without degrading the structural integrity, sound, and/or feel of the golf club head 100. In one example, the first thickness 1510 may be less than or equal to 0.060 inch (1.524 millimeters) (e.g., $T1\leq 0.060$ inch). In another example, the first thickness 1510 may be less than or equal to 0.040 inch (1.016 millimeters) (e.g., $T_1\leq 0.040$ inch). Based on the type of material(s) used to form the face portion 162 and/or the body portion 110, the face portion 162 may be even thinner with the first thickness 1510 being less than or equal to 0.030 inch (0.762 millimeters) (e.g., $T_1\leq 0.030$ inch). The groove depth 1525 may be greater than or equal to the second thickness 1520 (e.g., $D_{groove}\geq T_2$). In one example, the groove depth 1525 may be about 0.020 inch (0.508 millimeters) (e.g., $D_{groove}=0.020$ inch). Accordingly, the second thickness 1520 may be about 0.010 inch (0.254 millimeters) (e.g., $T_2=0.010$ inch). In another example, the groove depth 1525 may be about 0.015 inch (0.381 millimeters), and the second thickness 1520 may be about 0.015 inch (e.g., $D_{groove}=T_2=0.015$ inch). Alternatively, the groove depth 1525 may be less than the second thickness 1520 (e.g., $D_{groove}<T_2$). Without the support of the back wall portion 1410 and the elastic polymer material to fill in the interior cavity 700, a golf club head may not be able to withstand multiple impacts by a golf ball on a face portion. In contrast to the golf club head 100 as described herein, a golf club head with a relatively thin face portion but without the support of the back wall portion 1410 and the elastic polymer material to fill in the interior cavity 700 (e.g., a cavity-back golf club head) may produce unpleasant sound (e.g., a tinny sound) and/or feel during impact with a golf ball. The apparatus, methods, and articles of manufacture described herein are not limited in this regard.

Based on manufacturing processes and methods used to form the golf club head 100, the face portion 162 may include additional material at or proximate to a periphery of the face portion 162. Accordingly, the face portion 162 may also include a third thickness 1530, and a chamfer portion 1540. The third thickness 1530 may be greater than either the first thickness 1510 or the second thickness 1520 (e.g., $T_3>T_1>T_2$). In particular, the face portion 162 may be coupled to the body portion 110 by a welding process. For example, the first thickness 1510 may be about 0.030 inch (0.762 millimeters), the second thickness 1520 may be about 0.015 inch (0.381 millimeters), and the third thickness 1530 may be about 0.050 inch (1.27 millimeters). Accordingly, the chamfer portion 1540 may accommodate some of the additional material when the face portion 162 is welded to the body portion 110.

Figure 16:
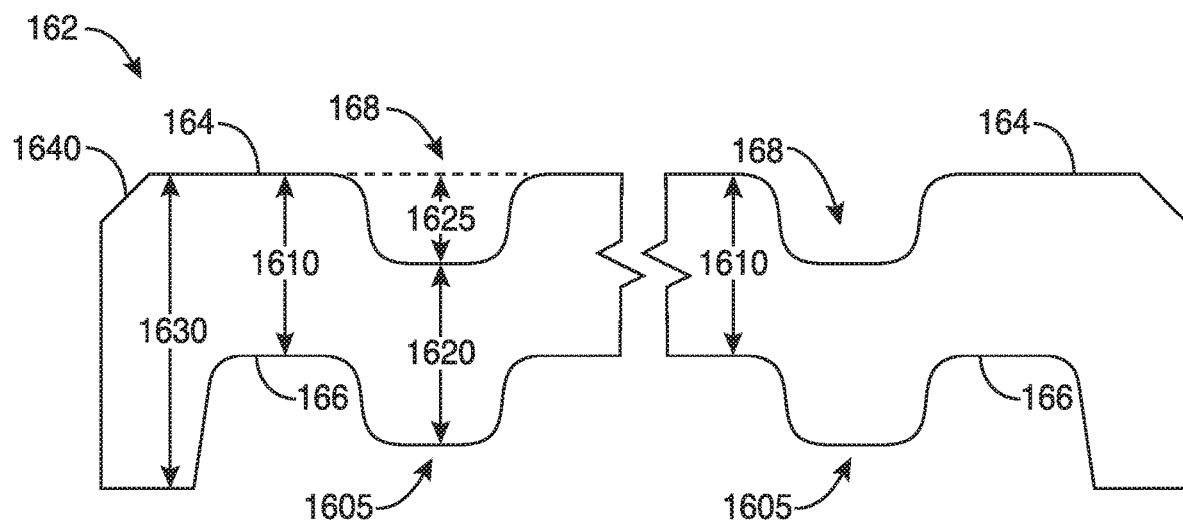
FIG. 16 depicts a cross-sectional view of another face portion of the example golf club head of FIG. 1.

As illustrated in FIG. 16, for example, the face portion 162 may include a reinforcement section, generally shown as 1605, below one or more grooves 168. In one example, the face portion 162 may include a reinforcement section 1605 below each groove. Alternatively, face portion 162 may include the reinforcement section 1605 below some grooves (e.g., every other groove) or below only one groove. The face portion 162 may include a first thickness 1610, a second thickness 1620, a third thickness 1630, and a chamfer portion 1640. The groove 168 may have a groove depth 1625. The reinforcement section 1605 may define the second thickness 1620. The first and second thicknesses 1610 and 1620, respectively, may be substantially equal to each other (e.g., $T_1=T_2$). In one example, the first and second thicknesses 1610 and 1620, respectively, may be about 0.030 inch (0.762 millimeters) (e.g., $T_1=T_2=0.030$ inch). The groove depth 1625 may be about 0.015 inch (0.381 millimeters), and the third thickness 1630 may be about 0.050 inch (1.27 millimeters). The groove 168 may also have a groove width. The width of the reinforcement section 1605 may be greater than or equal to the groove width. The apparatus, methods, and articles of manufacture described herein are not limited in this regard.

Alternatively, the face portion 162 may vary in thickness at and/or between the top portion 180 and the sole portion 190. In one example, the face portion 162 may be relatively thicker at or proximate to the top portion 180 than at or proximate to the sole portion 190 (e.g., thickness of the face portion 162 may taper from the top portion 180 towards the sole portion 190). In another example, the face portion 162 may be relatively thicker at or proximate to the sole portion 190 than at or proximate to the top portion 180 (e.g., thickness of the face portion 162 may taper from the sole portion 190 towards the top portion 180). In yet another example, the face portion 162 may be relatively thicker between the top portion 180 and the sole portion 190 than at or proximate to the top portion 180 and the sole portion 190 (e.g., thickness of the face portion 162 may have a bell-shaped contour). The apparatus, methods, and articles of manufacture described herein are not limited in this regard. As described herein, the interior cavity 700 may be partially or fully filled with a filler material, which may be a polymer material, a bonding agent (such as an adhesive or epoxy material), or a combination of polymer material(s) and bonding agent(s) to at least partially provide structural support for the face portion 162. In particular, the filler material may also provide vibration and/or noise dampening for the body portion 110 when the face portion 162 strikes a golf ball. Alternatively, the filler material may only provide vibration and/or noise dampening for the body portion 110 when the face portion 162 strikes a golf ball. In one example, the body portion 110 of the golf club head 100 (e.g., an iron-type golf club head) may have a body portion volume ($V_b$) between about 2.0 cubic inches (32.77 cubic centimeters) and about 4.2 cubic inches (68.83 cubic centimeters). The volume of the filler material filling the interior cavity ($V_e$), such as the interior cavity 700, may be between 0.5 and 1.7 cubic inches (8.19 and 27.86 cubic centimeters, respectively). A ratio of the filler material volume ($V_e$) to the body portion volume ($V_b$) may be expressed as:

$$0.2 \le \frac{V_e}{V_b} \le 0.5$$

Where: $V_e$ is the filler material volume in units of in$^3$, and
$V_b$ is the body portion volume in units of in$^3$.

In another example, the ratio of the filler material volume ($V_e$) to the body portion volume ($V_b$) may be between about 0.2 and about 0.4. In yet another example, the ratio of the filler material volume ($V_e$) to the body portion volume ($V_b$) may be between about 0.25 and about 0.35. The apparatus, methods, and articles of manufacture described herein are not limited in this regard.

Based on the amount of filler material filling the interior cavity, for example, the thickness of the face portion may be between about 0.025 inches (0.635 millimeters) and about 0.1 inch (2.54 millimeters). In another example, the thickness of the face portion ($T_f$) may be between about 0.02 inches (0.508 millimeters) and about 0.09 inches (2.286 millimeters). The thickness of the face portion ($T_f$) may depend on the volume of the filler material in the interior cavity ($V_e$), such as the interior cavity 700. The ratio of the thickness of the face portion ($T_f$) to the volume of the filler material ($V_e$) may be expressed as:

$$0.01 \le \frac{T_f}{V_b} \le 0.2$$

Where: $T_f$ is the thickness of the face portion in units of inches, and
$V_e$ is the filler material volume in units of in$^3$.

In one example, the ratio of the thickness of the face portion ($T_f$) to the volume of the filler material ($V_e$) may be between 0.02 and 0.09. In another example, the ratio of the thickness of the face portion ($T_f$) to the volume of the filler material ($V_e$) may be between 0.04 and 0.14. The thickness of the face portion ($T_f$) may be the same as $T_1$ and/or $T_2$ mentioned above. The apparatus, methods, and articles of manufacture described herein are not limited in this regard.

The thickness of the face portion ($T_f$) may depend on the volume of the filler material in the interior cavity ($V_e$), such as the interior cavity 700, and the body portion volume ($V_b$). The volume of the filler material ($V_e$) may be expressed as:

$$V_e = a*V_b b \pm c*T_f$$

$$a \cong 0.48$$

$$b \cong -0.38$$

$$0 \le c \le 10$$

Where: $V_e$ is the filler material volume in units of in$^3$,
$V_b$ is the body portion volume in units of in$^3$, and
$T_f$ is the thickness of the face portion in units of inches.

As described herein, for example, the body portion volume ($V_b$) may be between about 2.0 cubic inches (32.77 cubic centimeters) and about 4.2 cubic inches (68.83 cubic centimeters). In one example, the thickness of the face portion ($T_f$) may be about 0.03 inches (0.762 millimeters). In another example, the thickness of the face portion ($T_f$) may be about 0.06 inches (1.524 millimeters). In yet another example, the thickness of the face portion ($T_f$) may be about 0.075 inches (1.905 millimeters). The apparatus, methods, and articles of manufacture described herein are not limited in this regard.

Further, the volume of the filler material ($V_e$) when the interior cavity is fully filled with the filler material may be similar to the volume of the interior cavity ($V_c$). Accordingly, when the interior cavity is fully filled with a filler material, the volume of the filler material ($V_e$) in any of the equations provided herein may be replaced with the volume of the interior cavity ($V_c$). Accordingly, the above equations expressed in terms of the volume of the interior cavity ($V_c$) may be expressed as:

$$0.2 \le \frac{Vc}{Vb} \le 0.5$$

$$0.01 \le \frac{Tf}{Vc} \le 0.2$$

$$Vc = a \cdot Vb + b \pm c \cdot Tf$$

$$a \cong 0.48$$

$$b \cong -0.38$$

$$0 \le c \le 10$$

Where: $V_c$ is the volume of the interior cavity in units of in$^3$,
$V_b$ is the body portion volume in units of in$^3$, and
$T_f$ is the thickness of the face portion in units of inches.

As described herein, the filler material may include a bonding agent that may be bonded to the back surface 166 of the face portion 162 to attach the remaining portions of the filler material to the back surface 166 of the face portion 162, dampen noise and vibration, provide a certain feel and sound for the golf club head, and/or at least partially structurally support the face portion 162. The thickness of the bonding agent and/or a portion of the filler material may depend on a thickness of the face portion 162. In one example, a relationship between a thickness of the face portion 162 and a thickness of a bonding agent and/or a portion of the filler material may be expressed as:

$$0.1 \leq \frac{T_f}{V_a} \leq 4.0$$

Where:
T$_f$ is the thickness of the face portion in units of inches, and
T$_a$ is the thickness of the bonding agent and/or the thickness of the filler material in units of inches.

In one example, the bonding agent and/or the filler material may have a thickness ranging from 0.02 inch (0.51 millimeters) to 0.2 inch (5.08 millimeters). In another example, the bonding agent and/or the filler material may be have a thickness ranging from 0.04 inch (0.1.02 millimeters) to 0.08 inch (2.03 millimeters). In another example, the bonding agent and/or the filler material may be have a thickness ranging from 0.03 inch (0.76 millimeters) to 0.06 inch (1.52 millimeters). In yet another example, the bonding agent and/or the filler material may have a thickness ranging from 0.01 inch (0.25 millimeters) to 0.3 inch (7.62 millimeters). The apparatus, methods, and articles of manufacture described herein are not limited in this regard.

Figure 17:
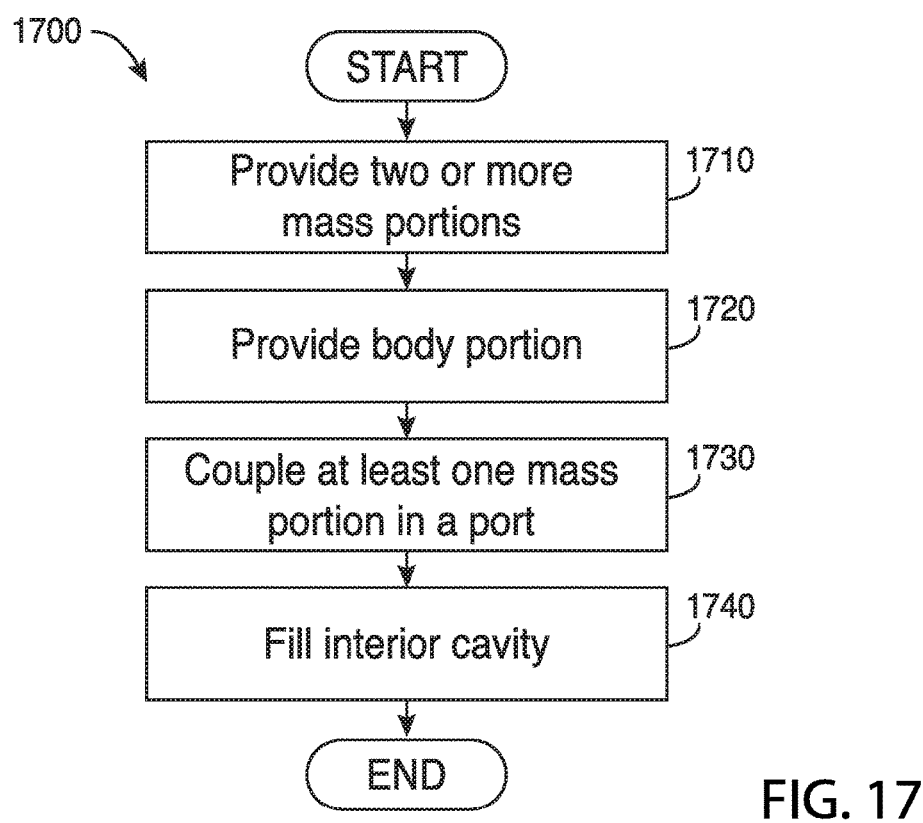
FIG. 17 depicts one manner in which the example golf club head described herein may be manufactured.

FIG. 17 depicts one manner in which the example golf club head described herein may be manufactured. In the example of FIG. 17, the process 1700 may begin with providing one or more mass portions, generally shown as the first and second sets of mass portions 120 and 130, respectively (block 1710). The first set of mass portions 120 and/or the second set of mass portions 130 may be made of a first material such as a tungsten-based material, a titanium-based material, a steel-based material, an aluminum-based material, a non-metal material, any combination thereof, or other suitable type of materials. In one example, the mass portions of the first and second sets of mass portions 120 and 130, respectively, may be tungsten-alloy screws.

The process 1700 may provide a body portion 110 having the face portion 162, the interior cavity 700, and the back portion 170 with two or more ports, generally shown as 1420 and 1430 (block 1720). The body portion 110 may be made of a second material, which may be different than the first material or similar to the first material. The body portion 110 may be manufactured using an investment casting process, a billet forging process, a stamping process, a computer numerically controlled (CNC) machining process, a die casting process, any combination thereof, or other suitable manufacturing processes. In one example, the body portion 110 may be made of 17-4 PH stainless steel using a casting process. In another example, the body portion 110 may be made of other suitable type of stainless steel (e.g., Nitronic® 50 stainless steel manufactured by AK Steel Corporation, West Chester, Ohio) using a forging process. By using Nitronic® 50 stainless steel to manufacture the body portion 110, the golf club head 100 may be relatively stronger and/or more resistant to corrosion than golf club heads made from other types of steel. One or more ports of the body portion 110 may include an opening and a port wall. For example, the port 1421 may include the opening 720 and the port wall 725 with the opening 720 and the port wall 725 being on opposite ends of each other. The interior cavity 700 may separate the port wall 725 of the port 1421 and the back surface 166 of the face portion 162. In a similar manner, the port 1435 may include the opening 730 and the port wall 735 with the opening 730 and the port wall 735 being on opposite ends of each other. The interior cavity 700 may separate the port wall 735 of the port 1435 and the back surface 166 of the face portion 162.

The process 1700 may couple one or more mass portions of the first and second sets of mass portions 120 and 130 into one of the one or more ports (blocks 1730). In one example, the process 1700 may insert and secure the mass portion 121 in the port 1421, and the mass portion 135 in the port 1435. The process 1700 may use various manufacturing methods and/or processes to secure the first set of mass portions 120 and/or the second set of mass portions 130 in the ports such as the ports 1421 and 1435 (e.g., epoxy, welding, brazing, mechanical lock(s), any combination thereof, etc.).

Figure 18:
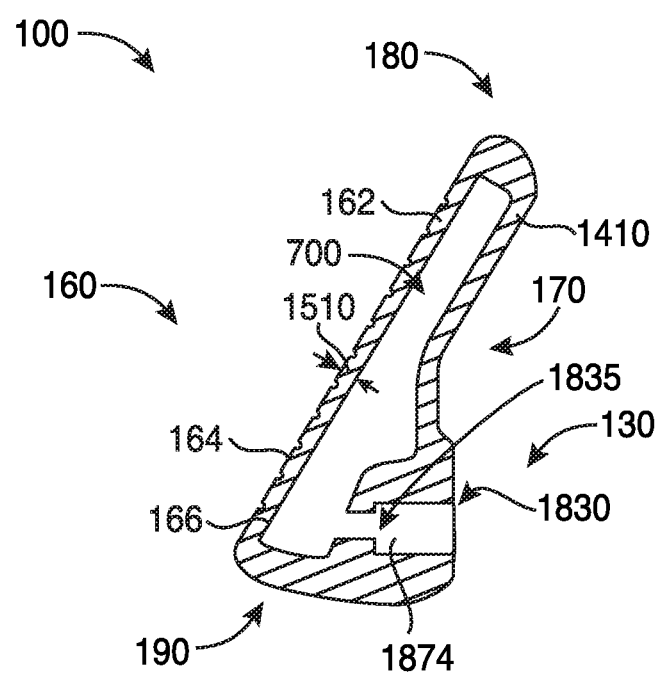
FIG. 18 depicts another cross-sectional view of the example golf club head of FIG. 4 along line 18-18.

The process 1700 may partially or entirely fill the interior cavity 700 with a filler material, which may be one or a combination of a polymer material (e.g., an ethylene copolymer material such as DuPont™ HPF family of materials) (block 1740) and/or a bonding agent (e.g., an adhesive or epoxy material such as 3M™ Scotch-Weld™ Epoxy Adhesives DP100, DP100 Plus, DP100NS and DP100FR). In one example, the filler material may fill at least 50% of the interior cavity 700. The filler material may have a transparent gold color readily identifiable for quality control purposes. As mentioned above, the filler material may absorb shock, isolate vibration, and/or dampen noise in response to the golf club head 100 striking a golf ball. In one example, the interior cavity 700 may be filled with filler material, which may be a polymer material, a thermoplastic elastomer material, a thermoplastic polyurethane material, a bonding agent, and/or a combination thereof. In another example, the interior cavity 700 may be entirely filled with a bonding agent. As illustrated in FIG. 18, for example, the golf club head 100 may include one or more ports (e.g., one shown as 1431 in FIG. 14) with a first opening 1830 and a second opening 1835. The second opening 1835 may be used to access the interior cavity 700. In one example, the process 1700 (FIG. 17) may fill the interior cavity 700 with a filler material by injecting the filler material into the interior cavity 700 from the first opening 1830 via the second opening 1835. The first and second openings 1830 and 1835, respectively, may be the same or different in size and/or shape. While the above example may describe and depict a particular port with a second opening, any other ports of the golf club head 100 may include a second opening (e.g., the port 1421). The apparatus, methods, and articles of manufacture described herein are not limited in this regard.

Referring back to FIG. 17, the example process 1700 is merely provided and described in conjunction with other figures as an example of one way to manufacture the golf club head 100. While a particular order of actions is illustrated in FIG. 17, these actions may be performed in other temporal sequences. For example, two or more actions depicted in FIG. 17 may be performed sequentially, concurrently, or simultaneously. In one example, blocks 1710, 1720, 1730, and/or 1740 may be performed simultaneously or concurrently. Although FIG. 17 depicts a particular number of blocks, the process may not perform one or more blocks. In one example, the interior cavity 700 may not be filled (i.e., block 1740 may not be performed). The apparatus, methods, and articles of manufacture described herein are not limited in this regard. Referring back to FIGS. 1-14, the face portion 162 may include a non-smooth back surface to improve adhesion and/or mitigate delamination between the face portion 162 and the elastic polymer material used to fill the interior cavity 700 (e.g., FIG. 7). Various methods and/or processes such as an abrasive blasting process (e.g., a bead blasting process, a sand blasting process, other suitable blasting process, or any combination thereof) and/or a milling (machining) process may be used to form the back surface 166 into a non-smooth surface. For example, the back surface 166 may have with a surface roughness (Ra) ranging from 0.5 to 250 μin (0.012 to 6.3 μm). The apparatus, methods, and articles of manufacture are not limited in this regard.

Figure 19:
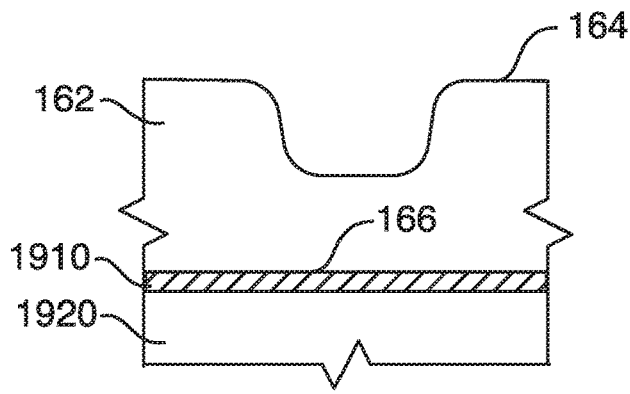
FIG. 19 depicts a cross-sectional view of the example golf club head of FIG. 1.

Referring to FIG. 19, for example, the golf club head 100 may include the face portion 162, a bonding portion 1910, and a polymer material 1920. The bonding portion 1910 may provide connection, attachment and/or bonding of the polymer material 1920 to the face portion 162. In one example, the bonding portion 1910 and/or the polymer material 1920 may define a filler material as described herein. The bonding portion 1910 may be a bonding agent such as any of adhesive or epoxy materials described herein, a tacky material, a combination of bonding agents, a bonding structure or attachment device (i.e., a physical and/or mechanical structure or device), a combination of bonding structures and/or attachment devices, and/or a combination of one or more bonding agents, one or more bonding structures and/or one or more attachment devices. The bonding portion 1910 may be integral with the polymer material 1920 to partially or entirely fill the interior cavity 700. In other words, the polymer material 1920 may include inherent bonding properties. For example, the bonding portion 1910 may be a bonding agent mixed with the polymer material 1920 to provide bonding of the mixture to the back surface 166 of the face portion 162 and/or other inner surface(s) of the body portion 110. In one example, the bonding portion may include one or more surface textures or surface structures on the back surface 166 of the face portion 162 to assist in adhesion of the polymer material to the back surface 166 of the face portion. The apparatus, methods, and articles of manufacture are not limited in this regard.

For example, the golf club head 100 may include a bonding agent such as any adhesive or epoxy materials described herein to improve adhesion and/or mitigate delamination between the face portion 162 and the polymer material 1920 used to fill the interior cavity 700 of the golf club head 100 (e.g., FIG. 7). The bonding portion 1910 may be applied to the back surface 166 of the face portion 162 to bond the polymer material 1920 to the face portion 162 (e.g., extending between the back surface 166 and the polymer material 1920). For example, the bonding portion 1910 may be applied before or during when the interior cavity 700 is filled with the polymer material 1920 via an injection molding process or other suitable process. The apparatus, methods, and articles of manufacture are not limited in this regard.

Figure 20:
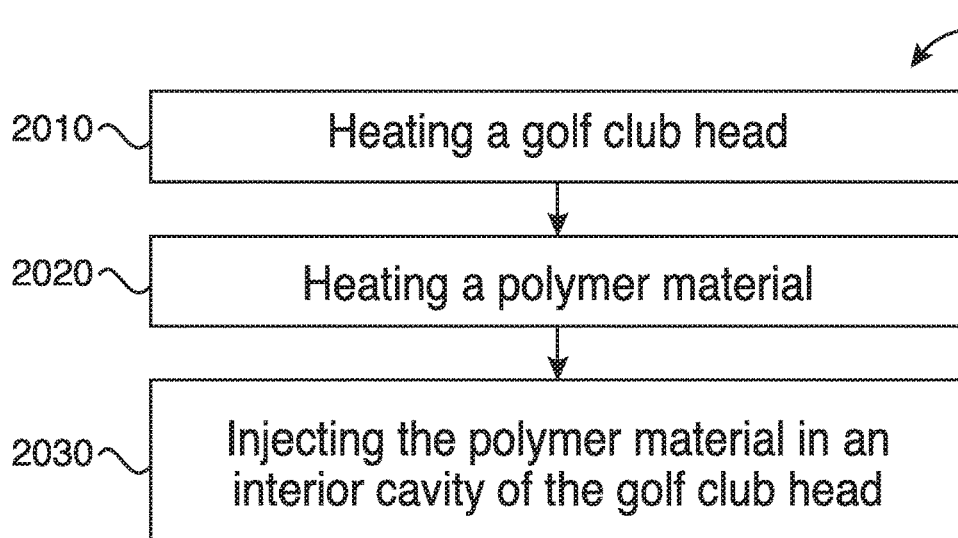
FIG. 20 depicts another manner in which an example golf club head described herein may be manufactured.

FIG. 20 depicts one manner to partially or entirely fill the interior cavity 700 of the golf club head 100 or any of the golf club heads described herein with a filler material. The process 2000 may begin with heating the golf club head 100 to a certain temperature (block 2010). In one example, the golf club head 100 may be heated to a temperature ranging between 150° C. and 250° C., which may depend on factors such as the vaporization temperature of the one or more components of the filler material to be injected in the interior cavity 700. The filler material may then be heated to a certain temperature (block 2020). In one example, the filler material may be a non-foaming and injection-moldable thermoplastic elastomer (TPE) material. Accordingly, the filler material may be heated to reach a liquid or a flowing state prior to being injected into the interior cavity 700. The temperature at which the filler material may be heated may depend on the type of polymer material used to form the filler material. The heated filler material may be injected into the interior cavity 700 to partially or fully fill the interior cavity 700 (block 2030). The filler material may be injected into the interior cavity 700 from one or more of the ports described herein (e.g., one or more ports of the first and second sets of ports 1420 and 1430, respectively, shown in FIG. 14). One or more other ports may allow the air inside the interior cavity 700 displaced by the filler material to vent from the interior cavity 700. In one example, the golf club head 100 may be oriented horizontally as shown in FIG. 14 during the injection molding process. The filler material may be injected into the interior cavity 700 from ports 1431 and 1432. The ports 1421, 1422 and/or 1423 may serve as air ports for venting the displaced air from the interior cavity 700. Thus, regardless of the orientation of the golf club head 100 during the injection molding process, the filler material may be injected into the interior cavity 700 from one or more lower positioned ports while one or more upper positioned ports may serve as air vents. The mold (e.g., the golf club head 100) may then be cooled passively (e.g., at room temperature) or actively so that the filler material reaches a solid state and adheres to the back surface 166 of the face portion 162. The filler material may directly adhere to the back surface 166 of the face portion 162. Alternatively, the filler material may adhere to the back surface 166 of the face portion 162 with the aid of the one or more structures on the back surface 166 and/or the bonding portion 1910 shown in FIG. 19 (e.g., a bonding agent as described herein). The apparatus, methods, and articles of manufacture described herein are not limited in this regard.

As described above, the filler material may be heated to a liquid state (i.e., non-foaming) and may solidify after being injection molded in the interior cavity 700. A filler material with a low modulus of elasticity may provide vibration and/or noise dampening of the face portion 162 when the face portion 162 impacts a golf ball. For example, a polymer material that foams when heated may provide vibration and/or noise dampening. However, such a foaming polymer material may not have sufficient rigidity to provide structural support to a relatively thin face portion because of possible excessive deflection and/or compression of the polymer material when absorbing the impact of a golf ball. In one example, the one or more components of the filler material that is injection molded in the interior cavity 700 may have a relatively high modulus of elasticity to provide structural support to the face portion 162 and yet elastically deflect to absorb the impact forces experienced by the face portion 162 when striking a golf ball. Thus, a non-foaming and injection moldable polymer material with a relatively high modulus of elasticity may be used for partially or entirely filling the interior cavity 700 to provide structural support and reinforcement for the face portion 162 in addition to providing vibration and noise dampening. That is, the non-foaming and injection moldable polymer material may be a structural support portion for the face portion 162. Further, the non-foaming and injection moldable polymer material may have a transparent gold color, which may be visible from the exterior of the golf club head 100. The apparatus, methods, and articles of manufacture are not limited in this regard.

As described herein, the filler material may include a bonding portion. The bonding portion may include an adhesive or epoxy material with a thickness to provide structural support for the face portion 162. Accordingly, the filler material may include a foaming polymer material to provide vibration and noise dampening whereas the bonding portion may provide structural support for the face portion 162. The thickness of the bonding portion may depend on a thickness and physical properties of the face portion 162 as described herein. The apparatus, methods, and articles of manufacture are not limited in this regard.

Figure 21:
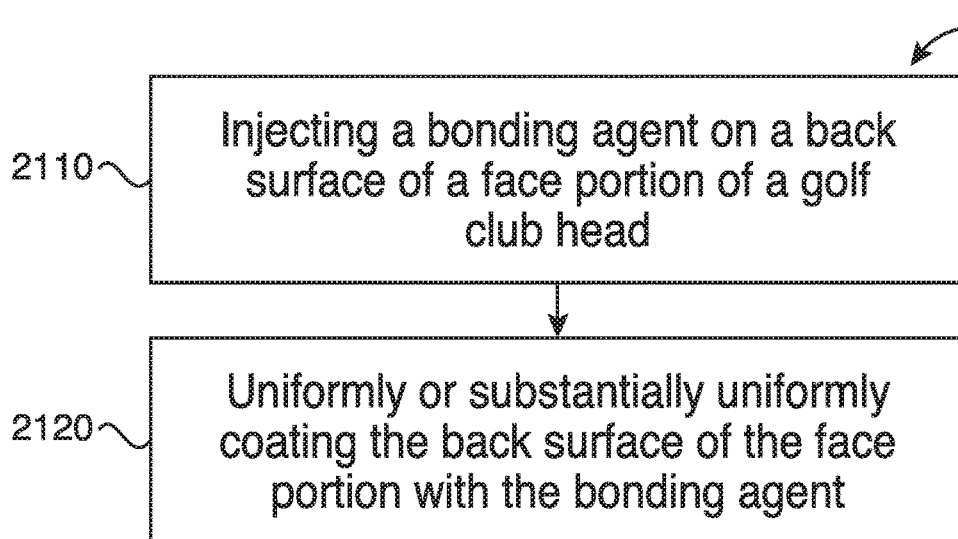
FIG. 21 depicts yet another manner in which an example golf club head described herein may be manufactured.

As described herein, the filler material may include a bonding agent (e.g., an adhesive or epoxy material) and a polymer material. FIG. 21 depicts one manner in which a bonding agent as described herein may be applied to a golf club head prior to partially or entirely filling the interior cavity 700. In the example of FIG. 21, the process 2100 may begin with injecting a bonding agent on the back surface 166 of the face portion 162 (block 2110). The bonding agent may be injected on the back surface 166 prior to or after heating the golf club head as described above depending on the properties of the bonding agent. The bonding agent may be injected through one or more of the first set of ports 1420 and/or the second set of ports 1430. The bonding agent may be injected on the back surface 166 through several or all of the first set of ports 1420 and the second set of ports 1430. For example, an injection instrument such as a nozzle or a needle may be inserted into each port until the tip or outlet of the instrument is near the back surface 166. The bonding agent may then be injected on the back surface 166 from the outlet of the instrument. Additionally, the instrument may be moved, rotated and/or swiveled while inside the interior cavity 700 so that the bonding agent is injected onto an area of the back surface 166 surrounding the instrument. For example, the outlet of the injection instrument may be moved in a circular pattern while inside a port to inject the bonding agent in a corresponding circular pattern on the back surface 166. Each of the first set of ports 1420 and the second set of ports 1430 may be utilized to inject a bonding agent on the back surface 166. However, utilizing all of first set of ports 1420 and/or the second set of ports 1430 may not be necessary. For example, using every other adjacent port may be sufficient to inject a bonding agent on the entire back surface 166. In another example, ports 1421, 1422 1431, 1433 and 1436 may be used to inject the bonding agent on the back surface 166. The apparatus, methods, and articles of manufacture are not limited in this regard.

The process 2100 may also include spreading the bonding agent on the back surface 166 (block 2120) after injection of the bonding agent onto the back surface 166 so that a generally uniform coating of the bonding agent is provided on the back surface 166. According to one example, the bonding agent may be spread on the back surface 166 by injecting air into the interior cavity 700 through one or more of the first set of ports 1420 and the second set of ports 1430. The air may be injected into the interior cavity 700 and on the back surface 166 by inserting an air nozzle into one or more of the first set of ports 1420 and the second set of ports 1430. According to one example, the air nozzle may be moved, rotated and/or swiveled at a certain distance from the back surface 166 so as to uniformly blow air onto the bonding agent to spread the bonding agent on the back surface 166 for a uniform coating or a substantially uniform coating of the bonding agent on the back surface 166. The apparatus, methods, and articles of manufacture are not limited in this regard.

The example process 2100 is merely provided and described in conjunction with other figures as an example of one way to manufacture the golf club head 100. While a particular order of actions is illustrated in FIG. 21, these actions may be performed in other temporal sequences. Further, two or more actions depicted in FIG. 21 may be performed sequentially, concurrently, or simultaneously. The process 2100 may include a single action of injecting and uniformly or substantially uniformly coating the back surface 166 with the bonding agent. In one example, the bonding agent may be injected on the back surface 166 by being converted into fine particles or droplets (i.e., atomized) and sprayed on the back surface 166. Accordingly, the back surface 166 may be uniformly or substantially uniformly coated with the bonding agent in one action (i.e., a substantially uniform coating of bonding agent particles, droplets or beads). A substantially uniform coating of the back surface 166 with the bonding agent may be defined as a coating having slight non-uniformities due to the injection process or the manufacturing process. However, such slight non-uniformities may not affect the bonding of the polymer material to the back surface 166 with the bonding agent as described herein. For example, spraying the bonding agent on the back surface 166 may result in overlapping regions of the bonding agent having a slightly greater coating thickness than other regions of the bonding agent on the back surface 166. The apparatus, methods, and articles of manufacture are not limited in this regard.

Figure 22:
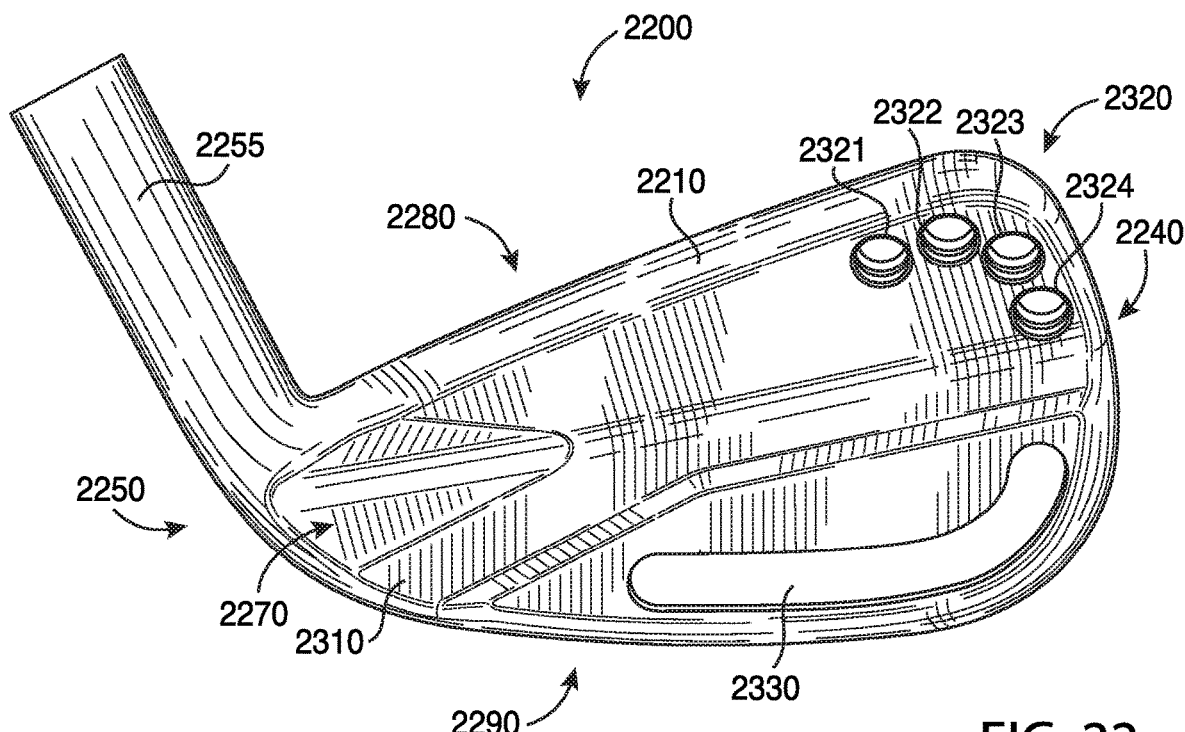
FIG. 22 depicts a rear view of a golf club head according to an embodiment of the apparatus, methods, and articles of manufacture described herein.
Figure 23:
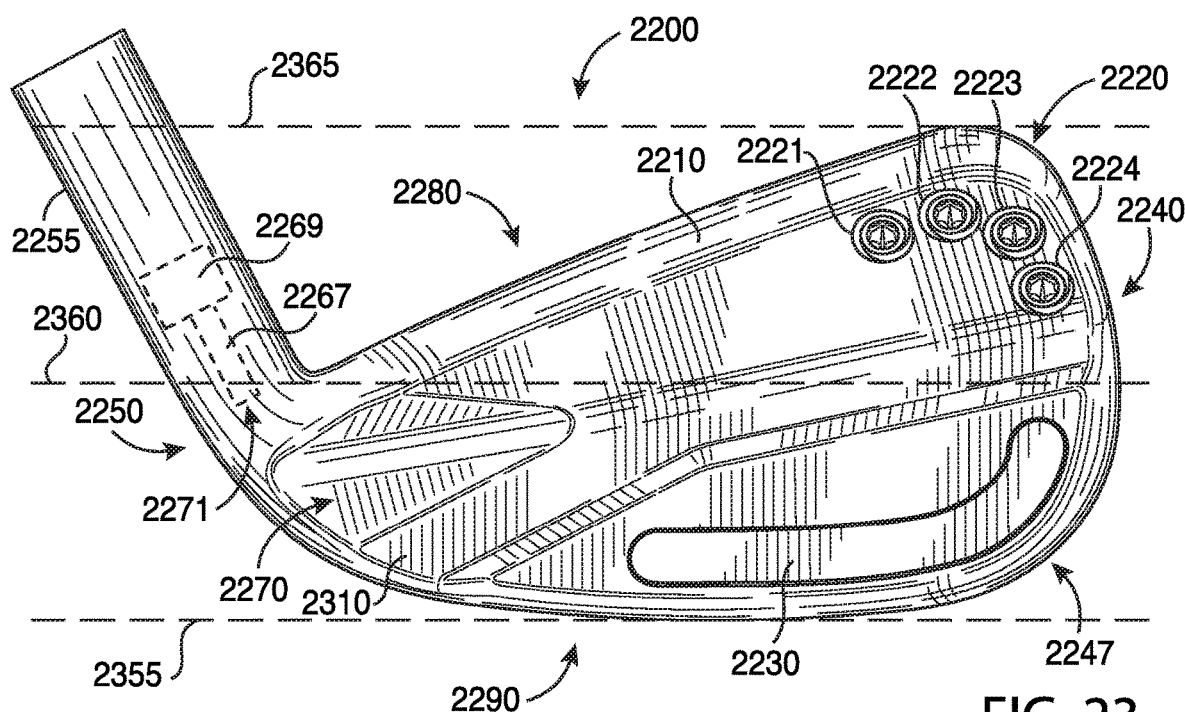
FIG. 23 depicts another rear view of the example golf club head of FIG. 22.

As described herein, any two or more of the mass portions may be configured as a single mass portion. In the example of FIGS. 22 and 23, a golf club head 2200 may include a body portion 2210 and one or more mass portions, generally shown as a first set of mass portions 2220 (e.g., shown as mass portions 2221, 2222, 2223, and 2224) and a second mass portion 2230. The body portion 2210 may be made of a first material whereas the first set of mass portions 2220 and/or the second mass portion 2230 may be made of a second material. The first and second materials may be similar or different materials. The first and second materials of the body portion 2210 and/or the first and second sets of mass portions 2220 and 2230, respectively, may be similar to the first and second materials of the golf club head 100. The body portion 2210 may include a toe portion 2240, a heel portion 2250, a front portion (not shown), a back portion 2270 with a back wall portion 2310, a top portion 2280, and a sole portion 2290. The heel portion 2250 may include a hosel portion 2255 configured to receive a shaft (not shown) with a grip (not shown) on one end, and the golf club head 2200 on the opposite end of the shaft to form a golf club. The front portion may be similar to the front portion 160 of the golf club head 100. Further, the golf club head 2200 may be the same type of golf club head as any of the golf club heads described herein. The apparatus, methods, and articles of manufacture are not limited in this regard.

The body portion 2210 may include one or more ports along a periphery of the body portion 2210, generally shown as a first set of ports 2320 (e.g., shown as ports 2321, 2322, 2323, and 2324) and a second port 2330. Each port of the first set of ports 2320 may be associated with a port diameter and at least one port of the first set of ports 2320 may be separated from an adjacent port similar to any of the ports described herein. The apparatus, methods, and articles of manufacture are not limited in this regard.

One or more mass portion of the first set of mass portions 2220 (e.g., shown as mass portions 2221, 2222, 2223, and 2224) may be disposed in a port of the first set of ports 2320 (e.g., shown as ports 2321, 2322, 2323, and 2324) located at or proximate to the toe portion 2240 and/or the top portion 2280 on the back portion 2270. The physical properties and/or configurations of the first set of ports 2320 and the first set of mass portions 2220 may be similar to the golf club head 100. The apparatus, methods, and articles of manufacture are not limited in this regard.

The second port 2330 may have any configuration and/or extend to and/or between the toe portion 2240 and the heel portion 2250. As illustrated in FIG. 22, for example, the second port 2330 may be a recess extending from the toe portion 2240 or a location proximate to the toe portion 2240 to the sole portion 2290 or a location proximate to the sole portion 2290. Accordingly, the second port 2330 may resemble an L-shaped recess. The second mass portion 2230 may resemble the shape of the second port 2330 and may be disposed in the second port 2330. The second mass portion 2230 may be partially or fully disposed in the second port 2330. The second mass portion 2230 may have any shape such as oval, rectangular, triangular, or any geometric or non-geometric shape. The second port 2330 may be shaped similar to the second mass portion 2230. However, portion(s) of the second mass portion 2230 that are inserted in the second port 2330 may have similar shapes as the second port 2330. In one example (not shown), the second port 2330 may have a generally rectangular shape and located at or near the sole portion 2290 extending to and/or between the toe portion 2240 and the heel portion 2250. Accordingly, at least a portion of the second mass portion 2230 may have a similar shape as the second port 2330. As described herein, any of the mass portions described herein, including the first set of mass portions 2220 and the second mass portion 2230 may be coupled to the back portion 2270 of the body portion 2210 with various manufacturing methods and/or processes (e.g., a bonding process, a welding process, a brazing process, a mechanical locking method, any combination thereof, or other suitable manufacturing methods and/or processes). The second mass portion 2230 may be a polymer material that may be injection molded into the second port 2330 as described herein. Also as described herein, any of the mass portions described herein including the second mass portion 2230 may be integral with the body portion 2210. The apparatus, methods, and articles of manufacture are not limited in this regard.

The second mass portion 2230 may affect the location of the CG of the golf club head 100 and the MOI of the golf club head about a vertical axis that extends through the CG of the golf club head 2200. All or a substantial portion of the second mass portion 2230 may be generally near the sole portion 2290. For example, the second mass portion 2230 may be near the periphery of the body portion 2210 and extend to and/or between the sole portion 2290 and the toe portion 2240. As shown in the example of FIG. 23, the second mass portion 2230 may be located at or proximate to the periphery of the body portion 2210 and partially or substantially extend at or proximate to the sole portion 2290. A portion of the second mass portion 2230 may be located near the periphery of the body portion 2210 and extend to and/or between the sole portion 2290 and the toe portion 2240 to lower the CG and increase the MOI of the golf club head 2200 about a vertical axis that extends through the CG. To lower the CG of the golf club head 2200, all or a portion of the second mass portion 2230 may be located closer to the sole portion 2290 than to a horizontal midplane 2360 of the golf club head 2200. The horizontal midplane 2360 may be vertically halfway between the ground and top planes 2355 and 2365, respectively. The location of the second mass portion 2230 (i.e., the location of the second port 2330) and the physical properties and materials of construction of the mass portions of the second port 2330 may be determined to optimally affect the mass, mass distribution, CG, MOI characteristics, structural integrity and/or or other static and/or dynamic characteristics of the golf club head 2200. The apparatus, methods, and articles of manufacture described herein are not limited in this regard.

In one example, the golf club head 100 may include a badge portion (not shown). The badge portion may be configured to adhere to an exterior surface of the body portion 110 and/or to cover one or more ports (e.g., port 2330) in the body portion 110. The badge portion may install in and/or cover one or more ports in the body portion 110. The badge portion may include a vibration dampening portion having polymer material(s) (e.g., polycarbonate ABS, nylon, or a combination of these materials). For example, the badge portion may include an elastomer material (e.g., butyl rubber) and/or a synthetic elastomer material (e.g., polyurethane, a thermoplastic or thermoset material polymer, or silicone). The badge portion may include a badge mass portion embedded in or otherwise attached to the vibration dampening portion. The badge mass portion may include metal-based material(s) (e.g., steel, aluminum, nickel, cobalt, titanium, or alloys including these materials). The badge portion may be coupled to the body portion 110 with an adhesive, an epoxy, other suitable bonding process, mechanical lock(s), and/or any combination thereof. The badge portion may serve to identify a manufacturer or a model through inclusion of certain text, colors, symbols, logos, and/or trademarks. The apparatus, methods, and articles of manufacture described herein are not limited in this regard.

To balance the mass of a golf club head, such as any of the golf club heads described herein, a golf club head may include one or more hosel mass portions. In one example, the golf club head 2200 may include hosel mass portions 2267 and 2269. The hosel mass portion 2267 may be permanently attached to the hosel portion 2255 whereas the hosel mass portion 2269 may be removable and exchangeable with other hosel mass portions to balance the mass of the golf club head 2200 at the hosel portion 2255. The hosel mass portions 2267 and 2269 may be a third set of mass portions for the golf club head 2200. In one example, the hosel mass portions 2267 and 2269 and the first set of mass portions 2220 may be collectively the first set of mass portions. The apparatus, methods, and articles of manufacture described herein are not limited in this regard.

While the figures may depict a particular number of mass portions in the hosel portion 2255 (e.g., two shown as hosel mass portions 2267 and 2269), the apparatus, methods, and articles of manufacture described herein may include separate mass portions or a single mass portion (e.g., the hosel mass portions 2267 and 2269 may be a single mass portion). The hosel mass portions 2267 and/or 2269 may be the same or different material than the body portion 2210 and/or other mass portions of the golf club head 2200 (e.g., generally shown as 2220 and 2230). The mass of each of the hosel mass portions 2267 and 2269 may be greater than, less than, or equal to the mass of any other mass portions of the golf club head 2200 (e.g., generally shown as 2220 and 2230). Further, the hosel portion 2255 may include one or more ports configured to receive and/or engage one or more mass portions. In one example, a port (e.g. one shown as 2271 in FIG. 23) in the hosel portion 2255 may be connected to an interior cavity (e.g., one schematically shown as 700 in FIG. 7) of the golf club head. The port 2271 in the hosel portion 2255 may include an opening (e.g., one shown as 1835 in FIG. 18). Accordingly, the interior cavity may be partially or entirely filled through an opening of the port 2271 in the hosel portion 2255. For example, the polymer material may be injected into the interior cavity. The hosel mass portions 2267 and/or 2269 may enclose the port 2271 in the hosel portion 2255. In one example, the hosel mass portions 2267 and/or 2269 may be a screw to engage the port 2271 in the hosel portion 2255. In another example, the hosel mass portions 2267 and/or 2269 may not include any threads (i.e., the hosel mass portions 2267 and/or 2269 may be coupled to the port 2271 in the hosel portion 2255 with or without adhesive. The apparatus, methods, and articles of manufacture described herein are not limited in this regard.

Figure 24:
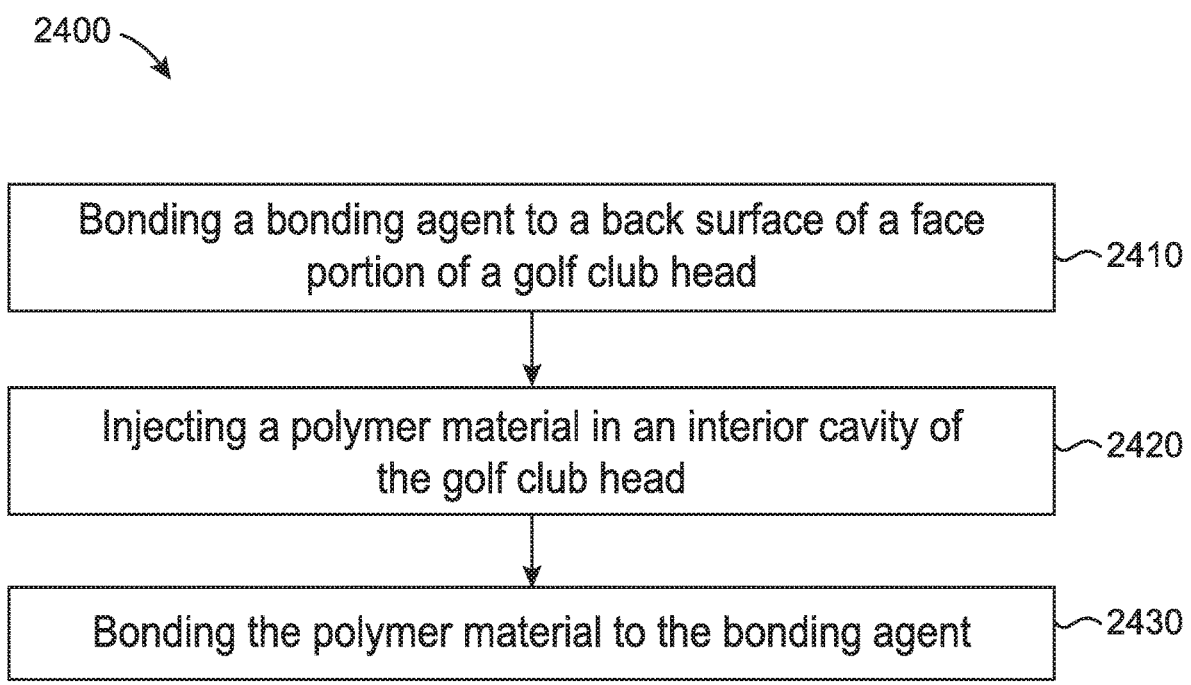
FIG. 24 depicts yet another manner in which an example golf club head described herein may be manufactured.
Figure 25:
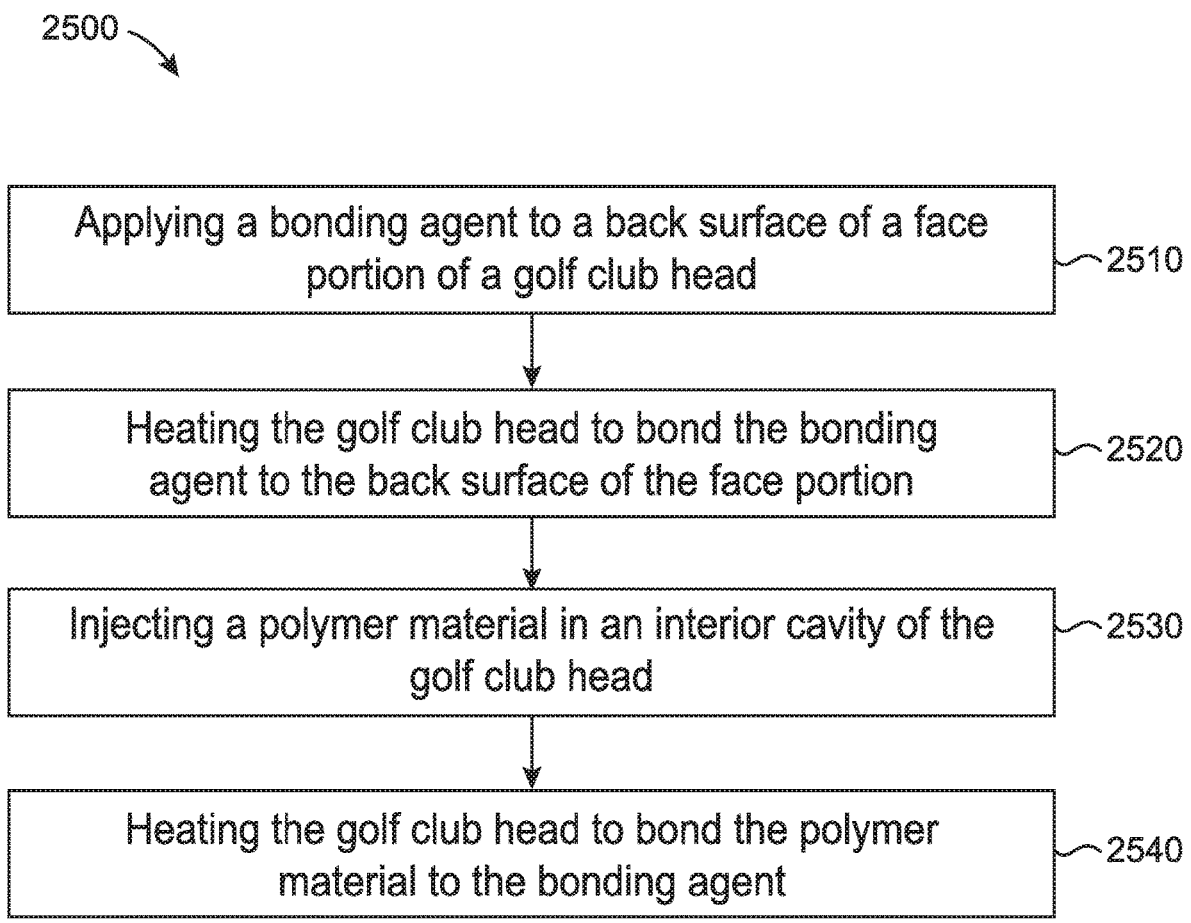
FIG. 25 depicts yet another manner in which an example golf club head described herein may be manufactured.
Figure 26:
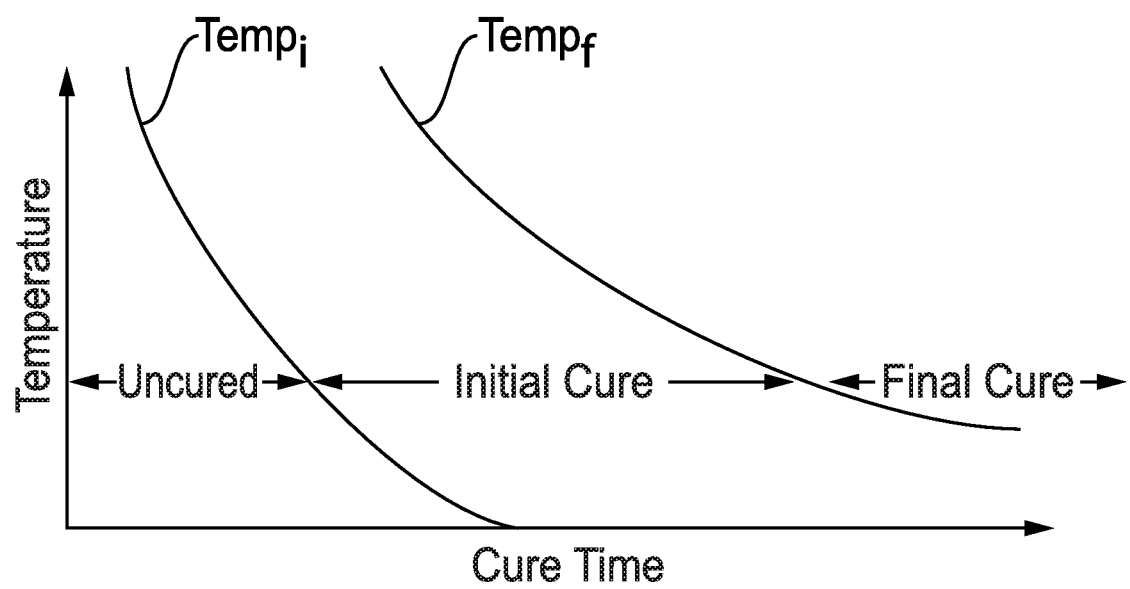
FIG. 26 depicts an example of curing a bonding agent.

For brevity, the description of processes described herein with reference to FIGS. 24-26 may be provided in reference to the golf club head 100. However, any apparatuses, methods, and articles of manufacture described herein are applicable to any of the golf club heads described herein. FIG. 24 depicts one manner that the interior cavity of any of the golf club heads described herein may be partially or entirely filled with one or more filler materials such as any of the filler materials described herein. The example process 2400 may begin with bonding a bonding agent to the back surface 166 of the face portion 162 of the golf club head 100 (block 2410). The bonding agent may have an initial bonding state, which may be a temporary bonding state, and a final bonding state, which may be a permanent bonding state. The initial bonding state and the final bonding states may be activated when the bonding agent is exposed to heat, radiation, and/or other chemical compounds. For example, as described herein, the bonding agent may be an epoxy having an initial cure state and a final cure state that are activated by the epoxy being heated to different temperatures for a period of time, respectively, by conduction, convention, and/or radiation. In another example, the bonding agent may be a bonding material that is activated to an initial bonding state and a final bonding state by being exposed to different doses and/or duration of ultraviolet radiation, respectively. In another example, the bonding agent may be a bonding material that is activated to an initial bonding state and a final bonding state by being exposed to different compounds or different amounts of the same compound, respectively. According to the process 2400, the bonding agent may be bonded to the back surface 166 of the face portion 162 by being activated to the initial bonding state. A polymer material is then injected in the interior cavity 700 of the golf club head 100 (block 2420). The example process 2400 then includes bonding the polymer material to the bonding agent (block 2430). Bonding the polymer material to the bonding agent may include activating the bonding agent to the final bonding state to permanently bond the polymer material to the bonding agent and to permanently bond the bonding agent to the back surface 166 of the face portion 162. The example process 2400 is merely provided and described in conjunction with other figures as an example of one way to manufacture the golf club head 100. While a particular order of actions is illustrated in FIG. 24, these actions may be performed in other temporal sequences. Further, two or more actions depicted in FIG. 24 may be performed sequentially, concurrently, or simultaneously.

FIG. 25 depicts one manner that the interior cavity 700 of the golf club head 100 or any of the golf club heads described herein may be partially or entirely filled with one or more filler materials such any of the filler materials described herein. The process 2500 may begin with applying a bonding agent (e.g., a bonding portion 1910 of FIG. 19) to the back surface 166 of the face portion 162 of the golf club head 100 (block 2510). The bonding agent may be any type of adhesive and/or other suitable materials. In one example, the bonding agent may be an epoxy. Prior to applying the bonding agent, the golf club head 100 may be cleaned to remove any oils, other chemicals, debris or other unintended materials from the golf club head 100 (not shown). The bonding agent may be applied on the back surface 166 as described herein depending on the properties of the bonding agent. The bonding agent may be applied to the back surface 166 of the face portion 162 through one or more of the first set of ports 1420 and/or the second set of ports 1430. For example, the bonding agent may be in liquid form and injected on the back surface 166 through several or all of the first set of ports 1420 and the second set of ports 1430. An injection instrument (not shown) such as a nozzle or a needle may be inserted into each port until the tip or outlet of the injection instrument is near the back surface 166. The bonding agent may then be injected on the back surface 166 from the outlet of the injection instrument. Additionally, the injection instrument may be moved, rotated, and/or swiveled while inside the interior cavity 700 so that the bonding agent may be injected onto an area of the back surface 166 surrounding the injection instrument. For example, the outlet of the injection instrument may be moved in a circular pattern while inside a port to inject the bonding agent in a corresponding circular pattern on the back surface 166. Each of the first set of ports 1420 and the second set of ports 1430 may be utilized to inject a bonding agent on the back surface 166. However, utilizing all of first set of ports 1420 and/or the second set of ports 1430 may not be necessary. For example, using every other adjacent port may be sufficient to inject a bonding agent on the entire back surface 166. In another example, ports 1421, 1422 1431, 1433 and 1436 may be used to inject the bonding agent on the back surface 166. The apparatus, methods, and articles of manufacture are not limited in this regard.

The example process 2500 may also include spreading or overlaying the bonding agent on the back surface 166 (not shown) after injecting the bonding agent onto the back surface 166 so that a generally uniform coating of the bonding agent is provided on the back surface 166. According to one example, the bonding agent may be spread on the back surface 166 by injecting air into the interior cavity 700 through one or more ports of the first set of ports 1420 and/or the second set of ports 1430. The air may be injected into the interior cavity 700 and on the back surface 166 by inserting an air nozzle into one or more ports of the first set of ports 1420 and/or the second set of ports 1430. According to one example, the air nozzle may be moved, rotated and/or swiveled at a certain distance from the back surface 166 to uniformly blow air onto the bonding agent and spread the bonding agent on the back surface 166 for a uniform coating or a substantially uniform coating of the bonding agent on the back surface 166. Further, the golf club head 100 may be pivoted back and forth in one or several directions so that the bonding agent may spread along a portion or substantially the entire area of the back surface 166 of the face portion 162. In one example, the golf club head 100 may be vibrated with the back surface 166 of the face portion 162 in a generally horizontal orientation so that the bonding agent may spread or overlay on the back surface 166 in a uniform coating manner or a substantially uniform coating manner. The apparatus, methods, and articles of manufacture are not limited in this regard.

The example process 2500 is merely provided and described in conjunction with other figures as an example of one way to manufacture the golf club head 100 or any of the golf club heads described herein. While a particular order of actions is illustrated in FIG. 25, these actions may be performed in other temporal sequences. Further, two or more actions depicted in FIG. 25 may be performed sequentially, concurrently, or simultaneously. The example process 2500 may include a single action (not shown) of injecting and uniformly or substantially uniformly coating the back surface 166 with the bonding agent. In one example, the bonding agent may be injected on the back surface 166 by being converted into fine particles or droplets (i.e., atomized) and sprayed on the back surface 166. Accordingly, the back surface 166 may be uniformly or substantially uniformly coated with the bonding agent in one action. A substantially uniform coating of the bonding agent on the back surface 166 may be defined as a coating having slight non-uniformities due to the injection process or the manufacturing process. However, such slight non-uniformities may not affect the bonding of the elastic polymer material or elastomer material to the back surface 166 with the bonding agent as described herein. For example, spraying the bonding agent on the back surface 166 may result in overlapping regions of the bonding agent having a slightly greater coating thickness than other regions of the bonding agent on the back surface 166. The apparatus, methods, and articles of manufacture are not limited in this regard.

In one example as shown in FIG. 26, the bonding agent may be an epoxy having different curing states based on the temperature and the amount of time to which the epoxy may be exposed. The bonding agent may have an uncured state, an initial cure state, and a final cure state. In one example, the uncured state may be a liquid state, the initial cure state may be gel or a semi-solid/semi-liquid state, and the final cure state may be a solid state. The bonding agent may transition from the uncured state to the initial cure state when the bonding agent is heated to a temperature between an initial cure state temperature ($Temp_i$) and a final cure state temperature ($Temp_f$) for a period of time. Accordingly, an initial cure state temperature range may be defined by temperatures that are greater than or equal to the initial cure state temperature $Temp_i$ and less than the final cure state temperature $Temp_f$. The bonding agent may transition from the initial cure state to the final cure state when the bonding agent may be heated to a temperature greater than or equal to the final cure state temperature $Temp_f$ for a period of time. Accordingly, a final cure state temperature range may be defined by temperatures that are greater than or equal to the final cure state temperature $Temp_f$. The initial cure state temperature $Temp_i$ and the final cure state temperature $Temp_f$ may vary based on the amount of time that the bonding agent may be heated. In particular, a transition from the uncured state to the initial cure state and a transition from the initial cure state to the final cure state may be dictated by certain temperature and time profiles based on the properties of the bonding agent. At a temperature below the initial cure temperature $Temp_i$, the bonding agent may be in the uncured state (e.g., a liquid state). In the initial cure state, the bonding agent may form an initial bond with an object and become pliable to be manipulated (e.g., moved, spread, overlay, etc.) without obtaining full cross linking or forming a permanent bond. In other words, the bonding agent may form an initial bond with an object and be manipulated without forming a permanent bond. In the final cure state, the bond of the bonding agent (e.g., cross linking for a bonding agent that includes epoxy) may be complete or become permanently set.

The bonding agent may be applied to the back surface 166 of the face portion 162 when the bonding agent is in the uncured state, which may be a liquid state. Subsequently, the golf club head 100 and/or the bonding agent may be heated to a first temperature $Temp_1$ that is greater than or equal to the initial cure state temperature $Temp_i$ and less than the final cure state temperature $Temp_f$ to change the bonding agent from an uncured state to an initial cure state (i.e., an initial cure state temperature range) (block 2520). Accordingly, the bonding agent may form an initial bond with the back surface 166 of the face portion 162. After bonding the bonding agent to the back surface 166, the golf club head 100 may be cooled for a period of time at ambient or room temperature (not shown). Accordingly, the bonding agent may be in an initial cured state and bonded to the back surface 166 of the face portion 162 so that the bonding agent may be bonded to the back surface 166 during the injection molding of a polymer material in the interior cavity 700. Ambient or room temperature may be defined as a room temperature ranging between 5° C. (32° F.) and 31° C. (104° F.). The first temperature $Temp_1$ and duration by which the golf club head 100 and/or the bonding agent heated to the first temperature $Temp_1$ may depend on the curing or bonding properties of the bonding agent. The apparatus, methods, and articles of manufacture are not limited in this regard.

After the bonding agent is bonded to the back surface 166 of the face portion 162, the golf club head 100 may be heated (i.e., pre-heating the golf club head 100) prior to receiving a polymer material (not shown). The golf club head 100 may be heated so that when the polymer material is injected in the golf club head 100, the polymer material is not cooled by contact with the golf club head and remains in a flowing liquid form to fill the interior cavity 700. The temperature at which the golf club head is heated, which may be referred to herein as a third temperature, may be similar to the temperature of the polymer material when being injected into the interior cavity 700. However, the temperature at which the golf club head is heated may be less than the final cure temperature $Temp_f$ of the bonding agent. Accordingly, the bonding agent may not transition from the initial cure state to the final cured state during the injection molding process. Further, the pre-heating temperature of the golf club head 100 may be determined so that excessive cooling of the golf club head 100 may not be necessary after injection molding the polymer material in the interior cavity 700. Prior to being injected into the interior cavity 700, the polymer material may also be heated to a liquid state (not shown). The temperature at which the polymer material may be heated may depend on the type of polymer material used to partially or fully fill the interior cavity 700. Further, the temperature at which the polymer material is heated may be determined so that shrinkage of the polymer material is reduced during the injection molding process. However, as described herein, the polymer material may be heated to a temperature that is less than the final cure temperature $Temp_f$ of the bonding agent. The apparatus, methods, and articles of manufacture are not limited in this regard.

As described herein, the interior cavity 700 may be partially or fully filled with a polymer material by injecting the polymer material in the interior cavity 700 (block 2530). The injection speed of the polymer material may be determined so that the interior cavity 700 may be slowly filled to provide a better fill while allowing air to escape the interior cavity 700 and allowing the injected polymer material to rapidly cool. For example, the polymer material may be a non-foaming and injection-moldable thermoplastic elastomer (TPE) material. The polymer material may be injected into the interior cavity 700 from one or more of the ports described herein (e.g., one or more ports of the first and second sets of ports 1420 and 1430, respectively, shown in FIG. 14). One or more other ports may allow the air inside the interior cavity 700 displaced by the polymer material to vent from the interior cavity 700. In one example, the golf club head 100 may be oriented horizontally as shown in FIG. 14 during the injection molding process. The polymer material may be injected into the interior cavity 700 from ports 1431 and 1432. The ports 1421, 1422 and/or 1423 may serve as air ports for venting the displaced air from the interior cavity 700. Thus, regardless of the orientation of the golf club head 100 during the injection molding process, the polymer material may be injected into the interior cavity 700 from one or more lower positioned ports while one or more upper positioned ports may serve as air vents.

According to one example, any one of the ports or any air vent of the golf club head 100 used as air port(s) for venting the displaced air may be connected to a vacuum source (not shown) during the injection molding process. Accordingly, air inside the interior cavity 700 and displaced by the polymer material may be removed from the interior cavity 700 by the vacuum source. Accordingly, trapped air pocket(s) in the interior cavity 700 and/or a non-uniform filling of the interior cavity 700 with the polymer material may be reduced. The apparatus, methods, and articles of manufacture described herein are not limited in this regard.

After injecting the polymer material into the interior cavity 700, the golf club head 100 may be heated to a second temperature $Temp_2$ that is greater than or equal to the final cure temperature $Temp_f$ of the bonding agent to reactivate the bonding agent to bond the polymer material to the bonding agent (i.e., a final cure state temperature range) (block 2540). The second temperature $Temp_2$ and the duration by which the golf club head 100 is heated to the second temperature $Temp_2$ may depend on the properties of the bonding agent as shown in FIG. 26 to form a permanent bond between the golf club head 100 and the bonding agent and between the polymer material and the bonding agent. The golf club head 100 may be then cooled at ambient or room temperature (not shown). According to one example, the characteristic time (CT) of the golf club head 100 may be measured (not shown) after manufacturing the golf club head 100 as described herein. CT measurements may determine if the golf club head 100 conforms to CT rules established by one or more golf governing bodies.

In one example, for any of the golf club heads described herein, the thickness of the face portion ($T_f$) may be related to a thickness of the bonding agent ($T_b$) by the following expression:

$$Tb = d*Tf$$

Where:

$$1 \leq d \leq 6$$

$Tf$ is the thickness of the face portion in units of inch, and $Tb$ is the thickness of the bonding agent in units of inch.

In one example, according to the above expression, the thickness of the bonding agent may be similar to the thickness of the face portion. For example, the thickness of the face portion and the thickness of the bonding agent may be 0.050 inch (1.25 mm). In another example, the thickness of the bonding agent may be twice the thickness of the face portion. For example, the thickness of the face portion may be 0.05 inch (1.25 mm) and the thickness of the bonding agent may be 0.1 inch (2.54 mm). In another example, the thickness of the bonding agent may be four times greater than the thickness of the face portion. For example, the thickness of the face portion may be 0.05 inch (1.25 mm) and the thickness of the bonding agent may be 0.2 inch (5.08 mm). In yet another example, the thickness of the bonding agent may be five times greater than to the thickness of the face portion. For example, the thickness of the face portion may be 0.05 inch (1.25 mm) and the thickness of the bonding agent may be 0.3 inch (7.62 mm). The apparatus, methods, and articles of manufacture described herein are not limited in this regard.

In one example, for any of the golf club heads described herein, the hardness of the face portion may be greater than the hardness of the bonding agent, and the hardness of the bonding agent may be greater than the hardness of the polymer material or polymer material that at least partially fills the golf club head as described herein. The relationship between the hardness of the face portion, the hardness of the bonding agent, and the hardness of the polymer material may be expressed as:

$$Df > Db > De$$

Where:
  $Df$ is the hardness of the face portion,
  $Db$ is the hardness of the bonding agent, and
  $De$ is the hardness of the polymer material.

In one example, the hardness of the face portion may be greater than or equal to 35 HRC (Rockwell Hardness C) and less than or equal to 55 HRC. In another example, the hardness of the face portion may be greater than or equal to 45 HRC and less than or equal to 65 HRC. The apparatus, methods, and articles of manufacture described herein are not limited in this regard.

In one example, the hardness of the bonding agent may be greater than or equal to 20 Shore D (Shore durometer hardness type D) and less than or equal to 90 Shore D. In another example, the hardness of the bonding agent may be greater than or equal to 30 Shore D and less than or equal to 60 Shore D. In yet another example, the hardness of the bonding agent may be greater than or equal to 40 Shore D and less than or equal to 50 Shore D. In yet another example, the hardness of the bonding agent may be greater than or equal to 55 Shore D and less than or equal to 70 Shore D. In yet another example, the hardness of the bonding agent may be greater than or equal to 60 Shore D to less than or equal to 75 Shore D. The apparatus, methods, and articles of manufacture described herein are not limited in this regard.

In one example, the hardness of the polymer material at least partially or entirely filling the interior cavity and bonded to the face portion with the bonding agent may be greater than or equal to 5 Shore D (Shore durometer hardness type D) and less than or equal to 25 Shore D. In another example, the hardness of the polymer material at least partially or entirely filling the interior cavity and bonded to the face portion with the bonding agent may be greater than or equal to 10 Shore D and less than or equal to 20 Shore D. In yet another example, the hardness of the polymer material at least partially or entirely filling the interior cavity and bonded to the face portion with the bonding agent may be greater than or equal to 45 Shore D and less than or equal to 65 Shore D. In yet another example, the hardness of the polymer material at least partially or entirely filling the interior cavity and bonded to the face portion with the bonding agent may be greater than or equal to 40 Shore D and less than 80 Shore D. In yet another example, the bonding agent and the polymer material may be selected to have similar or substantially similar hardness characteristics. The apparatus, methods, and articles of manufacture described herein are not limited in this regard.

The thickness of the face portion relative to the thickness of the bonding agent may be related to the relative hardnesses of the face portion material, the bonding agent and/or the polymer material. A relatively thin face portion may be constructed from a relatively harder material to limit the flexure of the face portion and prevent structural damage to the face portion. A relatively thicker face portion may be constructed from a relatively soft material to increase flexure of the face portion to provide improved golf ball trajectory characteristics. The bonding agent may provide structural support to the face portion and further provide dampening and/or reduce vibration and noise. Accordingly, the thickness and/or the hardness of the bonding agent may be related to the thickness and/or hardness of the face portion to provide structural support, vibration and noise reduction and/or dampening to the face portion and or the golf club head and/or to provide improved golf ball trajectory characteristics when the face portion strikes a golf ball. The polymer material may provide structural support to the face portion and further provide dampening and/or reduce vibration and noise. Accordingly, the volume and/or the hardness of the polymer material may be related to the thickness of the face portion, the hardness of the face portion, the thickness of the bonding agent, and/or the hardness of the bonding agent to provide structural support, vibration and noise reduction and/or dampening to the face portion and or the golf club head and/or to provide improved golf ball trajectory characteristics when the face portion strikes a golf ball. The apparatus, methods, and articles of manufacture described herein are not limited in this regard.

In one example, the relative thicknesses of the face portion and the bonding agent may be related to the hardnesses of the face portion, the bonding agent and/or the polymer material. The relative thicknesses of the face portion and the bonding agent may be expressed by the following expressions:

$$d = f(Df, Db, De)$$

or $$d = f(Df, Db)$$

or $$d = f(Db, De)$$

Where:

$$d = Tb/Tf$$

$$Df > Db > De$$

$Df$ is the hardness of the face portion,
$Db$ is the hardness of the bonding agent, and
$De$ is the hardness of the polymer material.

According to the above expression, a ratio of the thickness of the bonding agent and the thickness of the face portion may be a function of the hardness of the material of the face portion, the hardness of the bonding agent, and/or the hardness of the polymer material. In one example, function $f$ may be based on the following expression:

$$d \cong Df/Db$$

According to the above expression, a ratio of the thickness of the bonding agent and the thickness of the face portion (i.e., d in the above expression) may be equivalent to a ratio of the hardness of the material of the face portion and the hardness of the bonding agent. In another example, function $f$ may be based on the following expression:

$$d \cong Df/De$$

According to the above expression, a ratio of the thickness of the bonding agent and the thickness of the face portion (i.e., d in the above expression) may be equivalent to a ratio of the hardness of the material of the face portion and the hardness of the polymer material. In another example, the function $f$ may be based on the following expression:

$$d \cong 2Df/(Db+De)$$

According to the above expression, a ratio of the thickness of the bonding agent and the thickness of the face portion (i.e., d in the above expression) may be equivalent to a ratio of the hardness of the material of the face portion and an average of the hardness of the bonding agent and the hardness of the polymer material. The apparatus, methods, and articles of manufacture described herein are not limited in this regard.

The bonding agent may be any type of bonding agent such as the bonding agents described herein. In one example, the bonding agent may be DP100 Plus Clear epoxy adhesive, DP100 epoxy adhesive, DP420 epoxy adhesive or DP810 epoxy adhesive manufactured by 3M Company of St. Paul, Minn. In another example, the bonding agent may be any type of adhesive material such as epoxy having a hardness within any of the hardness ranges described herein and/or having any of the characteristics described herein. The apparatus, methods, and articles of manufacture described herein are not limited in this regard.

In one example, as described herein, the polymer material may be injection molded in the body portion of any of the golf club heads described herein. In other examples. The polymer material may be made or formed by any useful forming means for forming polymers. This include, molding including compression molding, injection molding, blow molding, and transfer molding; film blowing or casting; extrusion, and thermoforming; as well as by lamination, pultrusion, protrusion, draw reduction, rotational molding, spin bonding, melt spinning, melt blowing; or combinations thereof. In another example, any one or more of the polymer materials described herein may be in pellet or solid pieces that may be placed in the interior cavity and expanded and/or cured with heat. The apparatus, methods, and articles of manufacture described herein are not limited in this regard.

The interior cavity of any of the golf club heads described herein may be partially or entirely filled with one or more thermoset materials (e.g., one or more epoxy materials), such as any one or more of the epoxy materials described herein or any other suitable epoxy material(s). For example, the interior cavity of any of the golf club heads described herein may be substantially filled with one or more thermoset materials (e.g., one or more epoxy materials), such as any of the epoxy materials described herein or any other suitable epoxy material(s). In one example, the interior cavity of any of the golf club heads described herein may be at least 90% filled with a thermoset material. In another example, the interior cavity of any of the golf club heads described herein may be at least 80% filled with a thermoset material. In yet another example, the interior cavity of any of the golf club heads described herein may be at least 70% filled with a thermoset material. In yet another example, the interior cavity of any of the golf club heads described herein may be at least 60% filled with a thermoset material. In yet another example, the interior cavity of any of the golf club heads described herein may be at least 50% filled with a thermoset material. In yet another example, the interior cavity of any of the golf club heads described herein may be partially, substantially, or entirely filled with one or more thermoset materials (i.e., at least two thermoset materials). A thermoset material partially, substantially, or entirely filling the interior cavity may affect vibration and noise dampening, structural support for a relatively thin face portion, ball travel distance, ball speed, ball launch angle, ball spin rate, ball peak height, ball landing angle and/or ball dispersion. The apparatus, methods, and articles of manufacture described herein are not limited in this regard. The apparatus, methods, and articles of manufacture described herein are not limited in this regard.

Figure 27:
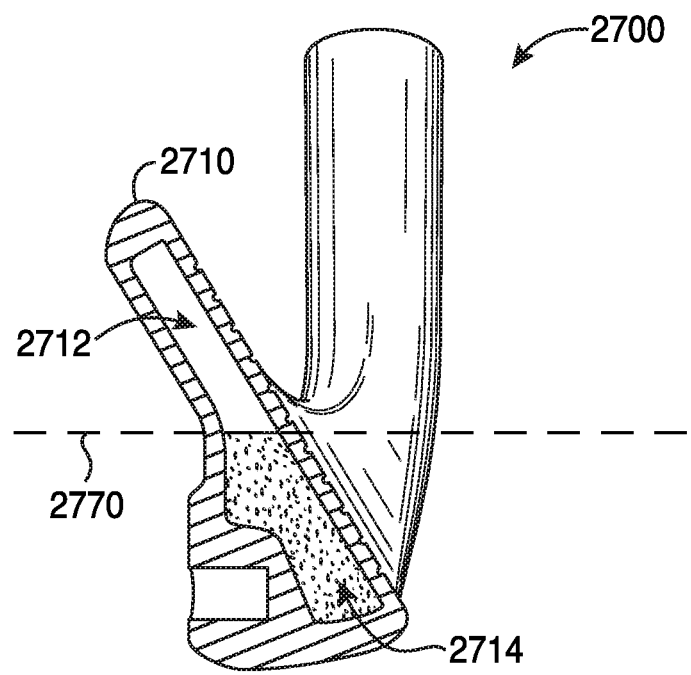
FIG. 27 is a perspective cross-sectional view of a golf club head according to an embodiment of the apparatus, methods, and articles of manufacture described herein.

As illustrated in FIG. 27, for example, the interior cavity 2712 of a body portion 2710 of the golf club head 2700, which may be similar to any of the golf club heads described herein, may be filled with a thermoset material 2714 (e.g., epoxy material) below the horizontal midplane 2770 of the golf club head 2700. In another example, the interior cavity 2712 of the golf club head 2700 or any of the golf club heads described herein may be filled with a thermoset material (e.g., epoxy material) above the horizontal midplane 2770. In yet another example, the interior cavity 2712 of the golf club head 2700 or any of the golf club heads described herein may be filled with a thermoset material (e.g., epoxy material) above and below the horizontal midplane 2770 and yet have regions in the interior cavity 2712 that may not include any thermoset materials or include other materials (not shown). The apparatus, methods, and articles of manufacture described herein are not limited in this regard.

Figure 28:
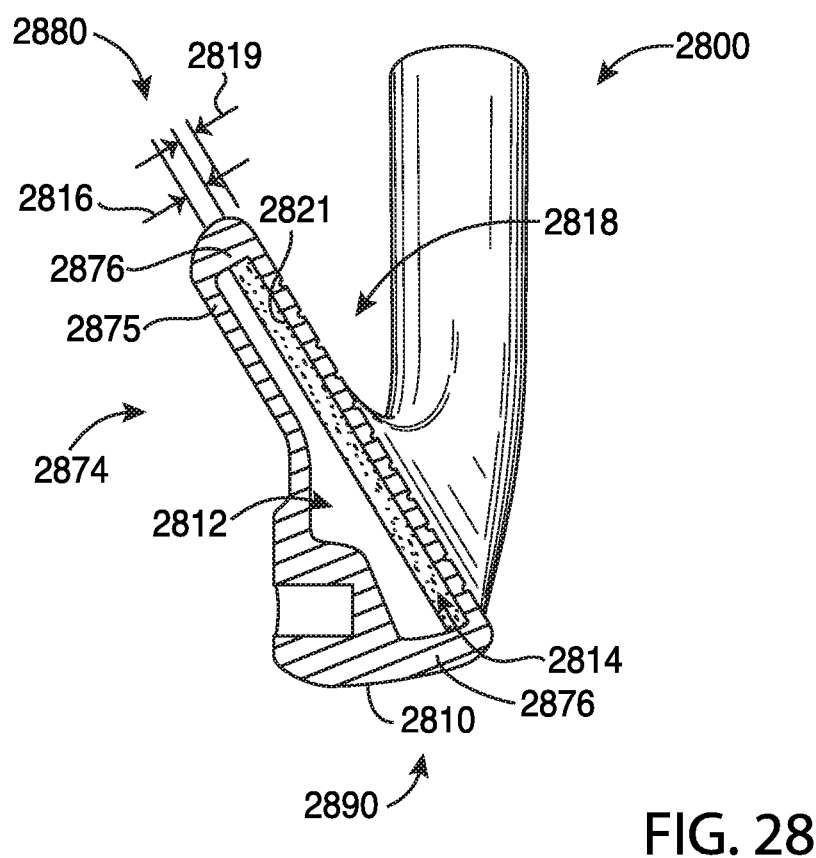
FIG. 28 is a perspective cross-sectional view of a golf club head according to an embodiment of the apparatus, methods, and articles of manufacture described herein.

As shown in FIG. 28, for example, a golf club head 2800, which may be similar to any of the golf club heads described herein, may include a body portion 2810 with an interior cavity 2812 having a width 2816 of a thermoset material 2814. The width 2816 may be related to face portion thickness 2819 of the face portion 2818 by the following expression:

$$W_{th} = aT_f$$

Where: $0.5 \leq a \leq 5.0$ $W_{th}$ is the width of the thermoset material in inches, and
$T_f$ is the thickness of the face portion in inches.

In one example, the width 2816 of the thermoset material 2814 may be greater than or equal to half the face portion thickness 2819. In another example, the width 2816 of the thermoset material 2814 may be greater than or equal to the face portion thickness 2819 (e.g., $W_{th} \geq T_f$). In yet another example, the width 2816 of the thermoset material 2814 may be greater than or equal to twice the face portion thickness 2819 (e.g., $W_{th} \geq 2*T_f$). In another example, the width 2816 of the thermoset material 2814 may be greater than or equal to three times the face portion thickness 2819 (e.g., $W_{th} \geq 3*T_f$). In yet another example, the width 2816 of the thermoset material 2814 may be greater than five times the face portion thickness 2819 (e.g., $W_{th} \geq 5*T_f$). In yet another example, the width 2816 of the thermoset material 2814 may be greater than or equal to the face portion thickness 2819 and less than or equal to three times the face portion thickness 2819 (e.g., $T_f \leq W_{th} \leq 3*T_f$). The apparatus, methods, and articles of manufacture described herein are not limited in this regard.

In one example, the mass of the thermoset material (e.g., epoxy) partially, substantially (e.g., filling at least 50% of the interior cavity), or entirely filling the interior cavity of any of the golf club heads described herein may be greater than or equal to 6.0 grams and less than or equal to 32.0 grams. In another example, the mass of the thermoset material partially, substantially or entirely filling the interior cavity of any of the golf club heads described herein may be greater than or equal to 6.0 grams and less than or equal to 24.0 grams. In yet another example, the mass of the thermoset material partially, substantially or entirely filling the interior cavity of any of the golf club heads described herein may be greater than or equal to 12.0 grams and less than or equal to 18.0 grams. In yet another example, the mass of the thermoset material partially, substantially or entirely filling the interior cavity of any of the golf club heads described herein may be greater than or equal to 16.0 grams and less than or equal to 27.0 grams. In yet another example, the mass of the thermoset material partially, substantially or entirely filling the interior cavity of any of the golf club heads described herein may be greater than or equal to 20.0 grams and less than or equal to 31.0 grams. In yet another example, the mass of the thermoset material partially, substantially or entirely filling the interior cavity of any of the golf club heads described herein may be greater than or equal to 21.0 grams and less than or equal to 28.0 grams. In yet another example, the mass of the thermoset material partially, substantially or entirely filling the interior cavity of any of the golf club heads described herein may be greater than or equal to 10.0 grams and less than or equal to 20.0 grams. In yet another example, the mass of the thermoset material partially, substantially, or entirely filling the interior cavity of any of the golf club heads described herein may be greater than or equal to 15.0 grams and less than or equal to 30.0 grams. In yet another example, the mass of the thermoset material partially, substantially, or entirely filling the interior cavity of any of the golf club heads described herein may be greater than or equal to 20.0 grams and less than or equal to 30.0 grams. The apparatus, methods, and articles of manufacture described herein are not limited in this regard.

In one example, for any of the golf club heads described herein, the mass of a thermoset material partially, substantially, or entirely filling the interior cavity may be related to the mass of the golf club head by the following expression:

$$0.03 \leq \frac{m_T}{m_H} \leq 0.2$$

Where: $m_T$ is the mass of the thermoset material in grams, and
$m_H$ is the mass of the golf club head in grams.

In one example, a ratio of the mass of the thermoset material and the mass of the golf club head may be greater than or equal to 0.04 and less than or equal to 0.08. In another example, a ratio of the mass of the thermoset material and the mass of the golf club head may be greater than or equal to 0.05 and less than or equal to 0.09. In another example, a ratio of the mass of the thermoset material and the mass of the golf club head may be greater than or equal to 0.05 and less than or equal to 0.11. In another example, a ratio of the mass of the thermoset material and the mass of the golf club head may be greater than or equal to 0.09 and less than or equal to 0.12. In another example, a ratio of the mass of the thermoset material and the mass of the golf club head may be greater than or equal to 0.08 and less than or equal to 0.17. In yet another example, a ratio of the mass of the thermoset material and the mass of the golf club head may be greater than or equal to 0.01. The apparatus, methods, and articles of manufacture described herein are not limited in this regard.

A thermoset material partially, substantially, or entirely filling the interior cavity may have a certain Shore D hardness to provide vibration and noise dampening and/or structurally support a relatively thin face portion of a golf club head. In one example, a thermoset material partially, substantially, or entirely filling the interior cavity may have a Shore D hardness of at least 20. In another example, a thermoset material partially, substantially, or entirely filling the interior cavity may have a Shore D hardness of greater than or equal to 20 and less than or equal to 80. In another example, a thermoset material partially, substantially, or entirely filling the interior cavity may have a Shore D hardness of greater than or equal to 25 and less than or equal to 45. In yet another example, a thermoset material partially, substantially, or entirely filling the interior cavity may have a Shore D hardness of greater than or equal to 35 and less than or equal to 65. In yet another example, a thermoset material partially, substantially, or entirely filling the interior cavity may have a Shore D hardness of greater than or equal to 45 and less than or equal to 75. The apparatus, methods, and articles of manufacture described herein are not limited in this regard.

A thermoset material partially, substantially, or entirely filling the interior cavity may have a certain density to provide vibration and noise dampening and/or structurally support a relatively thin face portion of a golf club head. In one example, a thermoset material partially, substantially, or entirely filling the interior cavity may have a density of greater than or equal to 1.0 grams per cubic centimeter ($g/cm^3$) and less than or equal to 2.0 $g/cm^3$. In another example, a thermoset material partially, substantially, or entirely filling the interior cavity may have a density of greater than or equal to 1.1 $g/cm^3$ and less than or equal to 1.5 $g/cm^3$. In yet another example, a thermoset material partially, substantially, or entirely filling the interior cavity may have a density of greater than or equal to 1.0 $g/cm^3$ and less than or equal to 1.4 $g/cm^3$. In yet another example, a thermoset material partially, substantially, or entirely filling the interior cavity may have a density of greater than or equal to 1.1 $g/cm^3$ and less than or equal to 1.2 $g/cm^3$. The apparatus, methods, and articles of manufacture described herein are not limited in this regard.

The polymer material (e.g., the thermoset material 2814 as shown in FIG. 28) may be located adjacent to the back surface 2821 of the face portion 2818. For example, the thermoset material 2814 may be attached and/or bonded directly to the back surface 2821 of the face portion 2818. Alternatively, the thermoset material 2814 may be located away from the face portion 2818. In one example, the thermoset material 2814 be attached and/or bonded to the back wall portion 2875 of the back portion 2874. As a result, the thermoset material 2814 may not be in contact with the back surface 2821 of the face portion 2818. In yet another example, the thermoset material 2814 may be attached and/or bonded to the back surface 2821 and the back wall portion 2875 but not to the side wall portion 2876 at or proximate to the top portion 2880 and/or the sole portion 2890. In addition as another example, the thermoset material 2814 may not be attached and/or bonded to the side wall portion 2876 at or proximate to the toe portion and/or the heel portion of the golf club head 2800. That is, the thermoset material 2814 may be suspended in the interior cavity 2812 without contact with the side wall portion 2876 (e.g., 360-degree space around the thermoset material 2814). In yet another example, the thermoset material 2814 may be attached and/or bonded to the back surface 2821, the back wall portion 2875, and the side wall portion 2876 at or proximate the top portion 2880 and the sole portion 2890 but not the toe portion and the heel portion of the golf club head 2800. While the above examples may describe the thermoset material 2814 being attached and/or bonded to various surfaces and/or wall portions of the golf club head 2800, the thermoset material 2814 may be attached and/or bonded to more or less surfaces and/or wall portions. The apparatus, methods, and articles of manufacture described herein are not limited in this regard.

Figure 29:
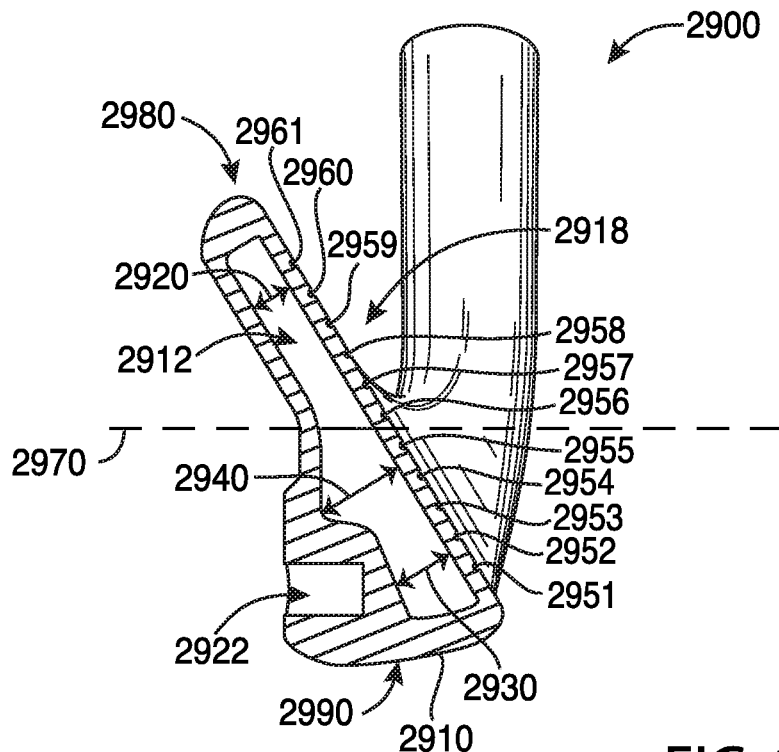
FIG. 29 is a perspective cross-sectional view of a golf club head according to an embodiment of the apparatus, methods, and articles of manufacture described herein.

As shown in FIG. 29, for example, a golf club head 2900, which may be similar to any of the golf club heads described herein, may have a body portion 2910 include an internal cavity 2912 having an internal cavity width that may vary between the top portion 2980 and the sole portion 2990. In particular, the internal cavity 2912 may include a first width 2920 ($W_1$) above a horizontal midplane 2970 of the golf club head 2900, a second width 2930 ($W_2$) below the horizontal midplane 2970, and a third width 2940 ($W_3$) between the first width 2920 and the second width 2930. The third width 2940 may be at or below the horizontal midplane 2970. In one example, the third width 2940 may be above one or more ports (e.g., one generally shown as 2922). Accordingly, the third width 2940 may be located above one or more mass portions (not shown in FIG. 29 but for example, a mass portion disposed in the port 2922) and/or be closer to the horizontal midplane 2970 than one or more mass portions. In another example, the third width 2940 may be above one or more ports of the golf club head 2800 and below the horizontal midplane 2970. The third width 2940 may be greater than the first width 2920 (e.g., $W_3 > W_1$) and greater than the second width 2930 (e.g., $W_3 > W_2$). In one example, the first width 2920 may be greater than or equal to the second width 2930 (e.g., $W_2 \geq W_1$). In another example, the second width 2930 may be greater than or equal to the first width 2920 (e.g., $W_1 \geq W_2$). In yet another example, the third width 2940 may be no more than three times the second width 2930. In yet another example, the third width 2940 may be no more than twice the second width 2930. In yet another example, the third width 2940 may be no more than 1.5 times the second width 2930. In yet another example, the third width 2940 may be no more than 1.25 times the second width 2930. The apparatus, methods, and articles of manufacture described herein are not limited in this regard.

The third width 2940 may be at a certain vertical location of the body portion 2910. The face portion 2918 of the golf club head 2900 may include a plurality of grooves. The face portion 2918 of the golf club head 2900 may include a similar number of grooves as the golf club head 100 of FIG. 1. Accordingly, the face portion 2918 may include a plurality of grooves (e.g., eleven grooves are generally shown as grooves 2951, 2952, 2953, 2954, 2955, 2956, 2957, 2957, 2959, 2960, and 2961 in FIG. 29). The third width 2940 may be located between any of the plurality of grooves. In one example, the third width 2940 may be located between the first groove 2951 and the eleventh groove 2961 from the sole portion 2990. In another example, the third width 2940 may be located between the fourth groove 2954 and the eighth groove 2958 from the sole portion 2990. In yet another example, the third width 2940 may be located between the fifth groove 2955 and the seventh groove 2957 from the sole portion 2990. Although FIG. 29 may depict the first, second, and third widths 2920, 2930, and 2940, respectively, of the internal cavity 2912 relative to a loft plane (not shown) associated with the face portion 2918 (e.g., normal to the loft plane), one or more widths may be measured relative to the ground plane (e.g., one generally shown as 1010 in FIG. 10). For example, one or more widths of the internal cavity 2912 may be substantially parallel to the ground plane. The apparatus, methods, and articles of manufacture described herein are not limited in this regard.

Figure 30:
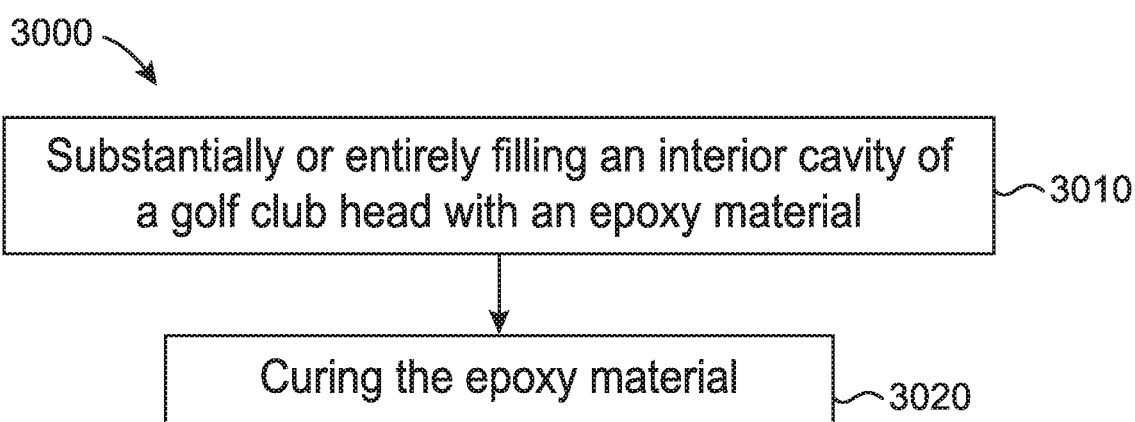
FIG. 30 depicts a manner in which an example golf club head described herein may be manufactured.

In one example, the process of filling the interior cavity of the golf club head may not include applying a bonding portion to the back surface of the face portion. For example, as shown in FIG. 30, the process 3000 of filling the interior cavity of the golf club head may include partially, substantially, or entirely filling the interior cavity with an epoxy material (block 3010), and then curing the epoxy material (block 3020). The epoxy material may be injected into the interior cavity from one or more ports on the body portion of a golf club head as described herein. In one example, the process of curing the epoxy material may include using heat, radiation, and/or pressure for a certain period of time. In another example, the process of curing the epoxy material may only include allowing the epoxy material to cure at ambient or room temperature for a certain period of time. In another example, the process of filling the interior cavity of the golf club head may include applying a first epoxy material to the back surface of the face portion, curing the first epoxy material to a first cure state as described herein, filling the interior cavity with a second epoxy material that may be the same as or different from the first epoxy material, and curing the first epoxy material to the second cure state and curing the second epoxy material as described herein. In another example, more than two epoxy materials can be used to substantially or fully fill the interior cavity with single or multiple curing processes used for each epoxy material. The apparatus, methods, and articles of manufacture described herein are not limited in this regard.

Figure 35:
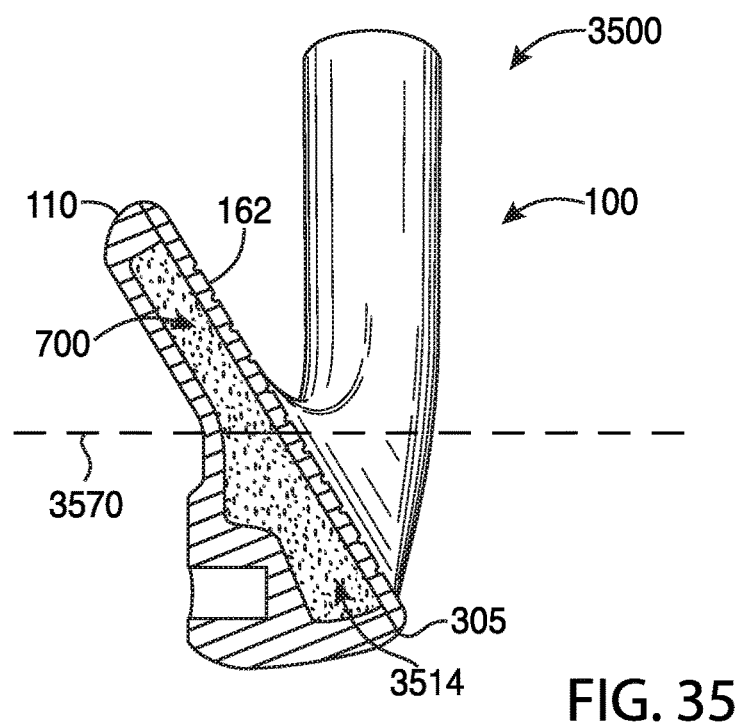
FIG. 35 is a perspective cross-sectional view of a golf club head according to an embodiment of the apparatus, methods, and articles of manufacture described herein.

The filler material may be a structural adhesive 3514, such as an epoxy adhesive. As illustrated in FIG. 35, for example, the interior cavity 700 of the body portion 110 of the golf club head 3500, which may be similar to any of the golf club heads described herein, may be filled, or substantially filled, with a structural adhesive 3514. When the interior cavity 700 is filled or substantially filled with structural adhesive, the structural adhesive 3514 may be present both above and below a horizontal midplane 3570 of the golf club head 3500. The epoxy adhesive may have a transparent gold color readily identifiable for quality control purposes. Examples of structural adhesives include polyurethane, acrylic, cyanoacrylate, and others. Epoxy adhesives may be formulated as liquid reactive polymers that undergo a chemical reaction when a base material is mixed with an accelerating material and then cure to form a solid plastic material. When the base and accelerating materials are mixed in a specified ratio (e.g., 1:1), these materials may begin curing and offer a limited working time when the structural adhesive may be applied. The structural adhesive may provide relatively high shear and peel strengths. The structural adhesive may offer resistance to high temperatures, solvents, and/or weathering. The structural adhesive may be a two-part epoxy adhesive having a base material mixed with an accelerator material, also known as a curing agent. In one example, the accelerator material may be a polymeric mercaptan. Upon mixing the accelerator material with the base material, the epoxy adhesive may have a cure time of less than 10 minutes at room temperature (e.g., 21° C.). In one example, the epoxy adhesive may have a cure time of between and including 3 and 5 minutes at room temperature. In another example, the epoxy adhesive may have a cure time of between and including 2 and 6 minutes at room temperature. Cure time may be defined as the amount of time required for the epoxy adhesive to achieve, for example, 80% of an ultimate tensile strength of the epoxy adhesive when fully cured. In one example, the epoxy adhesive may have a density of between and including 1.126 and 1.162 g/cm$^3$ (0.0406 and 0.0419 lb/in$^3$). In another example, the epoxy adhesive may have a density of between and including 1.148 and 1.174 g/cm$^3$ (0.0414 and 0.0424 lb/in$^3$). In yet another example, the epoxy adhesive may have a density of between and including 1.162 and 1.186 g/cm$^3$ (0.0419 and 0.0428 lb/in$^3$). In one example, the epoxy adhesive 3514 may have a density of less than 1.2 g/cm$^3$. In another example, the epoxy adhesive may have a density of less than 1.186 g/cm$^3$. In another example, the epoxy adhesive may have a density of less than 1.174 g/cm$^3$. In yet another example, the epoxy adhesive may have a density of less than 1.162 g/cm$^3$. In still another example, the epoxy adhesive may have a density of less than 1.148 g/cm$^3$. The epoxy adhesive may remain slightly flexible when cured, which may allow the epoxy adhesive to effectively absorb shock and vibration resulting from the club head 100 striking a golf ball without shattering and/or fragmenting within the interior cavity 700. In one example, the epoxy adhesive may have a Shore D hardness of at least 45. In another example, the epoxy adhesive may have a Shore D hardness between and including 48 and 62. In another example, the epoxy adhesive may have a Shore D hardness between and including 50 and 60. In another example, the epoxy adhesive may have a Shore D hardness between and including 60 and 67. In another example, the epoxy adhesive may have a Shore D hardness of between and including 62 and 72. In yet another example, the epoxy adhesive may have a Shore D hardness of between and including 65 and 70. In still another example, the epoxy adhesive may have a Shore D hardness of between and including 68 and 74. At an ambient temperature of 21° C., the epoxy adhesive may have a thermal coefficient of expansion of between and including 90 and 95. When applying test method ASTM D882 to evaluate tensile strength and elongation of the epoxy adhesive in the form of a 5.08 cm (2 inch) dumbbell sample with a 0.3175 cm (0.125 inch) neck and 0.0762 cm (0.030 inch) thickness, the epoxy adhesive may exhibit an elongation of 75% at a separation rate of 5.08 cm (2 inch) per minute. In one example, the epoxy adhesive may have a tensile strength of between and including 11.48 and 12.76 MPa (1665 and 1850 psi) at 21° C. In another example, the epoxy adhesive may have a tensile strength of between and including 12.58 and 12.93 MPa (1825 and 1875 psi) at 21° C. In yet another example, the epoxy adhesive may have a tensile strength of 12.76 MPa (1850 psi) at 21° C. In still another example, the epoxy adhesive may have a tensile strength of between and including 12.76 and 14.03 MPa (1850 and 2035 psi) at 21° C. The high tensile strength of the epoxy adhesive may allow the club head 100 to maintain high durability and reliability despite having a relatively thin metallic face. In one example, the face portion 162 may have a thickness of less than 2.54 mm. In another example, the face portion 162 may have a thickness of less than 1.9 mm. In another example, the face portion 162 may have a thickness of less than 1.5 mm. In still another example, the face portion 162 may have a thickness of less than 0.8 mm. In yet another example, the face portion 162 may have a thickness of less than 0.76 mm. By employing a thin face portion, the CG of the club head 100 may be shifted reward and/or downward.

As used herein "coefficient of restitution" may represent a measure of energy transfer between two objects when they collide. A COR measurement can be expressed as a number between zero (where all energy is lost in the collision) and 1.0 (representing a perfect, elastic collision in which all energy is transferred from a first object to a second object). In one example, a COR measurement may describe energy transfer between a golf club head (i.e. first object) and a golf ball (i.e. second object). In another example, a COR measurement may describe energy transfer between a material (i.e. first object) used in the manufacture of a golf club head and a golf ball (i.e. second object). In yet another example, a COR measurement may describe energy transfer between a material (i.e. first object) used in the manufacture of a golf club head and a test device (i.e. second object). The test device may allow for comparative analysis of materials used in the manufacture of golf club heads. In one example, COR may be measured by launching a golf ball at the strike face 162 of the golf club and measuring the velocity of the ball before it impacts the strike face ($V_{in}$) and then measuring the velocity of the ball after it rebounds from the strike face ($V_{out}$) and calculating the ratio of velocities (COR=$V_{out}$/$V_{in}$).

A golf club head having an interior cavity and a relatively thin strike face may generate inconsistent CORs at various locations across the strike face. During impact with a golf ball, the strike face may exhibit a spring-like or trampoline effect by deflecting inwardly during impact and then deflecting outwardly during rebound, which in turn, may impart energy to the golf ball. If the strike face is not adequately supported across its back surface, the strike face may exhibit a maximum COR measurement at an optimal location and variation in COR measurement away from that particular location. As a result, the club head may produce a lower ball speed when the golf ball impacts the strike face at location(s) away from that optimal location. Diminished ball speed may result in the golf ball traveling a shorter distance than desired and/or produce a ball flight trajectory that deviates from a desired ball flight trajectory.

Upon curing, the structural adhesive 3514 may strongly bond to surface(s) of the body portion 110 and/or the face portion 162 that together define the interior cavity 700. By strongly bonding to interior surface(s) of the interior cavity 700, the structural adhesive 3514 may avoid detaching and rattling within the interior cavity 700 as a result of the club head 100 being subjected to repeated ball strikes during its useful life. Strongly bonding to interior surface(s) of the interior cavity 700 may also improve consistency of performance of the club head in the event of a mishit. For example, when the interior cavity 700 of the golf club head is substantially filled with structural adhesive and the structural adhesive is strongly bonded to the back surface 166 of the face portion 162, the golf club head 100 may exhibit substantially uniform COR measurements across the front surface 164 of the face portion.

In one example, the golf club head 3500 may be made of a steel-based material (e.g., 8620 steel). After the structural adhesive 3514 is introduced into the interior cavity 700 and bonds to the surface(s) of the body portion 110 and/or the face portion 162, the structural adhesive may exhibit an overlap shear strength of at least 1700 psi (at least 11.72 MPa) relative to the steel-based body portion 110. Overlap shear strength may be determined in accordance with ASTM D1002 using metal specimens with a width of 25.4 mm, a length of 177.8 mm, an overlap of 12.7 mm, and an adhesive bond thickness of about 0.127 to 0.203 mm (0.005 to 0.008 inch) at 21° C. (70° F.). The pieces of metal substrate (i.e., the metal specimens) may be made of the same material as the body portion 110 and/or the face portion 162 with surfaces of the substrates prepared in a similar manner as the surface(s) of the body portion 110 and/or the face portion 162 forming the interior cavity 700. To ensure long-term durability of a bonding interface between the structural adhesive and the surface(s) of the body portion 110 and/or the face portion 162 forming the interior cavity 700, the structural adhesive may have an overlap shear strength (relative to the material(s) of the surface(s) of the body portion 110 and/or the face portion 162 forming the interior cavity 700) of at least 1250, at least 1475, at least 1625, or at least 1700 psi at 21° C. (70° F.). In one example, the body portion 110 may be a forged steel body with an unfinished interior cavity. The unfinished interior cavity may be subjected to a machining process (e.g., a milling process) to produce a finished interior cavity 700 with finished surface(s) having an average roughness (Ra) greater than 0.8 micrometers. The finished surface(s) may enhance bonding of the structural adhesive to the surface(s) of the body portion 110 and/or the face portion 162 forming the interior cavity 700 to improve overlap shear strength. The apparatus, methods, and articles of manufacture described herein are not limited in this regard.

Figure 31:
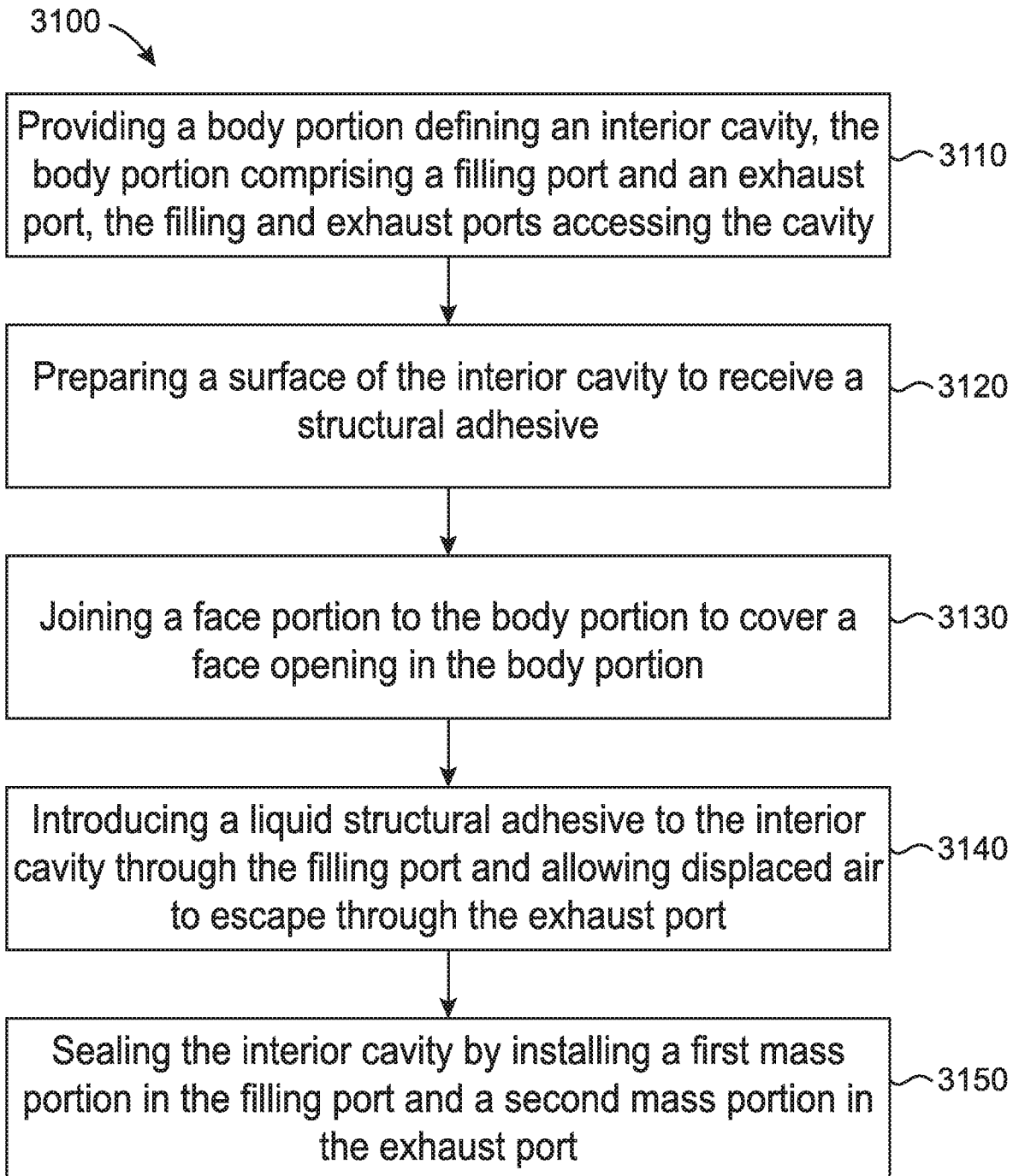
FIG. 31 depicts a manner in which an example golf club head described herein may be manufactured.

FIG. 31 shows an example process 3100 to manufacture a golf club head. The process may include providing a body portion 110 (block 3110). The body portion 110 may include an opening configured to receive a face portion 162. In one example, the body portion 110 may include a metal material having a density greater than 7 g/cm³. In another example, the body portion 110 may include a metal material having a density greater than 7.75 g/cm³. The body portion 110 may be formed with an interior cavity 700 (e.g., through a casting or forging process), or the interior cavity 700 may be subsequently formed in the body portion 110 (e.g., through a machining process). The body portion 110 may be formed with a filling port (e.g., one port generally shown as 1431) and an exhaust port (e.g., one port generally shown as 1421) accessing the interior cavity 700 (e.g., through a casting process), or the filling and exhaust ports (e.g., generally shown as 1421 and 1431, respectively, or vice versa) may be subsequently formed in the body portion 110 (e.g., through a drilling or milling process). In one example, the filling port 1431 may be located below the horizontal midplane 3570, and the exhaust port 1421 may be located above the horizontal midplane (see, e.g., FIGS. 10, 14, and 35). In another example, the filling port 1431 may be located above the horizontal midplane 1020, and the exhaust port 1421 may be located below the horizontal midplane. The filling and/or exhaust ports may access the interior cavity 700 from a back portion 170 of the body portion 110 and/or from a sole portion 190 of the body portion 110. Alternatively, the filling and/or exhaust ports may access the interior cavity 700 from the heel portion 150 (e.g., the hosel portion 155) and/or the top portion 180. The surface(s) of the body portion 110 and/or the face portion 162 forming the interior cavity 700 may have unfinished surface(s) resulting from casting or forging process(es). To improve bonding of the structural adhesive 2714 to the surface of the interior cavity 700, the process 3100 may include preparing the surface(s) of the body portion 110 and/or the face portion 162 forming the interior cavity 700 to receive structural adhesive(s) (block 3120). In one example, preparing the surface(s) of the body portion 110 and/or the face portion 162 forming the interior cavity 700 for bonding may include cleaning the surface with a solvent, such as isopropyl alcohol. In another example, preparing the surface(s) of the body portion 110 and/or the face portion 162 forming the interior cavity 700 for bonding may include milling, sanding, sandblasting, or otherwise abrading the surface(s) to provide a certain average surface roughness. In still another example, preparing the surface(s) of the body portion 110 and/or the face portion 162 forming the interior cavity 700 for bonding may include milling, sanding, sandblasting, or otherwise abrading the surface(s) to provide a certain average surface roughness and then cleaning the surface with a solvent, such as isopropyl alcohol. In one example, preparing the surface(s) of the body portion 110 and/or the face portion 162 forming the interior cavity 700 may result in an average roughness (Ra) of between and including 0.8 and 6.3 micrometers. In another example, the surface roughness of the surface(s) of the body portion 110 and/or the face portion 162 forming the interior cavity 700 may between and including 0.8 and 2.3 micrometers. In yet another example, the surface roughness of the surface(s) of the body portion 110 and/or the face portion 162 forming the interior cavity 700 may between and including 2.2 and 4.5 micrometers. In yet another example, the surface roughness of the surface(s) of the body portion 110 and/or the face portion 162 forming the interior cavity 700 may between and including 4.4 and 6.3 micrometers. Cleaning the surface(s) with a solvent may remove loose particles or residual lubricant(s) remaining from a machining process and may therefore improve bonding of the adhesive material to the surface(s) of the interior cavity 700. Machining the surface(s) of the body portion 110 and/or the face portion 162 forming the interior cavity 700 to receive the filler material may remove excess material from certain regions of the interior cavity 700 to allow for repositioning of the CG of the golf club head 100 to a more optimal location. The process 3100 may include introducing a liquid structural adhesive, such as an epoxy adhesive, to the interior cavity 700 through the filling port (block 3140). As the structural adhesive flows into the interior cavity 700, air within the interior cavity 700 may be displaced and forced out of the interior cavity 700 through the exhaust port. The interior cavity 700 may be filled the structural adhesive 3514 between and including 40% and 100% of the interior cavity volume. In one example, the structural adhesive 3514 may occupy at least 50% of the interior cavity volume. In another example, the structural adhesive 3514 may occupy at least 55% of the interior cavity volume. In yet another example, the structural adhesive 3514 may occupy at least 65% of the interior cavity volume. In still another example, the structural adhesive 3514 may occupy at least 75% of the interior cavity volume. In another example, the structural adhesive 3514 may occupy at least 85% of the interior cavity volume. In another example, the structural adhesive 3514 may occupy at least 95% of the interior cavity volume. To reduce or prevent debris from entering the interior cavity 700 and/or liquid structural adhesive from flowing out of the ports prior to curing, the interior cavity 700 may be sealed by installing a first mass portion in the filling port (e.g., one generally shown as 1431 in FIG. 14) and a second mass portion in the exhaust port (e.g., one generally shown as 1421). The apparatus, methods, and articles of manufacture described herein are not limited in this regard.

In one example (shown in block 3140), introducing a liquid structural adhesive to the interior cavity 700 may occur without heating the structural adhesive or the body portion 110. Without heating of the structural adhesive and/or the body portion 110, the time and energy spent to complete the process 3100 may be reduced. For a two-part structural adhesive (e.g., epoxy adhesive) made of liquid reactive polymers, a step of mixing a base material with an accelerator material may precede introducing the liquid structural adhesive to the interior cavity. In one example, the structural adhesive may be introduced to the interior cavity 700 at a delivery rate of greater than 40 grams/minute. In another example, the structural adhesive may be introduced to the interior cavity 700 at a delivery rate of between and including 40 and 47 grams/minute. In still another example, the structural adhesive may be introduced to the interior cavity 700 at a delivery rate of between and including 46 and 54 grams/minute. In yet another example, the structural adhesive may be introduced to the interior cavity 700 at a delivery rate of between and including 53 and 62 grams/minute. The structural adhesive may be introduced to the interior cavity 700 at elevated pressure using an applicator, such as a pneumatic applicator or other suitable applicator. In one example, the structural adhesive may be introduced to the interior cavity 700 at a pressure of greater than 40 psi. In another example, the structural adhesive may be introduced to the interior cavity 700 at a pressure of between and including 45 and 60 psi (310 and 413 kPa). In another example, the structural adhesive may be introduced to the interior cavity 700 at a pressure of between and including 55 and 70 psi (379 and 482 kPa). In another example, the structural adhesive may be introduced to the interior cavity 700 at a pressure of between and including 70 and 75 psi (482 and 517 kPa). In another example, the structural adhesive may be introduced to the interior cavity 700 at a pressure of between and including 75 and 80 psi (517 and 551 kPa). The apparatus, methods, and articles of manufacture described herein are not limited in this regard.

In one example, the structural adhesive may have a viscosity of between and including 4,000 and 7,000 centipoise at 73° F. (22.8° C.). In another example, the structural adhesive may have a viscosity of between and including 7,000 and 11,000 centipoise at 73° F. (22.8° C.). In another example, the structural adhesive may have a viscosity of between and including 11,000 and 13,000 centipoise at 73° F. (22.8° C.). The duration of introducing the structural adhesive to the interior cavity 700 may depend on the diameter of the filling port. In one example where the filling port has a diameter of about 0.375 in., the filling duration may be about 3 to 90 seconds. The filling duration may depend on the viscosity and pressure of the structural adhesive being introduced to the interior cavity 700. In one example, the filling duration may be between and including 3 and 15 seconds. In another example, the filling duration may be between and including 10 and 30 seconds. In another example, the filling duration may be between and including 30 and 45 seconds. In another example, the filling duration may be between and including 46 and 60 seconds. In still another example, the filling duration may be between and including 60 and 75 seconds. In yet another example, the filling duration may be between and including 75 and 90 seconds. The filling duration may be longer for a relatively smaller diameter filling port, and the filling duration may be shorter for a relatively larger diameter filling port. The ratio of the structural adhesive volume to the body portion volume may be greater than 0.2. In one example, the ratio of the structural adhesive volume to the body portion volume may be between and including 0.20 and 0.30. In another example, the ratio of the structural adhesive volume to the body portion volume may be between and including 0.25 and 0.35. In still another example, the ratio of the structural adhesive volume to the body portion volume may be between and including 0.30 and 0.45. In yet another example, the ratio of the structural adhesive volume to the body portion volume may be between and including 0.45 and 0.55. The apparatus, methods, and articles of manufacture described herein are not limited in this regard.

The process 3100 may include sealing the filling port and/or the exhaust port (block 3150). In one example, first and second mass portions may be installed in the filling and exhaust ports, respectively, immediately after introducing the structural adhesive into the interior cavity 700. In another example, the first and second mass portions may be installed after the structural adhesive is partially cured. In yet another example, the first and second mass portions may be installed after the structural adhesive is substantially or completely cured. Alternatively, the filling and exhaust ports may not be sealed with mass portions. The apparatus, methods, and articles of manufacture described herein are not limited in this regard.

The process of 3100 of FIG. 31 may be performed at room temperature to eliminate the need for heating. Alternatively, the process 3100 may be performed at a temperature above room temperature for at least a portion of the curing process. In one example, the process 3100 may include heating the club head 100 at a temperature of greater than 75° C. (167° F.). In another example, the process 3100 may include heating the club head 100 at a temperature of 75 to 85° C. (167 to 185° F.). In another example, the process 3100 may include heating the club head 100 at a temperature of 85 to 90° C. (185 to 194° F.). In another example, the process 3100 may include heating the club head 100 at a temperature of 90 to 95° C. (194 to 203° F.). Providing heat may speed curing of the structural adhesive after introducing the structural adhesive to the interior cavity 700. The apparatus, methods, and articles of manufacture described herein are not limited in this regard.

Figure 32:
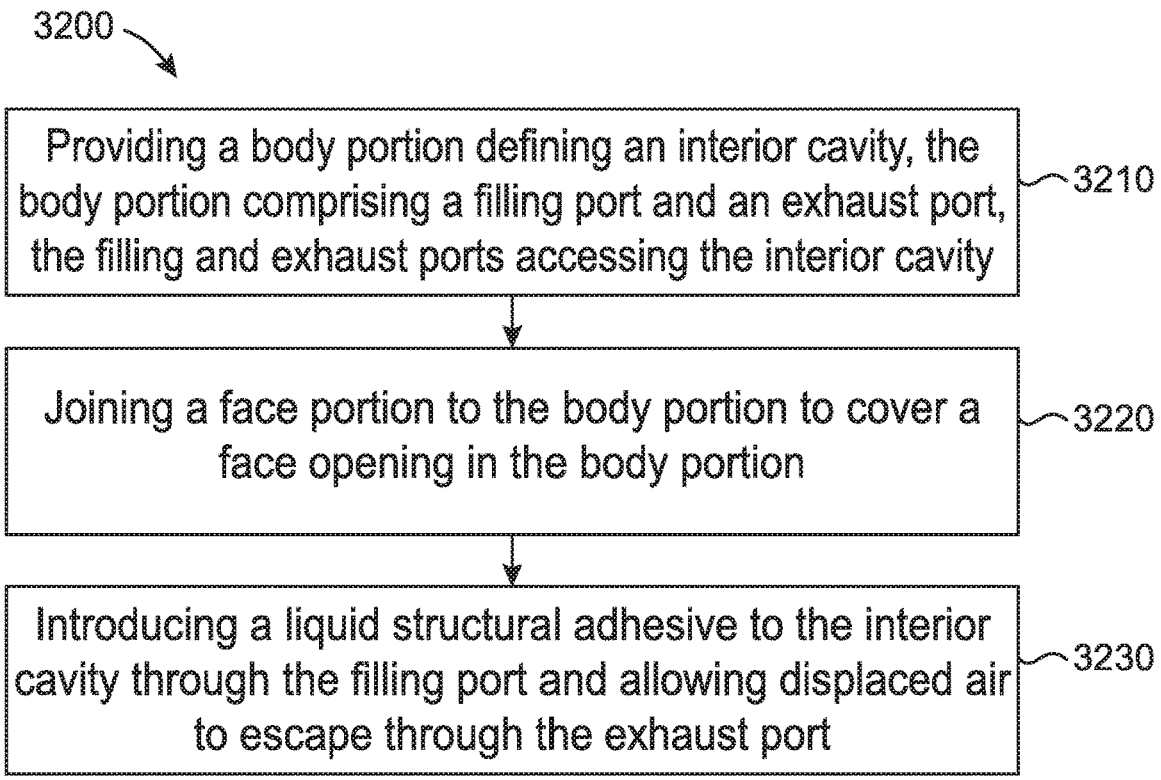
FIG. 32 depicts a manner in which an example golf club head described herein may be manufactured.

FIG. 32 shows an example process 3200 to manufacture a golf club head. The process 3200 may include providing a body portion 110 defining an interior cavity 700 (block 3210). The body portion 110 may include a filling port and an exhaust port accessing the interior cavity 700. The filling port and exhaust port may access the interior cavity 700 from a back portion, a sole portion, a top portion, a toe portion, a heel portion, a perimeter portion, and/or other portion(s) of the body portion 110. In one example, the hosel portion 155 may be used as a filling and/or exhaust port. The process 3200 may include joining a face portion 162 to cover an opening in the body portion 110 (block 3220). In one example, the face portion 162 may be welded the front portion 160 of the body portion 110 to cover the opening. The process 3200 may include introducing a liquid structural adhesive to the interior cavity 700 through the filling port and allowing displaced air to escape through the exhaust port (block 3230). Accordingly, the liquid structural adhesive may cure and solidify to form a solid structural adhesive after being introduced to the interior cavity 700. The solid structural adhesive 3514 may provide relatively high shear and peel strengths as described herein. In one example, the solid structural adhesive 3514 may have a tensile strength of greater than 11.0 MPa at 21° C. (1595 psi at 70° F.). In another example, the solid structural adhesive 3514 may have a tensile strength of greater than 11.48 MPa at 21° C. (1665 psi at 70° F.). In another example, the solid structural adhesive 3514 may have a tensile strength of greater than 12.5 MPa at 21° C. (1812 psi at 70° F.). In another example, the solid structural adhesive 3514 may have a tensile strength of greater than 12.7 MPa at 21° C. (1850 psi at 70° F.). In another example, the solid structural adhesive 3514 may have a tensile strength of greater than 12.7 MPa at 21° C. (1850 psi at 70° F.). The process 3200 may include curing the liquid structural adhesive for 24 hours at a temperature of 21° C. (70° F.). Accordingly, the resulting solid structural adhesive 3514 may exhibit a desirably high overlap shear strength relative to the surface(s) of the body portion 110 and/or the face portion 162 forming the finished interior cavity 700. For example, the solid structural adhesive 3514 may exhibit an overlap shear strength relative to the surface(s) of the body portion 110 and/or the face portion 162 forming the finished interior cavity 700 of at least 8.6 Mpa (1250 psi). In another example, the solid structural adhesive 3514 may exhibit an overlap shear strength relative to the surface(s) of the body portion 110 and/or the face portion 162 forming the finished interior cavity 700 of at least 10.2 Mpa (1475 psi). In another example, the solid structural adhesive 3514 may exhibit an overlap shear strength relative to the surface(s) of the body portion 110 and/or the face portion 162 forming the finished interior cavity 700 of at least 11.2 Mpa (1625 psi). In another example, the solid structural adhesive 3514 may exhibit an overlap shear strength relative to the surface(s) of the body portion 110 and/or the face portion 162 forming the finished interior cavity 700 of at least 11.72 Mpa (1700 psi). The liquid structural adhesive may be a two-part epoxy adhesive having a base material mixed with an accelerator material. In one example, the accelerator material may be a polymeric mercaptan. The apparatus, methods, and articles of manufacture described herein are not limited in this regard.

Figure 33:
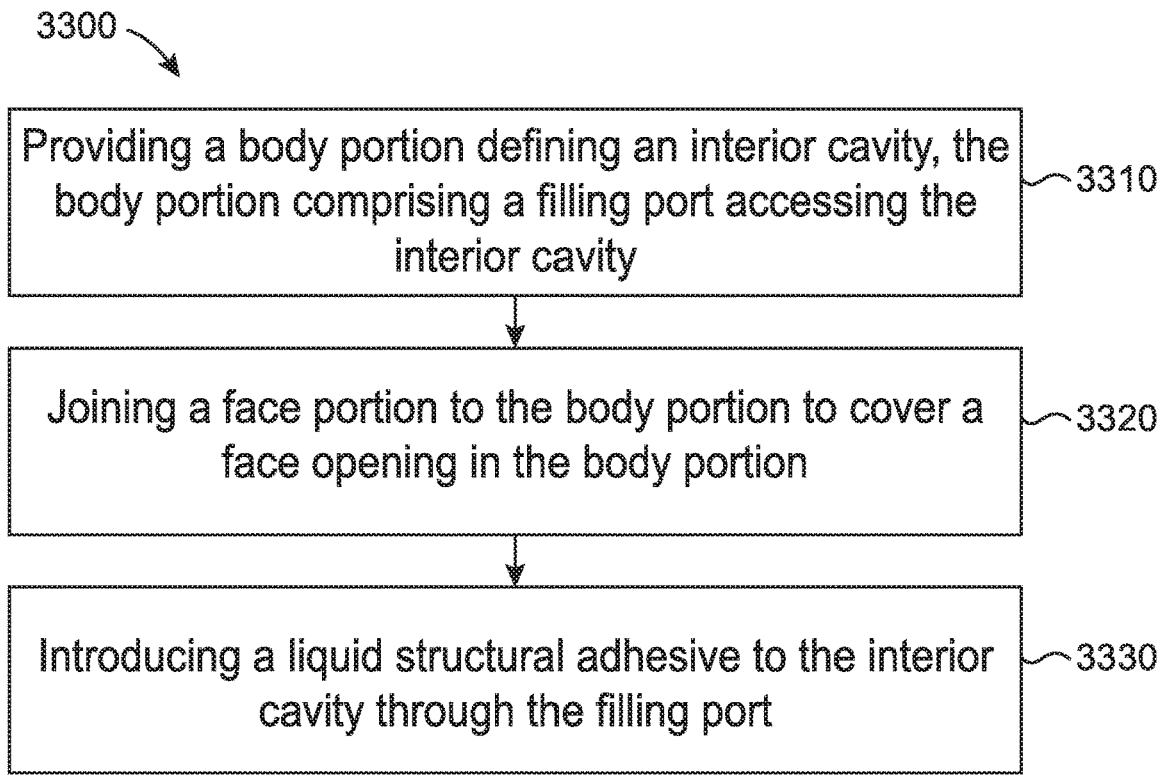
FIG. 33 depicts a manner in which an example golf club head described herein may be manufactured.

FIG. 33 shows an example process 3300 to manufacture a golf club head. The process 3300 may include providing a body portion 110 defining an interior cavity 700 (block 3310). The body portion 110 may include a filling port accessing the interior cavity 700. The filling port may access the interior cavity 700 from a back portion, a sole portion, a top portion, a toe portion, a heel portion, a perimeter portion, and/or other suitable portion(s) of the body portion 110. In one example, the hosel portion 155 may be used as a filling or exhaust port. The process 3300 may include joining a face portion 162 to cover an opening in the body portion 110 (block 3320). In one example, the face portion 162 may be welded the front portion 160 of the body portion 110 to cover the opening. The process 3300 may include introducing a liquid structural adhesive to the interior cavity 700 through the filling port and allowing displaced air to escape (block 3230). Accordingly, the liquid structural adhesive may cure and solidify to form a solid structural adhesive after being introduced to the interior cavity 700. The solid structural adhesive may provide relatively high shear and peel strengths as described herein. The process 3300 may include curing the liquid structural adhesive for 24 hours at a temperature of 70° F. (21° C.). Accordingly, the resulting solid structural adhesive may exhibit a relatively high overlap shear strength, as described herein, relative to the surface(s) of the body portion 110 and/or the face portion 162 forming the finished interior cavity 700. The liquid structural adhesive may be a two-part epoxy adhesive having a base material mixed with an accelerator material. In one example, the accelerator material may be a polymeric mercaptan. The apparatus, methods, and articles of manufacture described herein are not limited in this regard.

Figure 34:
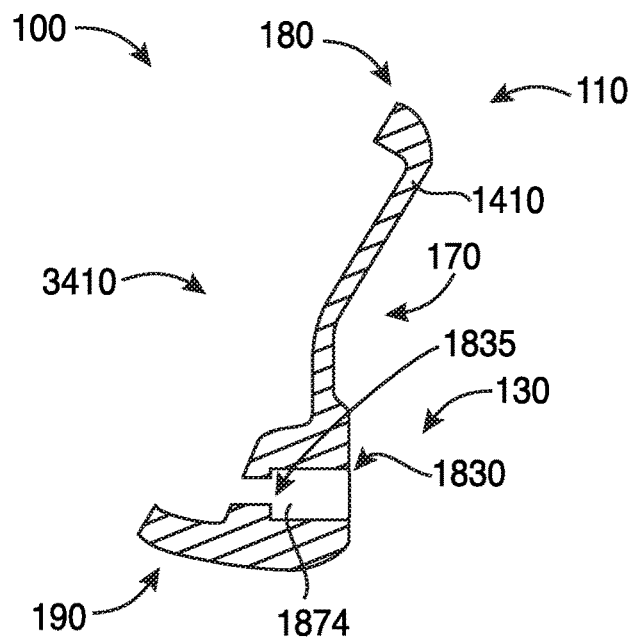
FIG. 34 depicts a partial cross-sectional view of an example golf club head according to an embodiment of the apparatus, methods, and articles of manufacture described herein.

FIG. 34 illustrates a cross-sectional view of an example golf club head prior to joining the face portion 162 to the body portion and prior to adding structural adhesive 3514 to the interior cavity 700. The body portion 110 of the golf club head 100 may include a face opening 3410 proximate a front portion 160 of the body portion 110. The face opening 3410 may be configured to receive a face portion 162 (e.g., a strike face) having a front surface 164 and a back surface 166. The face opening 3410 may provide access to the surface(s) of the interior cavity 700, thereby facilitating preparation of the surface(s) as described herein prior to introducing liquid structural adhesive 3514 into the interior cavity.

FIG. 35 illustrates a cross-sectional view of the example golf club head of FIG. 34 after the face portion 162 has been joined to the body portion 110 and after structural adhesive has been introduced into the interior cavity 700. A weld, such as a seam weld or a stitch weld may be used to join the face portion 162 to the body portion 110. In the example illustrated in FIGS. 39-41, a weld 305 may circumscribe or substantially circumscribe the face portion 162. The weld 305 may be continuous or substantially continuous around a perimeter edge of the face portion 162. After the weld 305 is formed, it may be sanded and/or polished to provide a surface contour that matches the contour of the body portion 110. Along a top side, bottom side, and toe side of the golf club head 100, the weld 305 may be provided along a rear perimeter edge of the face portion 162. As illustrated in FIGS. 35 and 37-41, the weld 305 may extend along a top perimeter (i.e. top rail), bottom perimeter (i.e. sole) and toe perimeter of the club head. This configuration may provide a club head with a larger functional face area without increasing the surface area of an external face area of the face portion 162 or the overall size of the club head. The functional face area may be a measure of the area of the face portion that is capable of moving relative to the body 3500 and/or inwardly deflecting when the club head strikes a golf ball. The functional face area may be equivalent in size to an internal face area defined as a surface area on the rear surface of the face portion 162 that is in contact with the structural adhesive 3514. In one example, the internal face area may be at least 75% as large as the external face area. In another example, the internal face area may be at least 85% as large as the external face area. In yet another example, the internal face area may be at least 95% as large as the external face area. Providing a larger internal face area while keeping the external face area the same size provides a larger functional face area. The larger functional face area, supported by structural adhesive 3514 in the interior cavity, may provide consistent responses to impacts at various locations across the face portion 162, despite the face portion being relatively thin as discussed herein.

As illustrated in the example golf club head 3500 of FIG. 35, the interior cavity 700 may be filled or substantially filled with structural adhesive 3514. The structural adhesive 3514 may be strongly bonded to the back surface of the face portion and may occupy the interior cavity between the back surface of the face portion 162 and a surface of the interior cavity 700 of the body portion 110. The golf club may include a face portion having thickness of less than 2.54, less than 1.90, less than 1.52, or less than 0.76 mm. Despite this thin face in combination with the interior cavity 700, the golf club head 3500 may exhibit unexpected forgiveness in response to mishits. The apparatus, methods, and articles of manufacture described herein are not limited in this regard.

Figure 36:
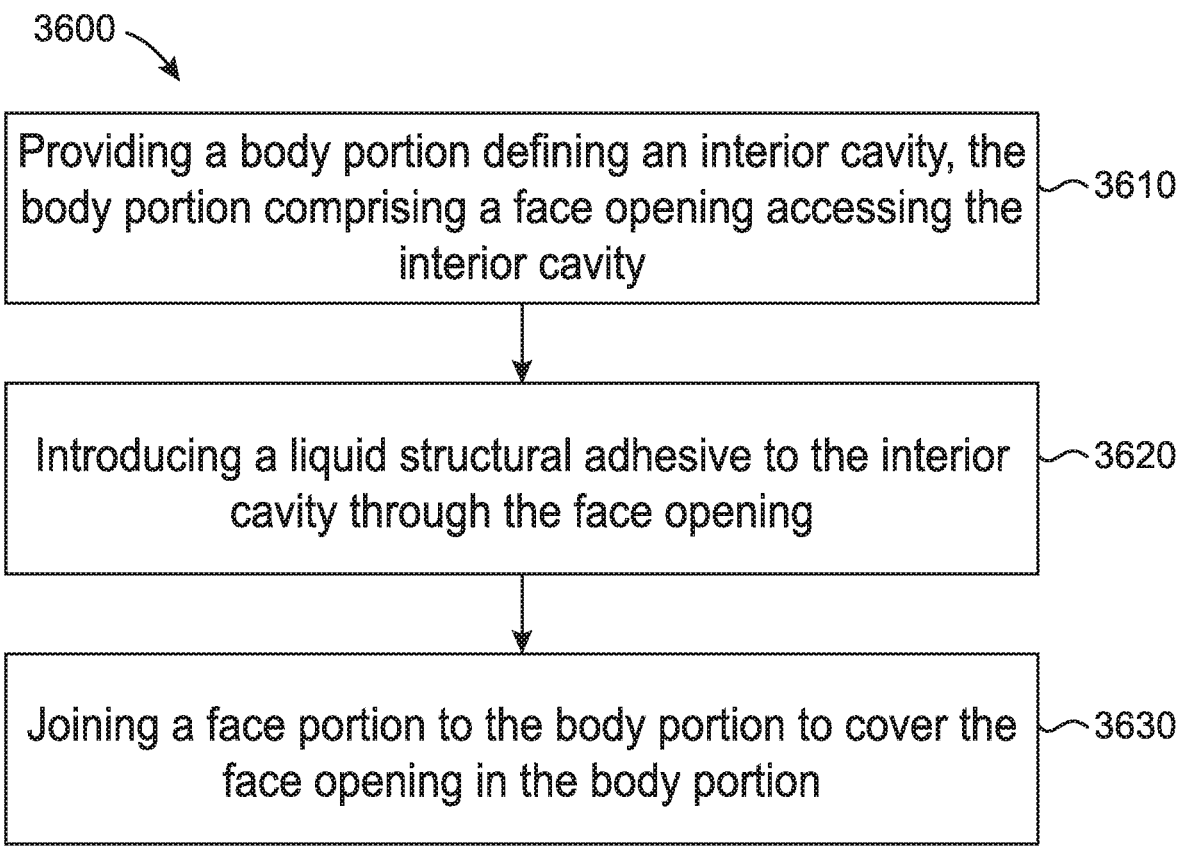
FIG. 36 depicts a manner in which an example golf club head described herein may be manufactured.
Figure 37:
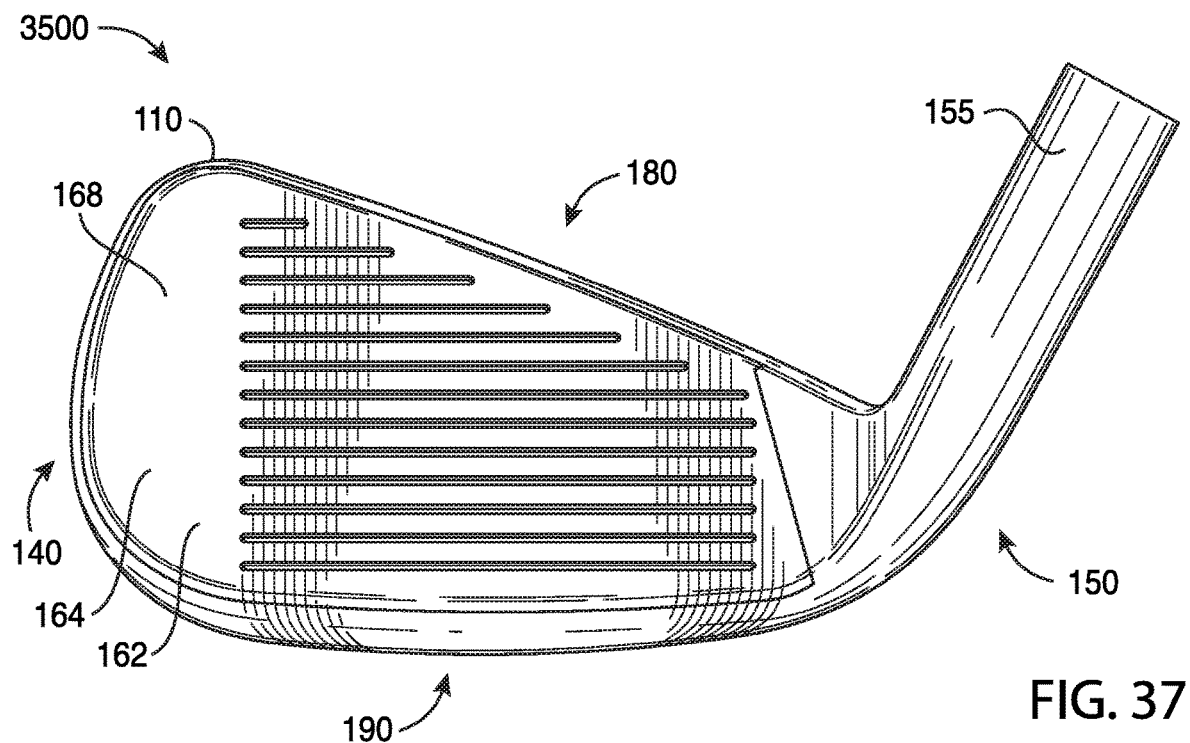
FIG. 37 depicts a front view of a golf club head according to an embodiment of the apparatus, methods, and articles of manufacture described herein.
Figure 38:
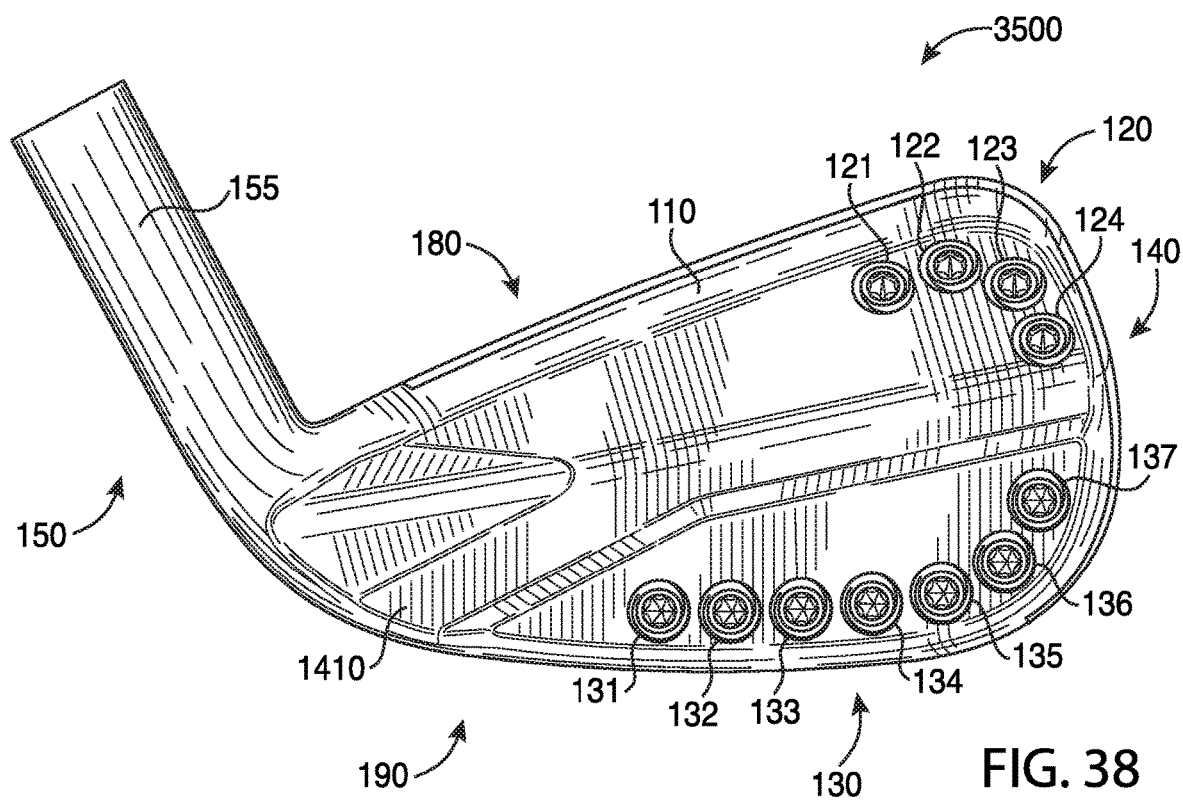
FIG. 38 depicts a rear view of the example golf club head of FIG. 37.
Figure 39:
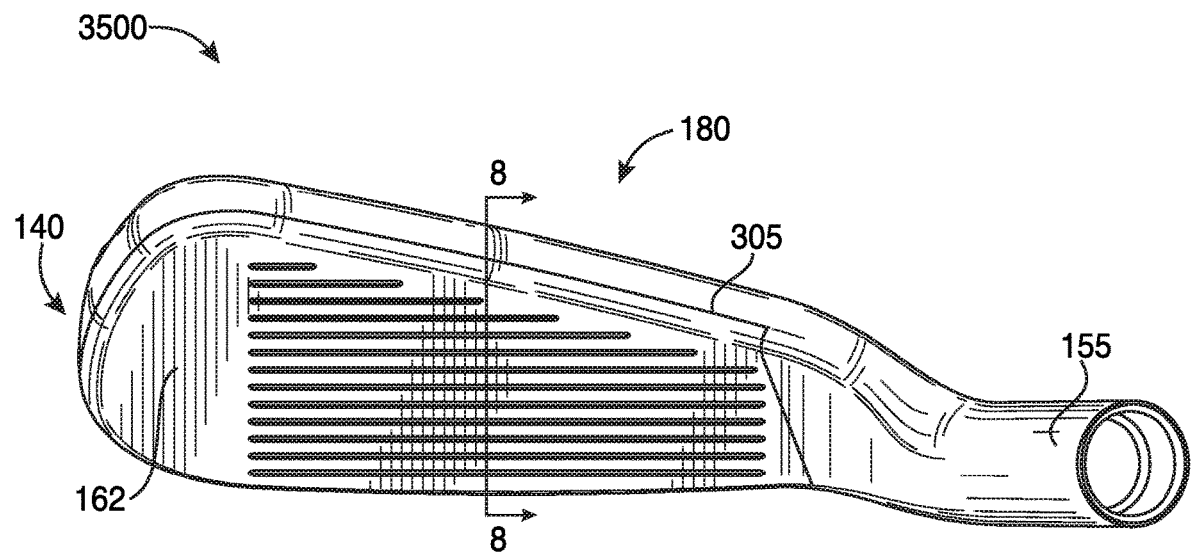
FIG. 39 depicts a top view of the example golf club head of FIG. 37.
Figure 40:
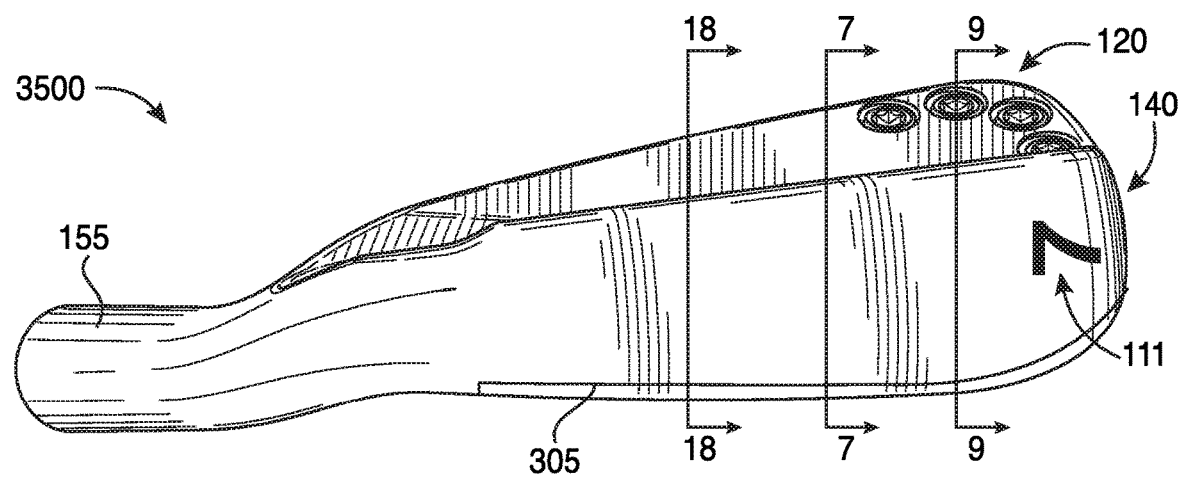
FIG. 40 depicts a bottom view of the example golf club head of FIG. 37.
Figure 41:
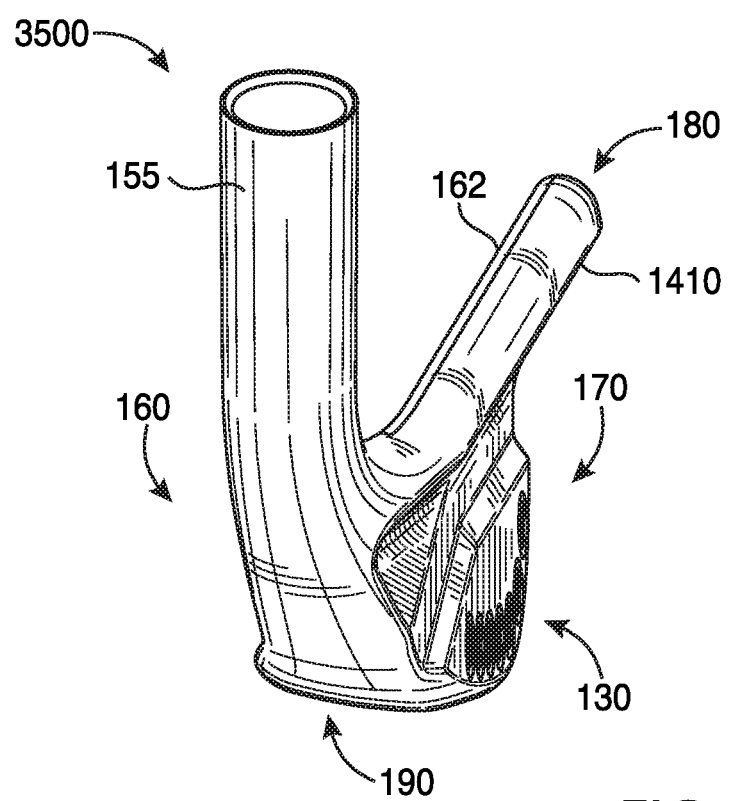
FIG. 41 depicts a heel side view of the example golf club head of FIG. 37.

FIG. 36 shows an example process 3600 to manufacture a golf club head 100. The process 3600 may include providing a body portion 110 defining an interior cavity 700 (block 3610). The body portion 110 may include a face opening 3410 accessing the interior cavity 700. The face opening 3410 may access the interior cavity 700 from a back portion, a sole portion, a top portion, a toe portion, a heel portion, a perimeter portion, and/or other portion(s) of the body portion 110. The process 3600 may include introducing a liquid structural adhesive 3514 to the interior cavity 700 through the face opening 3410 and allowing displaced air to escape (block 3620). The process 3600 may include joining a face portion 162 to cover an opening in the body portion 110 (block 3630). In one example, the face portion 162 may be adhered to the front portion 160 of the body portion 110 to cover the face opening 3410. Accordingly, the liquid structural adhesive may cure and solidify to form a solid structural adhesive 3514 after being introduced to the interior cavity 700. The solid structural adhesive 3514 may provide relatively high shear and peel strengths as described herein. The process 3300 may include curing the liquid structural adhesive for 24 hours at a temperature of 70° F. (21° C.). Accordingly, the resulting solid structural adhesive 3514 may exhibit a high overlap shear strength, as described herein, relative to the surface(s) of the body portion 110 and/or the face portion 162 forming the finished interior cavity 700. The liquid structural adhesive may be a two-part epoxy adhesive having a base material mixed with an accelerator material. In one example, the accelerator material may be a polymeric mercaptan. The apparatus, methods, and articles of manufacture described herein are not limited in this regard.

The heating and cooling processes described herein may be performed by conduction, convention, and/or radiation. For example, all of the heating and cooling processes may be performed by using heating or cooling systems that employ conveyor belts that move the golf club head 100 or any of the golf club heads described herein through a heating or cooling environment for a period of time as described herein. The apparatus, methods, and articles of manufacture described herein are not limited in this regard.

In one example, with reference to golf club head 100, variations in the coefficient of restitution (COR) associated with different locations or regions on the face portion 162 may be relatively small to provide an individual with a generally consistent golf ball trajectory, velocity and/or spin characteristics when the individual strikes a golf ball with different locations on the face portion 162 of a golf club head 100. In other words, the CORs associated with various face regions on the face portion 162 of the golf club head 100 or any of the golf club heads described herein may be within a certain range such that striking a golf ball at the various face regions provides similar golf ball trajectory, velocity and/or spin characteristics. The apparatus, methods, and articles of manufacture described herein are not limited in this regard.

Figure 42:
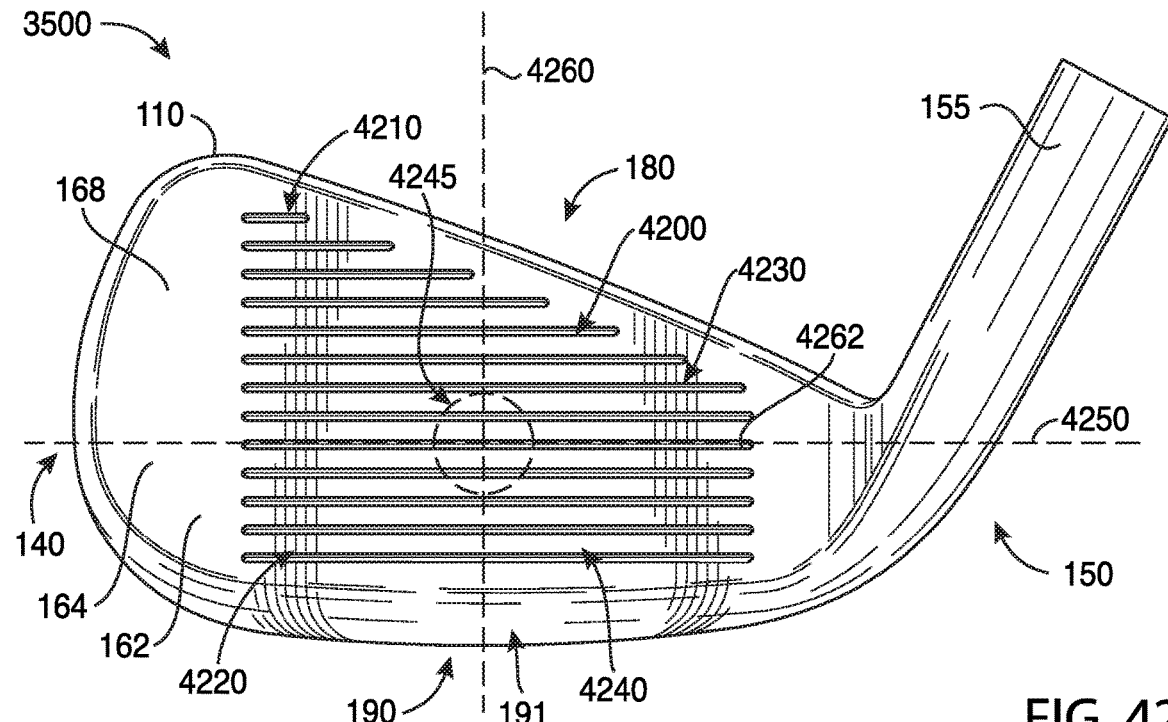
FIG. 42 depicts a front perspective view of the golf club head of FIG. 1 according to an embodiment of the apparatus, methods, and articles of manufacture described herein.
Figure 43:
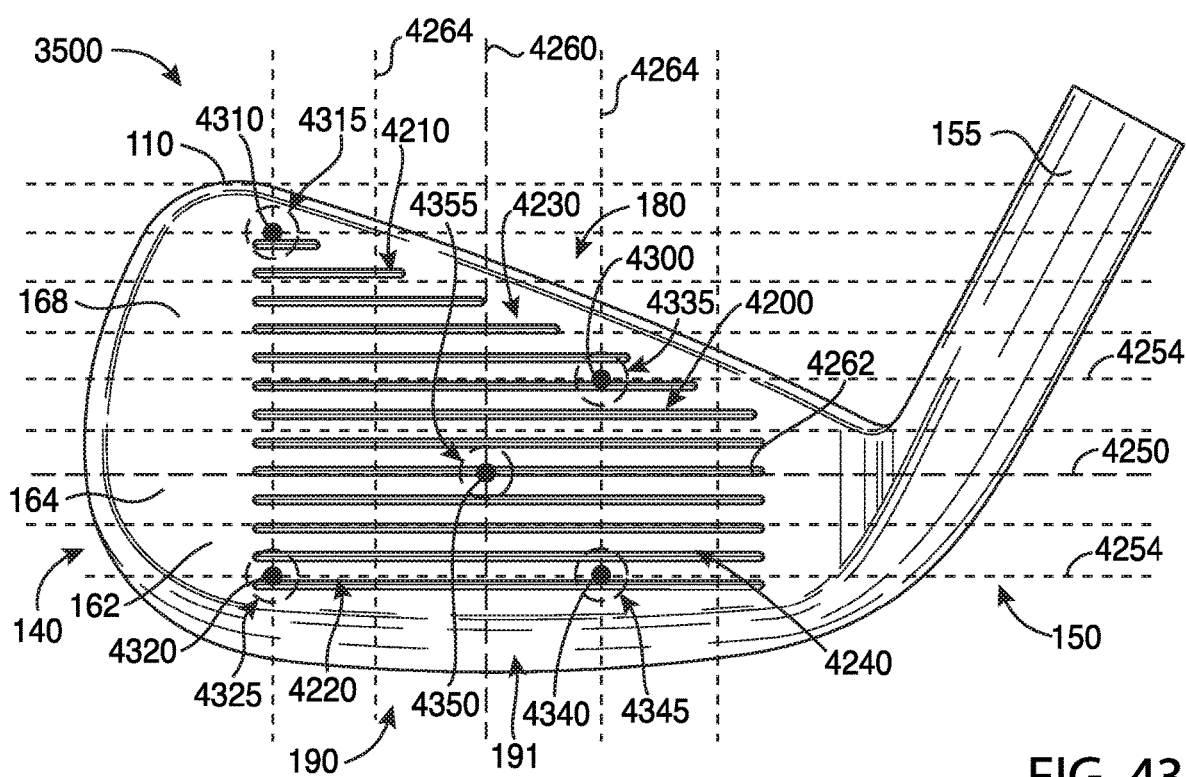
FIG. 43 depicts a front perspective view of the golf club head of FIG. 1 according to an embodiment of the apparatus, methods, and articles of manufacture described herein.

Although the following is described with respect to the golf club head 100, the apparatus, methods, and articles of manufacture described herein are equally applicable to any of the golf club heads described herein. In one example, as shown in FIGS. 42 and 43, the face portion 162 may include a plurality of face regions 4200, generally shown as a toe-top face region 4210, a toe-sole face region 4220, a heel-top face region 4230, and a heel-sole face region 4240. In particular, an x-axis 4250 and a y-axis 4260 associated with the loft plane of the face portion 162 may define four quadrants with each quadrant corresponding to one of the plurality of face regions. Each of the face regions 4210, 4220, 4230, and 4240 may be associated with a COR. Accordingly, the x-axis 4250 and the y-axis 4260 may be referred to herein as the COR x-axis 4250 and COR y-axis 4260, respectively. In one example, the COR x-axis 4250 may be located at a distance that is greater than or equal to 0.6 inch (15.24 mm) and less than or equal to 0.9 inch (22.86 mm) from a leading edge portion 191 of the golf club head 100 (e.g., an area where the front surface 164 of the front portion 160 meets a bottom surface of the sole portion 190). The COR y-axis 4260 may be located at one-half the length of the longest groove on the face portion 162. In the example of FIGS. 42 and 43, the COR y-axis 4260 is may be located at one-half the length of the groove 4262, which may be the longest groove (or one of the longest grooves) on the face portion 162. In other words, the COR y-axis 4260 may bisect the groove 4262. As shown in FIGS. 42 and 43, the COR x-axis 4250 and the COR y-axis 4260 may define a face origin (e.g., one shown as 4350 in FIG. 43). Further, the COR x-axis 4250 and the COR y-axis 4260 may divide the face portion 162 into four quadrants, which may be the toe-top face region 4210 (also referred to herein as the first quadrant 4210), the toe-sole face region 4220 (also referred to herein as the second quadrant 4220), the heel-top face region 4230 (also referred to herein as the third quadrant), and the heel-sole face region 4240 (also referred to herein as the fourth quadrant 4240). An area of the face portion 162 at or proximate to an intersection of the COR x-axis 4250 and the COR y-axis 4260 may define a center region 4245 of the face portion 162. In one example, the center region 4245 may represent a region of the face portion 162 with a different COR than other regions of the face portion 162 (e.g., relatively higher or lower COR). The COR of the center region 4245 may provide a reference COR to compare CORs associated with other locations on the face portion 162. The apparatus, methods, and articles of manufacture described herein are not limited in this regard.

While the figures may depict a particular number of face regions, the face portion 162 may include more or less face regions. In one example, the face portion 162 may include two face regions separated by the COR y-axis 4260 resulting in a first face region at or proximate to the toe portion 140 and a second face region at or proximate to the heel portion 150. In another example, the face portion 162 may include two face regions separated by the COR x-axis 4250 resulting in a first face region at or proximate to the top portion 180, and a second face region at or proximate to the sole portion 190. The apparatus, methods, and articles of manufacture described herein are not limited in this regard.

One or more locations in each of the first quadrant 4210, the second quadrant 4220, the third quadrant 4230, and the fourth quadrant 4240 may be associated with a COR. As shown in FIG. 43, for example, a plurality of locations defined by intersections of a plurality of horizontal grid lines 4254 and a plurality of vertical grid lines 4264 may be associated with each of the first quadrant 4210, the second quadrant 4220, the third quadrant 4230, and the fourth quadrant 4240. Each horizontal grid line 4254 may be parallel to the COR x-axis 4250 and separated by a distance from an adjacent horizontal grid line 4254. Each vertical grid line 4264 may be parallel to the COR y-axis 4260 and separated by a distance from an adjacent vertical grid line 4264. In one example, the plurality of horizontal grid lines 4254 may be separated by 0.5 inch (12.7 mm) whereas the plurality of vertical grid lines 4264 may be 0.25 inch (6.35 mm). In another example, the plurality of horizontal grid lines 4254 may be less than 0.25 inch (6.35 mm) and/or the plurality of vertical grid lines 4264 may be less than 0.25 inch (6.35 mm). In yet another example, the plurality of horizontal grid lines 4254 may be greater than 0.2 inch (5.08 mm) and/or the plurality of vertical grid lines 4264 may be greater than 0.1 inch (2.54 mm). The spacing between the plurality of horizontal grid lines 4254 and/or the spacing between the plurality of vertical grid lines 4264 may be determined based on the precision of a COR measurement method used to determine COR values at various locations on the face portion 162. The apparatus, methods, and articles of manufacture described herein are not limited in this regard.

In one example, as shown in FIGS. 42 and 43, the COR test locations on the face portion 162 may be systematically selected and located relative to the face origin of the COR x-axis 4250 and the COR y-axis 4260 by using the horizontal grid lines 4254 and the vertical grid lines 4264. In another example, the COR test locations on the face portion 162 may be selected and located by using radial grid lines (not shown) extending from the face origin of the COR x-axis 4250 and the COR y-axis 4260, which may be associated with the center region 4245. A plurality of radial grid lines (not shown) may extend from the face origin at certain angle increments from 0° (e.g., the COR x-axis 4250) to 360° (e.g., the COR x-axis 4250). In one example (not shown), radial grid lines may extend at 30° increments on the face portion 162. Accordingly, the first quadrant 4210 may be divided into three radial segments by a grid line at 30° and a grid line at 60°, the second quadrant 4220 may be divided into three radial segments by a grid line at 120° and a grid line at 150°, the third quadrant 4230 may be divided into three radial segments by a grid line at 210° and a grid line at 240°, and the fourth quadrant 4240 may be divided into three radial segments by a grid line at 300° and a grid line at 330°. Accordingly, each COR test location may be selected and located on each radial grid line at a certain distance (e.g., 0.25 inch, 0.5 inch, etc.) from the face origin of the COR x-axis 4250 and the COR y-axis 4260. The apparatus, methods, and articles of manufacture described herein are not limited in this regard.

The COR of any location on the face portion 162 may be determined by any of the COR measurement methods described herein and/or other suitable methods. In one example, the COR of a location on the face portion 162 may be determined by a ball drop method. In one example, the golf club head 100 may be fixed so that the face portion 162 is horizontally oriented. A USGA test golf ball as described herein may be dropped onto a test location of the face portion 162 from a certain drop distance. In one example, the drop distance may be greater than or equal to 20 inches (50.8 centimeters) and less than or equal to 30 inches (76.2 centimeters). In another example, the drop distance may be less than 20 inches (50.8 centimeters). In yet another example, the drop distance may be greater than 30 inches. The initial impact velocity of the golf ball may be measured at the point of impact with the face portion 162 (i.e., immediately before impact with the face portion 162). The bounce velocity of the golf ball (e.g., the velocity of the golf ball immediately after impact with and departure from the face portion 162) may then be measured. A ratio of the bounce velocity and the impact velocity may indicate the COR of the test location on the face portion 162. The ball drop method may be repeated for other test locations on the face portion 162 to determine the CORs of a plurality of locations on the face portion 162. The method of measuring COR may be repeated with multiple samples of the same brand and model of golf balls (e.g., identical or substantially identical golf balls). The apparatus, methods, and articles of manufacture described herein are not limited in this regard.

The COR measurement method described above may be applied to any location on the face portion 162. For example, CORs of random locations on the face portion 162 may be measured and compared with the COR of the center region 4245. In one example, as shown in FIG. 43, a plurality of the intersection points of the horizontal grid lines 4254 and the vertical grid lines 4264 may be used as the COR test locations (e.g., generally shown as intersection points 4310, 4320, 4330, 4340, and 4350). The first intersection point 4310 may be in the toe-top face region 4210 or the first quadrant 4210, the second intersection point 4320 may be in the toe-sole face region 4220 or the second quadrant 4220, the third intersection point 4330 may be in the heel-top face portion 4230 or the third quadrant 4240, the fourth intersection point 4340 may be in the heel-sole face portion 4240 or the fourth quadrant 4240, and the fifth intersection point 4350 may be at the face origin of the COR x-axis 4250 and the COR y-axis 4260, which may be associated with the center region 4245. When a test golf ball is vertically aligned with an intersection point and dropped on the face portion 162 during COR testing, an area on the surface of the test golf ball may contact an area on the face portion 162 that may be at or proximate to the intersection point. Accordingly, as shown in FIG. 43, each of the intersection points 4310, 4320, 4330, 4340, and 4350, may be associated to a COR test area (e.g., generally shown as 4315, 4325, 4335, 4345, and 4355, respectively). In another example, two or more test locations may be selected in each of the toe-sole face region 4210, the toe-sole region 4220, the heel-top face region 4230, and the heel-sole face region 4240. The method of dividing the face portion 162 into quadrants and identifying locations associated with CORs in each quadrant using the grid lines 4254 and 4262 as described herein may provide a systematic approach to determining CORs associated with various locations on the face portion 162 for analysis and comparison with a reference COR, such as the COR of the center region 4245. Accordingly, in another example, random test locations or test locations collectively representing various areas of the face portion 162 may be selected. The apparatus, methods, and articles of manufacture described herein are not limited in this regard.

As described herein, the COR x-axis may be located at a certain distance from a leading edge portion of a golf club head and the COR y-axis may be bisect the longest groove on the face portion of the golf club head to provide coordinates of a COR test location on the face portion 162 (e.g., (x, y)). The distance of the COR x-axis from the leading edge portion may depend on the type of golf club head (e.g., a 1-iron, a 2-iron, a 3-iron, a 4-iron, a 5-iron, a 6-iron, a 7-iron, an 8-iron, a 9-iron, a pitching wedge, etc.). In one example, as shown in FIG. 43, the COR x-axis 4250 that is 0.75 inches (19.05 millimeters) from the leading edge portion 191, and a COR y-axis 4260 that bisects the longest groove (e.g., the groove 4262) on the face portion 162 of a 7-iron golf club head. The first intersection point 4310, which may be located in the toe-top face region or the first quadrant 4210 as described herein, may have COR x-axis and COR y-axis coordinates of −1.0 inch (−25.4 millimeters) and 1.0 inch (25.4 millimeters), respectively (−1, 1), relative to the face origin (0, 0). The second intersection point 4320, which may be located in the toe-sole face region 4220 or the second quadrant 4220 as described herein, may have COR x-axis and COR y-axis coordinates of −1.0 inch (−25.4 millimeters) and −0.5 inch (−12.7 millimeters), respectively (−1, 0.5), relative to the face origin (0, 0). The third intersection point 4330, which may be in the heel-top face portion 4230 or the third quadrant 4240 as described herein, may have COR x-axis and COR y-axis coordinates of 0.5 inch (12.7 millimeters) and 0.5 inch (12.7 millimeters), respectively (0.5, 0.5), relative to the face origin (0, 0). The fourth intersection point 4340, which may be in the heel-sole face portion 4240 or the fourth quadrant 4240 as described herein, may have COR x-axis and COR y-axis coordinates of 0.5 inch (12.7 millimeters) and −0.5 inch (12.7 millimeters), respectively (0.5, −0.5), relative to the face origin (0, 0). The apparatus, methods, and articles of manufacture described herein are not limited in this regard.

As described above, the COR x-axis and the COR y-axis may define a reference coordinate system for selecting and locating a plurality of COR test locations on the face portion of a golf club head relative to the reference coordinate system. Accordingly, the COR x-axis and the COR y-axis may be at any location on the golf club head. In one example, as shown in FIGS. 42 and 43 and described herein, the COR x-axis may be located at a certain distance from a leading edge portion of a golf club head and the COR y-axis may bisect the longest groove on the face portion of the golf club head. In another example (not shown), the COR x-axis may be tangent to the leading edge portion of a golf club head and the COR y-axis may be bisect the longest groove on the face portion of the golf club head. In yet another example (not shown), the COR x-axis may be located at a certain distance from a leading edge portion of a golf club head and the COR y-axis may be tangent to a heel portion edge of the golf club head. The apparatus, methods, and articles of manufacture described herein are not limited in this regard.

In one example, with reference to FIG. 43, the difference between the COR of any one of the COR test areas 4315, 4325, 4335, 4345 and the COR of the test area 4355, which may correspond to the COR associated with the center region 4245 may be greater than or equal to −1% and less than or equal to 1%. In other words, the CORs associated with the four quadrants 4210, 4220, 4230 and 4240 may not deviate from the COR of the center region 4245 by more than 1%. In another example, the difference in the COR of any one of the COR test areas 4315, 4325, 4335, 4345 and the COR of the test area 4355 may be greater than or equal to −0.8% and less than or equal to 0.8%. In yet another example, the difference in the COR of any one of the COR test areas 4315, 4325, 4335, 4345 and the COR of the test area 4355 may be greater than or equal to −0.7% and less than or equal to 0.7%. In still yet another example, the difference in the COR of any one of the COR test areas 4315, 4325, 4335, 4345 and the COR of the test area 4355 may be greater than or equal to −0.5% and less than or equal to 0.5%. In further yet another example, the difference in the COR of any one of the COR test areas 4315, 4325, 4335, 4345 and the COR of the test area 4355 may be greater than or equal to −0.35% and less than or equal to 0.35%. In further yet another example, the difference in the COR of any one of the COR test areas 4315, 4325, 4335, 4345 and the COR of the test area 4355 may be greater than or equal to −0.25% and less than or equal to 0.25%. The apparatus, methods, and articles of manufacture described herein are not limited in this regard.

In one example, the difference in the CORs of any two COR test areas 4315, 4325, 4335, 4345 may be greater than or equal to −1% and less than or equal to 1%. In another example, the difference in the CORs of any two COR test areas 4315, 4325, 4335, 4345 may be greater than or equal to −0.5% and less than or equal to 0.5%. In yet another example, the difference in the CORs of any two COR test areas 4315, 4325, 4335, 4345 may be greater than or equal to −0.4% and less than or equal to 0.4%. In still yet another example, the difference in the CORs of any two COR test areas 4315, 4325, 4335, 4345 may be greater than or equal to −0.3% and less than or equal to 0.3%. In further yet another example, the difference in the CORs of any two COR test areas 4315, 4325, 4335, 4345 may be greater than or equal to −0.2% and less than or equal to 0.2%. In further yet another example, the difference in the CORs of any two COR test areas 4315, 4325, 4335, 4345 may be greater than or equal to −0.1% and less than or equal to 0.1%. The apparatus, methods, and articles of manufacture described herein are not limited in this regard.

Any of the golf club heads described herein may include a certain sound characteristics when striking a golf ball. In one example, the sound characteristics of any of the golf club heads described herein may be defined by sound pressure level (SPL), loudness, slope of the loudness curve, sharpness, and/or sound energy (i.e., energy of a signal or acoustic energy). SPL may be a logarithmic measure of the effective sound pressure relative to a reference sound pressure value. Sound pressure may be the local pressure deviation caused by a sound wave relative to ambient (average or equilibrium) atmospheric pressure. In one example, the reference sound pressure value may be 20 μPa (Pascal), which is the threshold of human hearing. Denoting measured sound pressure with P and reference sound pressure with $P_{ref}$, SPL is expressed in decibel units (dB) can be calculated as follows:

$$SPL = 10 \log\left(\frac{P^2}{P_{ref}^2}\right)$$

Loudness may be defined by human perceived intensity of stationary and time-variant sound. The science of psychoacoustics may use engineering methods and terminology for describing the properties of human hearing, from which methods for estimating human perceived sound intensity have been developed. Accordingly, loudness may be a psychoacoustic metric of evaluating perception of sound. One method used to estimate loudness may be the Zwicker method, which is standardized in international standard ISO 532-1 (ISO, 2017-06) and German Institute for Standardization DIN 45631-A1 (DIN, 2010-03) and is expressed in Zwicker Loudness or sone units. Loudness calculations may be based on duration, frequency content, and sound pressure level. Calculating loudness and plotting loudness values vs. time, which may be referred to herein as the loudness curve, may show loudness dissipation over time. In other words, the slope of the loudness curve may indicate how slow or fast the loudness dissipates over time. A relatively higher value of the slope may indicate slower dissipation of loudness and a lower value of the slope may indicate a faster dissipation of loudness. For an individual perceiving the sound of a golf club head striking a golf ball, a relatively slower dissipation of the loudness may provide a better indication of the characteristics of the shot and may be relatively more pleasant. Conversely, a relatively faster dissipation of loudness may not provide the individual an opportunity to determine the characteristics of the shot and may be relatively less pleasant. The apparatus, methods, and articles of manufacture described herein are not limited in this regard.

Sharpness may be another psychoacoustic metric, which is a measure of the high frequency content of a sound. For example, a relatively greater proportion of high frequencies may result in sharper sound. A method to calculate sharpness may be Aures Sharpness, which is a weighing scheme applied to the loudness spectrum. Sharpness is expressed in acum units.

Energy E in a sound signal x(t) (i.e., sound energy) may be expressed as:

$$E = \int_{-\infty}^{\infty} |x(t)|^2 dt$$

and in the frequency domain may be expressed as:

$$E = \int_{-\infty}^{\infty} |\hat{x}(f)|^2 df$$

Where: $\hat{x}(f) = \int_{-\infty}^{\infty} e^{-2\pi i f t} x(t) dt$ is the Fourier Transform of the signal, $f$ is the frequency in Hz, and E has units of Pascal²/second (Pa²/s)

Accordingly, the sound energy in the range of human hearing (i.e., 20 Hz to 20000 Hz) may be expressed as:

$$E_H = \int_{20}^{20000} |\hat{x}(f)|^2 df$$

In psychoacoustics (e.g., Zwicker method), the frequency range of human hearing may be divided into 24 critical bands to mimic or model the Basilar membrane (i.e., human inner ear). For example, the critical bands are shown in Table 1 below.

TABLE 1

| Number | Center Frequency (Hz) | Cut-off Frequency (Hz) | Bandwidth (Hz) |
|---|---|---|---|
|  |  | 20 |  |
| 1 | 60 | 100 | 80 |
| 2 | 150 | 200 | 100 |
| 3 | 250 | 300 | 100 |
| 4 | 350 | 400 | 100 |
| 5 | 450 | 510 | 110 |
| 6 | 570 | 630 | 120 |
| 7 | 700 | 770 | 140 |
| 8 | 840 | 920 | 150 |
| 9 | 1000 | 1080 | 160 |
| 10 | 1170 | 1270 | 190 |
| 11 | 1370 | 1480 | 210 |
| 12 | 1600 | 1720 | 240 |
| 13 | 1850 | 2000 | 280 |
| 14 | 2150 | 2320 | 320 |
| 15 | 2500 | 2700 | 380 |
| 16 | 2900 | 3150 | 450 |
| 17 | 3400 | 3700 | 550 |
| 18 | 4000 | 4400 | 700 |
| 19 | 4800 | 5300 | 900 |
| 20 | 5800 | 6400 | 1100 |
| 21 | 7000 | 7700 | 1300 |
| 22 | 8500 | 9500 | 1800 |
| 23 | 10500 | 12000 | 2500 |
| 24 | 13500 | 15500 | 3500 |

For example, the human ear may amplify frequencies between 2000 and 5000 Hz due to the shape of the human ear canal causing acoustic resonance. Accordingly, sound energy in or approximate to the $14^{th}$ through $19^{th}$ bands may have the greatest effect on human perception of sound. The apparatus, methods, and articles of manufacture described herein are not limited in this regard.

Figure 44:
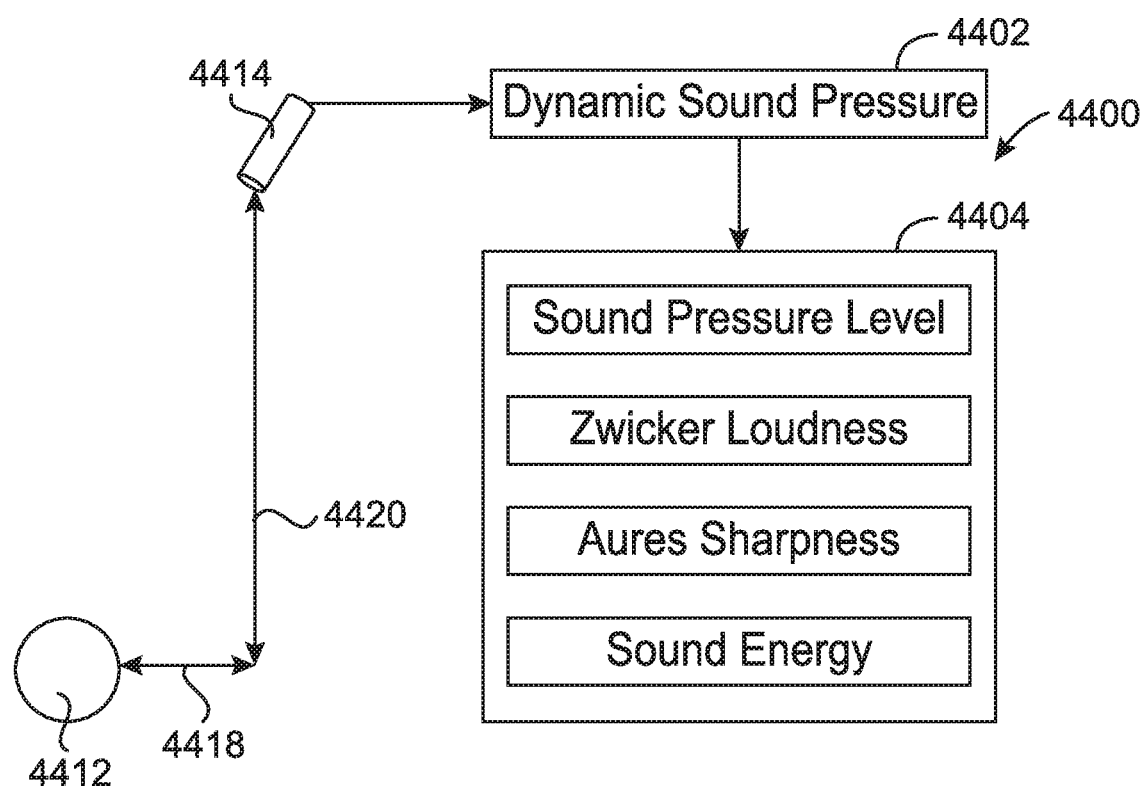
FIG. 44 depicts a manner in which sound characteristics of an example golf club head described herein may be determined.

In one example, as shown in FIG. 44, a method 4400 to calculate SPL, Zwicker Loudness, Aures Sharpness, and/or sound energy when a golf ball is struck by a golf club head may include measuring the sound pressure as the golf club head 100 strikes a golf ball (block 4402), and calculating SPL, Zwicker Loudness, Aures Sharpness, and/or sound energy (block 4404) based on the sound pressure measurements. To measure the sound pressure as the golf club head 100 strikes a golf ball, such as an example golf ball 4412 shown in FIG. 44, a microphone 4414 may be placed at a certain location relative to golf ball 4412. The microphone 4414 may be used to measure dynamic sound pressure (e.g., sound pressure sampled over a certain period of time) when the golf ball 4412 is struck by the golf club head 100. The microphone 4414 may be placed at a certain horizontal distance 4418 and/or a certain vertical distance 4420 relative to the golf ball 4412. In one example, the microphone 4414 may be positioned directly above the golf ball 4412 (i.e., the horizontal distance 4418 may be equal to zero or approximately zero). In another example, the horizontal distance 4418 may be less than about 4 inches. In another example, the horizontal distance 4418 may be greater than about 4 inches and less than about 10 inches. In another example, the horizontal distance 4418 may be greater than about 6 inches and less than about 8 inches. In yet another example, the horizontal distance 4418 may be about 7 inches. In one example, the vertical distance 4420 may be about 24 inches. In another example, the vertical distance 4420 may be greater than about 20 inches and less than about 50 inches. In another example, the vertical distance 4420 may be greater than about 30 inches and less than about 40 inches. In yet another example, the vertical distance 4420 may be about 35 inches. The microphone 4414 may be placed at any location relative to the ball 4412 depending on the measurement properties of the microphone 4414 and as long as the location of the microphone 4414 relative to the ball 4412 remains consistent throughout the sound measurement procedure for one or more golf club heads. The apparatus, methods, and articles of manufacture described herein are not limited in this regard.

The sound pressure may be measured at a certain golf club head speed (e.g., speed at or proximate to the time of impact of the golf club head with the golf ball), which may depend on the loft angle of the golf club head. In one example, the swinging of a golf club to achieve a certain golf club head speed may be performed by a swing robot, such as a swing robot manufactured by Golf Laboratories of San Diego, Calif. In another example, the test golf club head may be placed in a fixed position such that the face of the golf club head is vertically oriented. A golf ball may then be launched horizontally towards the face of the golf club head at a certain speed that may be equivalent to a certain golf club head speed. The golf ball may be launched with an air cannon or a similar device. The apparatus, methods, and articles of manufacture described herein are not limited in this regard.

In one example, a golf club head may be tested at a speed of 80 miles per hour (mph) or approximately 80 mph. In another example, a golf club head may be tested at a speed of 85 miles per hour (mph) or approximately 85 mph. In another example, a golf club head may be tested at a speed of 90 miles per hour (mph) or approximately 90 mph. In another example, a golf club head may be tested at a speed that may be greater than or equal to 60 mph and less than or equal to 150 mph. The apparatus, methods, and articles of manufacture described herein are not limited in this regard.

The speed by which a golf club head is tested may depend on the loft angle of the golf club head. In one example, the golf club head speed may be approximately expressed as a function of golf club head loft angle according to the following polynomial equation:

$$V=0.05\theta^2-3.43\theta+134$$

Where: V is the golf club head speed in miles per hour (mph), and
θ is the loft angle in degrees.

In another example, the golf club head speed may be approximately expressed as a function of golf club head loft angle according to the following linear equation:

$$V=-0.72\theta+101$$

Accordingly the golf club head speed may vary depending on the golf club head loft angle. The apparatus, methods, and articles of manufacture described herein are not limited in this regard.

The sound pressure measurement may be repeated a certain number of iterations and at a certain sampling rate for the same golf club head to provide data consistency. In one example, the sound pressure measurement may be performed for 10 strikes of a golf club head with the golf ball 4414 at a sampling rate of 102,400 samples per second. The sound pressure of each impact may be recorded for a certain amount of time before and after the impact of the golf club head with the golf ball to capture the sound pressure during and after impact of the golf club head with the golf ball. In one example, the sound pressure may be recorded for about 100 milliseconds. In another example, the sound pressure may be recorded for about 200 milliseconds. In yet another example, the sound pressure may be recorded for about 300 milliseconds. In still yet another example, the sound pressure level may be recorded for about 400 milliseconds. Any of the sound pressure measurement parameters described herein may be varied depending on a number of measurement factors such as environmental conditions (e.g., ambient noise, temperature, pressure, etc.), the fidelity of the measurement equipment (e.g., microphone sensitivity and range), and/or the computational or processing power of any processing equipment used (e.g., computer hardware and/or software used for sound data analysis). The apparatus, methods, and articles of manufacture described herein are not limited in this regard.

In one example, for a golf club head according to any of the golf club heads described herein having a loft angle of 45° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 2 below:

TABLE 2

| | Golf Club Head Speed | | |
|---|---|---|---|
| | 80 mph | 85 mph | 90 mph |
| SPL (dB) | ≤123.56 | ≤124.04 | ≤125.64 |
| Loudness (sone) | ≤85.88 | ≤85.88 | ≤98.01 |
| Sharpness (acum) | ≤13.53 | ≤13.95 | ≤15.51 |
| Sound Energy (Pa$^2$/s) | ≤644.78 | ≤705.67 | ≤1035.60 |
| Sound Energy (Pa$^2$/s), 14-19 Critical Bands | ≤369.11 | ≤373.64 | ≤529.37 |

In another example, for a golf club head according to any of the golf club heads described herein having a loft angle of 45° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 3 below:

TABLE 3

| | Golf Club Head Speed | | |
|---|---|---|---|
| | 80 mph | 85 mph | 90 mph |
| SPL (dB) | <123.24 | <124.88 | <126.75 |
| Loudness (sone) | <91.96 | <96.38 | <99.71 |
| Sharpness (acum) | <14.13 | <14.82 | <15.27 |
| Sound Energy (Pa$^2$/s) | <727.52 | <903.38 | <1107.80 |
| Sound Energy (Pa$^2$/s), 14-19 Critical Bands | <463.97 | <571.63 | <686.45 |

In yet another example, for a golf club head according to any of the golf club heads described herein having a loft angle of 45° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 4 below:

TABLE 4

| | Golf Club Head Speed | | |
|---|---|---|---|
| | 80 mph | 85 mph | 90 mph |
| SPL (dB) | <126.19 | <126.74 | <128.05 |
| Loudness (sone) | <92.78 | <97.94 | <104.01 |
| Sharpness (acum) | <14.80 | <15.29 | <15.69 |
| Sound Energy (Pa$^2$/s) | <857.96 | <1072.70 | <1339.40 |
| ISound Energy (Pa$^2$/s), 14-19 Critical Bands | <470.20 | <599.31 | <745.60 |

In one example, for a golf club head according to any of the golf club heads described herein having a loft angle of 40° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 5 below:

TABLE 5

| | Golf Club Head Speed | | |
|---|---|---|---|
| | 80 mph | 85 mph | 90 mph |
| SPL (dB) | ≤124.08 | ≤124.02 | ≤126.06 |
| Loudness (sone) | ≤86.08 | ≤86.08 | ≤92.97 |
| Sharpness (acum) | ≤15.25 | ≤14.93 | ≤15.21 |
| Sound Energy (Pa$^2$/s) | ≤782.33 | ≤858.17 | ≤1022.90 |
| Sound Energy (Pa$^2$/s), 14-19 Critical Bands | ≤402.53 | ≤445.48 | ≤506.88 |

In another example, for a golf club head according to any of the golf club heads described herein having a loft angle of 40° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 6 below:

TABLE 6

| | Golf Club Head Speed | | |
|---|---|---|---|
| | 80 mph | 85 mph | 90 mph |
| SPL (dB) | <127.99 | <128.24 | <127.65 |
| Loudness (sone) | <92.66 | <95.11 | <100.81 |
| Sharpness (acum) | <15.51 | <15.47 | <16.07 |
| Sound Energy (Pa$^2$/s) | <910.49 | <1050.90 | <1242.40 |
| Sound Energy (Pa$^2$/s), 14-19 Critical Bands | <435.25 | <527.35 | <608.53 |

In yet another example, for a golf club head according to any of the golf club heads described herein having a loft angle of 40° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 7 below:

TABLE 7

| | Golf Club Head Speed | | |
|---|---|---|---|
| | 80 mph | 85 mph | 90 mph |
| SPL (dB) | <127.30 | <128.22 | <127.62 |
| Loudness (sone) | <96.76 | <102.52 | <106.25 |
| Sharpness (acum) | <15.63 | <16.19 | <16.49 |
| Sound Energy (Pa$^2$/s) | <1070.20 | <1367.60 | <1530.20 |
| Sound Energy (Pa$^2$/s), 14-19 Critical Bands | <572.28 | <683.97 | <785.31 |

In one example, for a golf club head according to any of the golf club heads described herein having a loft angle of 35° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 8 below:

TABLE 8

| | Golf Club Head Speed | | |
|---|---|---|---|
| | 80 mph | 85 mph | 90 mph |
| SPL (dB) | ≤125.58 | ≤127.29 | ≤128.05 |
| Loudness (sone) | ≤87.99 | ≤87.99 | ≤96.11 |
| Sharpness (acum) | ≤14.51 | ≤15.03 | ≤15.41 |
| Sound Energy (Pa$^2$/s) | ≤793.91 | ≤967.32 | ≤1127.60 |
| Sound Energy (Pa$^2$/s), 14-19 Critical Bands | ≤430.05 | ≤503.67 | ≤601.55 |

In another example, for a golf club head according to any of the golf club heads described herein having a loft angle of 35° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 9 below:

TABLE 9

| | Golf Club Head Speed | | |
|---|---|---|---|
| | 80 mph | 85 mph | 90 mph |
| SPL (dB) | <125.71 | <126.55 | <128.46 |
| Loudness (sone) | <92.38 | <97.11 | <102.48 |
| Sharpness (acum) | <14.87 | <14.44 | <15.49 |
| Sound Energy (Pa$^2$/s) | <848.77 | <1004.50 | <1223.10 |
| Sound Energy (Pa$^2$/s), 14-19 Critical Bands | <408.38 | <563.02 | <623.88 |

In yet another example, for a golf club head according to any of the golf club heads described herein having a loft angle of 35° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 10 below:

TABLE 10

| | Golf Club Head Speed | | |
|---|---|---|---|
| | 80 mph | 85 mph | 90 mph |
| SPL (dB) | <127.64 | <128.38 | <129.65 |
| Loudness (sone) | <96.35 | <99.40 | <105.35 |
| Sharpness (acum) | <14.98 | <15.54 | <16.10 |
| Sound Energy ($Pa^2/s$) | <1036.30 | <1119.40 | <1420.90 |
| Sound Energy ($Pa^2/s$), 14-19 Critical Bands | <544.24 | <552.07 | <674.36 |

In one example, for a golf club head according to any of the golf club heads described herein having a loft angle of 31° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 11 below:

TABLE 11

| | Golf Club Head Speed | | |
|---|---|---|---|
| | 80 mph | 85 mph | 90 mph |
| SPL (dB) | ≤126.10 | ≤126.54 | ≤127.73 |
| Loudness (sone) | ≤92.30 | ≤92.30 | ≤101.66 |
| Sharpness (acum) | ≤14.35 | ≤14.92 | ≤15.34 |
| Sound Energy ($Pa^2/s$) | ≤875.15 | ≤1013.90 | ≤1283.90 |
| Sound Energy ($Pa^2/s$), 14-19 Critical Bands | ≤485.98 | ≤542.74 | ≤661.51 |

In another example, for a golf club head according to any of the golf club heads described herein having a loft angle of 31° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 12 below:

TABLE 12

| | Golf Club Head Speed | | |
|---|---|---|---|
| | 80 mph | 85 mph | 90 mph |
| SPL (dB) | <126.91 | <127.99 | <129.46 |
| Loudness (sone) | <96.95 | <102.16 | <108.67 |
| Sharpness (acum) | <14.63 | <15.73 | <16.43 |
| Sound Energy ($Pa^2/s$) | <994.99 | <1235.30 | <1610.60 |
| Sound Energy ($Pa^2/s$), 14-19 Critical Bands | <474.84 | <630.03 | <799.87 |

In yet another example, for a golf club head according to any of the golf club heads described herein having a loft angle of 31° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 13 below:

TABLE 13

| | Golf Club Head Speed | | |
|---|---|---|---|
| | 80 mph | 85 mph | 90 mph |
| SPL (dB) | <127.71 | <129.57 | <130.76 |
| Loudness (sone) | <108.78 | <113.45 | <119.13 |
| Sharpness (acum) | <16.52 | <17.16 | <18.01 |
| Sound Energy ($Pa^2/s$) | <1595.80 | <1878.00 | <2335.40 |
| Sound Energy ($Pa^2/s$), 14-19 Critical Bands | <1041.00 | <1224.80 | <1399.10 |

In one example, for a golf club head according to any of the golf club heads described herein having a loft angle of 27° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 14 below:

TABLE 14

| | Golf Club Head Speed | | |
|---|---|---|---|
| | 80 mph | 85 mph | 90 mph |
| SPL (dB) | ≤126.52 | ≤127.59 | ≤128.91 |
| Loudness (sone) | ≤89.67 | ≤89.67 | ≤101.71 |
| Sharpness (acum) | ≤14.62 | ≤14.98 | ≤15.61 |
| Sound Energy ($Pa^2/s$) | ≤827.77 | ≤1040.40 | ≤1308.00 |
| Sound Energy ($Pa^2/s$), 14-19 Critical Bands | ≤453.43 | ≤544.90 | ≤691.30 |

In another example, for a golf club head according to any of the golf club heads described herein having a loft angle of 27° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 15 below:

TABLE 15

| | Golf Club Head Speed | | |
|---|---|---|---|
| | 80 mph | 85 mph | 90 mph |
| SPL (dB) | <127.31 | <128.86 | <129.73 |
| Loudness (sone) | <91.89 | <97.63 | <103.52 |
| Sharpness (acum) | <15.48 | <16.25 | <16.19 |
| Sound Energy (Pa$^2$/s) | <1003.70 | <1324.70 | <1523.80 |
| Sound Energy (Pa$^2$/s), 14-19 Critical Bands | <476.34 | <601.80 | <712.21 |

In yet another example, for a golf club head according to any of the golf club heads described herein having a loft angle of 27° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 16 below:

TABLE 16

| | Golf Club Head Speed | | |
|---|---|---|---|
| | 80 mph | 85 mph | 90 mph |
| SPL (dB) | <128.33 | <129.10 | <130.71 |
| Loudness (sone) | <106.58 | <110.13 | <114.56 |
| Sharpness (acum) | <17.06 | <16.96 | <17.81 |
| Sound Energy (Pa$^2$/s) | <1540.80 | <1715.20 | <2144.10 |
| Sound Energy (Pa$^2$/s), 14-19 Critical Bands | <841.67 | <951.93 | <1010.60 |

In one example, for a golf club head according to any of the golf club heads described herein having a loft angle of 24° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 17 below:

TABLE 17

| | Golf Club Head Speed | | |
|---|---|---|---|
| | 80 mph | 85 mph | 90 mph |
| SPL (dB) | ≤126.59 | ≤127.25 | ≤127.89 |
| Loudness (sone) | ≤93.81 | ≤93.81 | ≤103.21 |
| Sharpness (acum) | ≤14.81 | ≤15.08 | ≤15.21 |
| Sound Energy (Pa$^2$/s) | ≤1014.40 | ≤1158.10 | ≤1398.80 |
| Sound Energy (Pa$^2$/s), 14-19 Critical Bands | ≤529.79 | ≤616.79 | ≤755.32 |

In another example, for a golf club head according to any of the golf club heads described herein having a loft angle of 24° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 18 below:

TABLE 18

| | Golf Club Head Speed | | |
|---|---|---|---|
| | 80 mph | 85 mph | 90 mph |
| SPL (dB) | <126.29 | <127.83 | <128.58 |
| Loudness (sone) | <94.44 | <100.59 | <104.51 |
| Sharpness (acum) | <14.82 | <15.26 | <15.04 |
| Sound Energy (Pa$^2$/s) | <1071.20 | <1351.40 | <1482.60 |
| Sound Energy (Pa$^2$/s), 14-19 Critical Bands | <620.78 | <775.21 | <892.78 |

In yet another example, for a golf club head according to any of the golf club heads described herein having a loft angle of 24° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 19 below:

TABLE 19

| | Golf Club Head Speed | | |
|---|---|---|---|
| | 80 mph | 85 mph | 90 mph |
| SPL (dB) | <127.76 | <128.85 | <128.55 |
| Loudness (sone) | <103.48 | <108.33 | <112.98 |
| Sharpness (acum) | <16.23 | <16.67 | <16.25 |
| Sound Energy (Pa$^2$/s) | <1443.70 | <1706.50 | <1939.10 |
| Sound Energy (Pa$^2$/s), 14-19 Critical Bands | <789.18 | <921.39 | <1114.10 |

In one example, for a golf club head according to any of the golf club heads described herein having a loft angle of 21.5° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 20 below:

TABLE 20

| | Golf Club Head Speed | | |
|---|---|---|---|
| | 80 mph | 85 mph | 90 mph |
| SPL (dB) | ≤125.67 | ≤126.97 | ≤128.29 |
| Loudness (sone) | ≤94.39 | ≤94.39 | ≤106.57 |
| Sharpness (acum) | ≤14.27 | ≤14.69 | ≤15.13 |
| Sound Energy (Pa$^2$/s) | ≤882.92 | ≤1115.70 | ≤1384.20 |
| Sound Energy (Pa$^2$/s), 14-19 Critical Bands | ≤433.34 | ≤550.09 | ≤743.48 |

In another example, for a golf club head according to any of the golf club heads described herein having a loft angle of 21.5° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 21 below:

TABLE 21

| | Golf Club Head Speed | | |
|---|---|---|---|
| | 80 mph | 85 mph | 90 mph |
| SPL (dB) | <125.05 | <126.86 | <127.22 |
| Loudness (sone) | <104.22 | <107.24 | <117.31 |
| Sharpness (acum) | <15.16 | <15.61 | <15.19 |
| Sound Energy (Pa$^2$/s) | <1213.70 | <1399.50 | <1860.90 |
| Sound Energy (Pa$^2$/s), 14-19 Critical Bands | <626.91 | <726.26 | <1003.70 |

In yet another example, for a golf club head according to any of the golf club heads described herein having a loft angle of 21.5° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in SPL, loudness, sharpness and sound energy for golf club head speeds of 80 mph, 85 mph, and 90 mph as shown in Table 22 below:

TABLE 22

| | Golf Club Head Speed | | |
|---|---|---|---|
| | 80 mph | 85 mph | 90 mph |
| SPL (dB) | <129.18 | <128.04 | <129.34 |
| Loudness (sone) | <105.07 | <110.83 | <117.55 |
| Sharpness (acum) | <17.47 | <16.25 | <16.24 |
| Sound Energy (Pa$^2$/s) | <1584.70 | <1736.70 | <2134.20 |
| Sound Energy (Pa$^2$/s), 14-19 Critical Bands | <592.09 | <876.70 | <1153.80 |

In one example, for a set of golf club heads according to any of the golf club heads described herein having loft angles of 45° (±2°), 40° (±2°), 35° (±2°), 31° (±2°), 27° (±2°), 24° (±2°), or 21.5° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in the following loudness (sone) for each loft angle at golf club head speeds of 80 mph, 85 mph, and 90 mph as shown in Table 23 below:

TABLE 23

| | Golf Club Head Speed | | |
|---|---|---|---|
| | 80 mph | 85 mph | 90 mph |
| Loudness (sone) for loft angle of 45° (±2°) | ≤85.01 | ≤87.87 | ≤95.52 |
| Loudness (sone) for loft angle of 40° (±2°) | ≤88.47 | ≤92.64 | ≤99.81 |
| Loudness (sone) for loft angle of 35° (±2°) | ≤90.23 | ≤94.76 | ≤99.91 |
| Loudness (sone) for loft angle of 31° (±2°) | ≤92.28 | ≤98.06 | ≤102.93 |
| Loudness (sone) for loft angle of 27° (±2°) | ≤89.10 | ≤94.52 | ≤101.59 |
| Loudness (sone) for loft angle of 24° (±2°) | ≤92.97 | ≤97.33 | ≤103.38 |
| Loudness (sone) for loft angle of 21.5° (±2°) | ≤98.11 | ≤103.63 | ≤109.14 |

Figure 45:
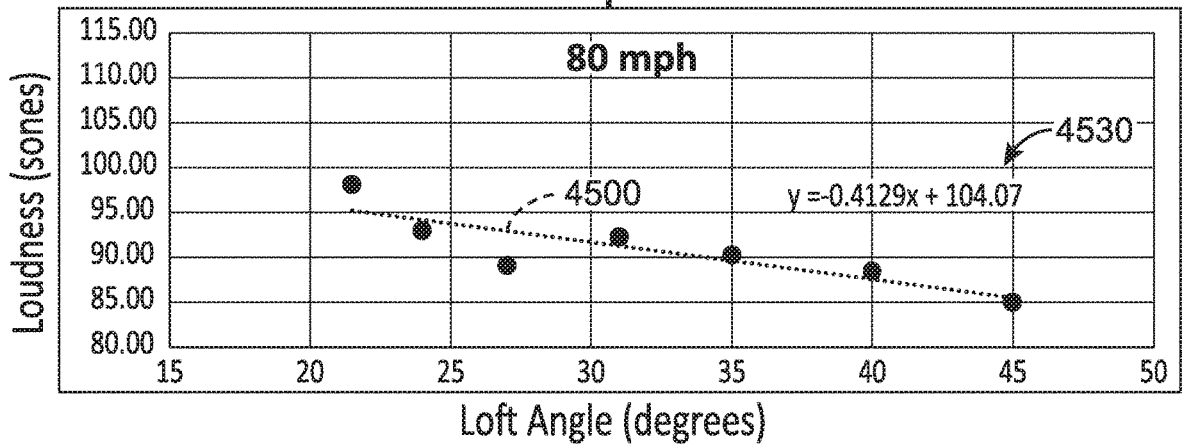
FIG. 45 illustrates a relationship between loudness and increasing loft angle at three different golf club head speeds according to an embodiment of the apparatus, methods, and articles of manufacture described herein.
Figure 45:
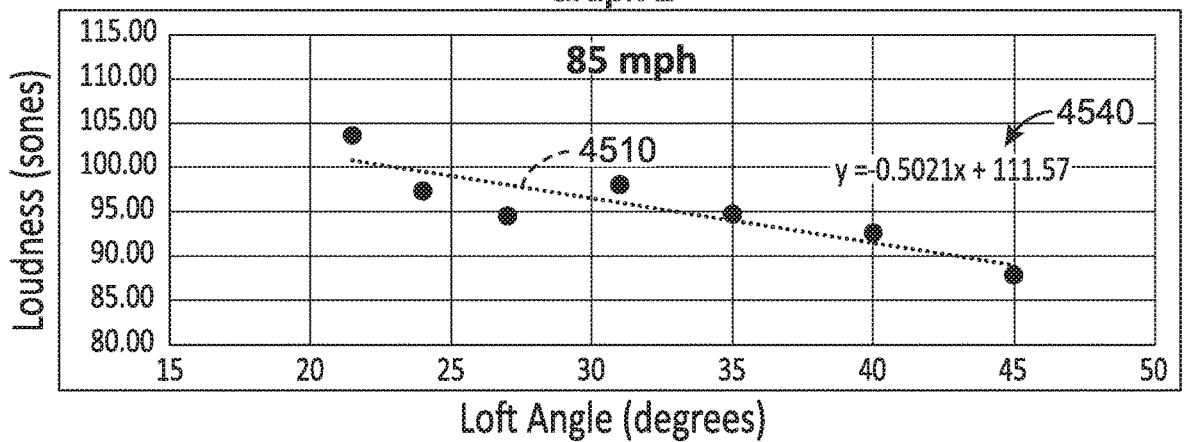
Figure 45:
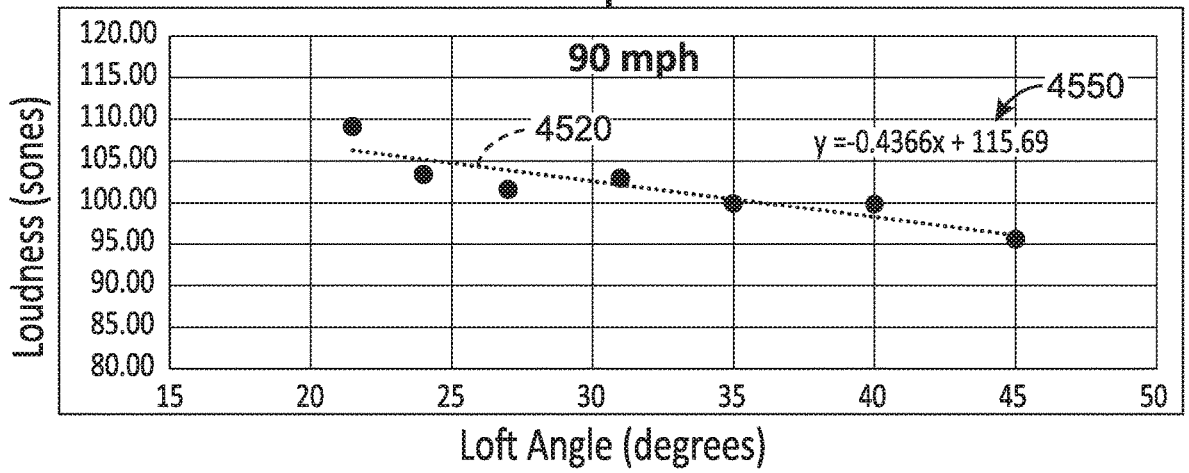

The data of Table 23 may be plotted to generate the three graphs shown in FIG. 45 as graphs 1, 2, and 3. The graphs 1, 2, and 3 illustrate a relationship between loudness (sone) and loft angle (degrees) at golf club head speeds of 80 mph, 85 mph, and 90 mph, respectively. A trendline 4500, 4510, and 4520 may be derived for each of the graphs 1, 2, and 3. The trendlines 4500, 4510, and 4520 may be defined by the following corresponding equations 4530, 4540, and 4550 in slope-intercept form:

$$y=-0.4129x+104.07 \quad (4530)$$

$$y=-0.5021x+111.57 \quad (4540)$$

$$y=-0.4366x+115.69 \quad (4550)$$

Where: y is loudness in sones, and
x is the loft angle in degrees.

While the trendlines 4500, 4510, and 4520 are generally shown as linear trendlines, the trendlines 4500, 4510, and/or 4520 may be alternatively represented as other types of trendlines such as, but not limited to, logarithmic and moving average. For all three golf club head speeds of 80 mph, 85 mph, and 90 mph, the corresponding trendlines 4500, 4510, and 4520 may have negative slopes showing loudness tends to decrease with increasing loft angle, or in other words, changes in loudness may be inversely related to changes in loft angle. For example, for the golf club head speed of 80 mph, loudness may tend to decrease at a rate of 0.4129 (sones/degree loft angle) or approximately 0.4129 (sones/degree loft angle). For the golf club head speed of 85 mph, loudness may tend to decrease at a rate of 0.5021 (sones/degree loft angle) or approximately 0.5021 (sones/degree loft angle). For the golf club head speed of 90 mph, loudness may tend to decrease at a rate of 0.4366 (sones/degree loft angle) or approximately 0.4366 (sones/degree loft angle). Accordingly, with respect to the present example, the rate at which loudness decreases with increasing loft angle may be greatest for the golf club head speed of 85 mph, followed in turn by the golf club head speed of 90 mph and the golf club head speed of 85 mph. The apparatus, methods, and articles of manufacture described herein are not limited in this regard.

In another example, for a set of golf club heads according to any of the golf club heads described herein having loft angles of 45° (±2°), 40° (±2°), 35° (±2°), 31° (±2°), 27° (±2°), 24° (±2°), and 21.5° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in the following loudness (sone) for each loft angle at golf club head speeds of 80 mph, 85 mph, and 90 mph as shown in Table 24 below:

TABLE 24

| | Golf Club Head Speed | | |
|---|---|---|---|
| | 80 mph | 85 mph | 90 mph |
| Loudness (sone) for loft angle of 45° (±2°) | ≤85.55 | ≤89.74 | ≤96.91 |
| Loudness (sone) for loft angle of 40° (±2°) | ≤82.58 | ≤86.85 | ≤92.90 |
| Loudness (sone) for loft angle of 35° (±2°) | ≤84.98 | ≤89.10 | ≤94.70 |
| Loudness (sone) for loft angle of 31° (±2°) | ≤89.53 | ≤94.02 | ≤100.66 |
| Loudness (sone) for loft angle of 27° (±2°) | ≤87.67 | ≤92.45 | ≤98.95 |
| Loudness (sone) for loft angle of 24° (±2°) | ≤90.78 | ≤96.55 | ≤101.69 |
| Loudness (sone) for loft angle of 21.5° (±2°) | ≤92.28 | ≤97.07 | ≤101.82 |

Figure 46:
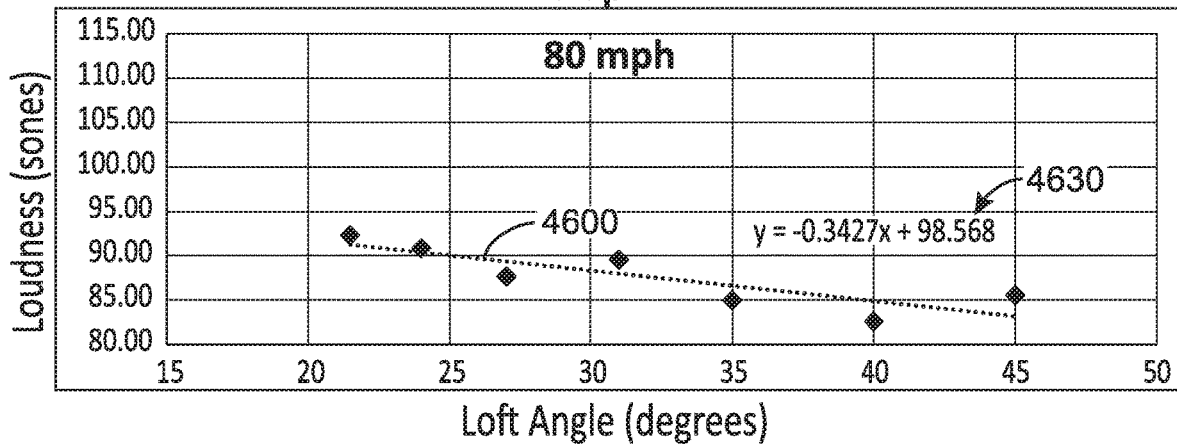
FIG. 46 illustrates a relationship between loudness and increasing loft angle at three different golf club head speeds according to another embodiment of the apparatus, methods, and articles of manufacture described herein.
Figure 46:
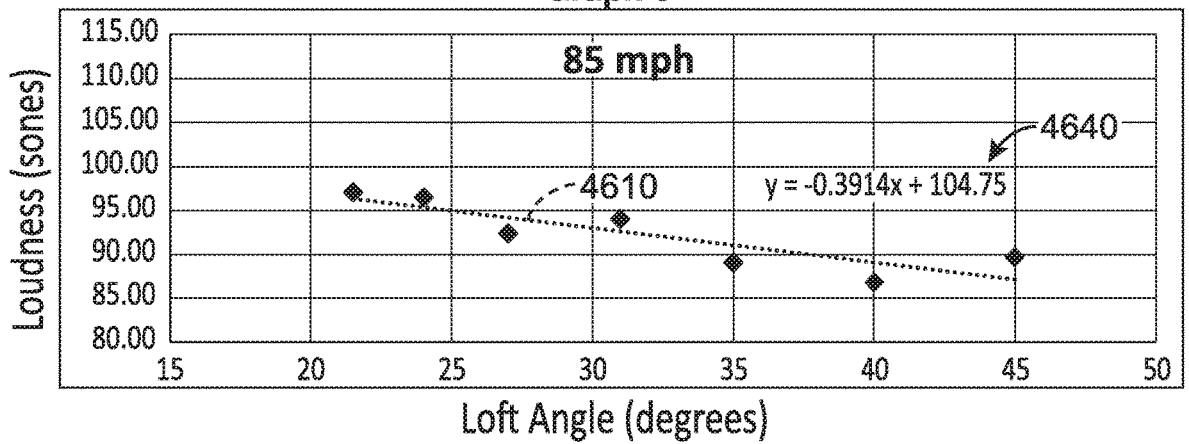
Figure 46:
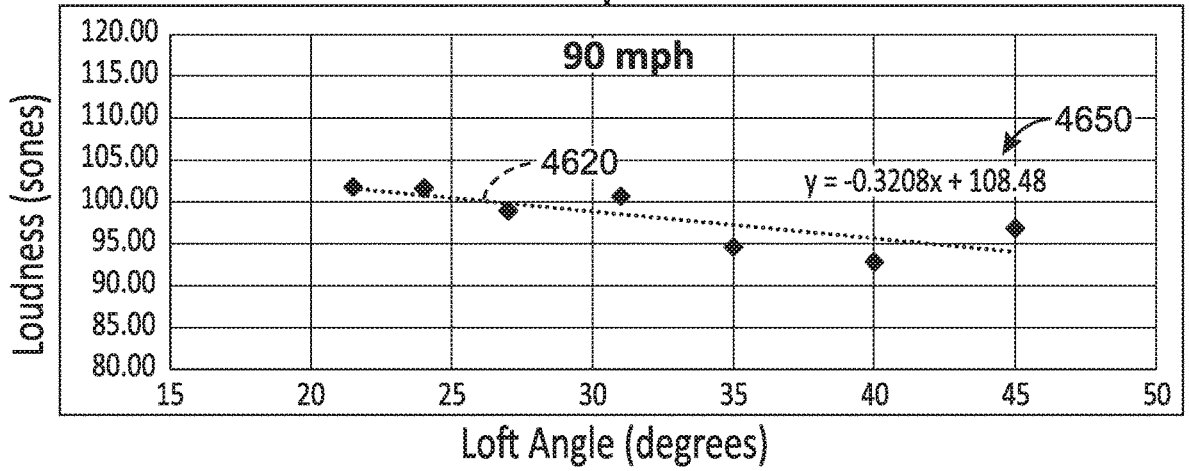

The data of Table 24 may be plotted to generate the three graphs shown in FIG. 46 as graphs 4, 5, and 6. The graphs 4, 5, and 6 illustrate a relationship between loudness (sone) and loft angle (degrees) at golf club head speeds of 80 mph, 85 mph, and 90 mph, respectively. A trendline 4600, 4610, and 4620 may be derived for each of the graphs 4, 5, and 6. The trendlines 4600, 4610, and 4620 may be defined by the following corresponding equations 4630, 4640, and 4650 in slope-intercept form:

$$y=-0.3427x+98.568 \quad (4630)$$

$$y=-0.3914x+104.75 \quad (4640)$$

$$y=-0.3208x+108.48 \quad (4650)$$

Where: y is loudness in sones, and
x is the loft angle in degrees.

While the trendlines 4600, 4610, and 4620 are generally shown as linear trendlines, the trendlines 4600, 4610, and/or 4620 may be alternatively represented as other types of trendlines such as, but not limited to, logarithmic and moving average. For all three golf club head speeds of 80 mph, 85 mph, and 90 mph, the corresponding trendlines 4600, 4610, and 4620 may have negative slopes showing loudness tends to decrease with increasing loft angle, or in other words, changes in loudness may be inversely related to changes in loft angle. For example, for the golf club head speed of 80 mph, loudness may tend to decrease at a rate of 0.3427 (sones/degree loft angle) or approximately 0.3427 (sones/degree loft angle). For the golf club head speed of 85 mph, loudness may tend to decrease at a rate of 0.3914 (sones/degree loft angle) or approximately 0.3914 (sones/degree loft angle). For the golf club head speed of 90 mph, loudness may tend to decrease at a rate of 0.3208 (sones/degree loft angle) or approximately 0.3208 (sones/degree loft angle). Accordingly, with respect to the present example, the rate at which loudness decreases with increasing loft angle may be greatest for the golf club head speed of 85 mph, followed in turn by the golf club head speed of 80 mph and the golf club head speed of 90 mph. The apparatus, methods, and articles of manufacture described herein are not limited in this regard.

In another example, for a set of golf club heads according to any of the golf club heads described herein having loft angles of 45° (±2°), 40° (±2°), 35° (±2°), 31° (±2°), 27° (±2°), 24° (±2°), or 21.5° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in the following loudness (sone) for each loft angle at golf club head speeds of 80 mph, 85 mph, and 90 mph as shown in Table 25 below:

TABLE 25

| | Golf Club Head Speed | | |
|---|---|---|---|
| | 80 mph | 85 mph | 90 mph |
| Loudness (sone) for loft angle of 45° (±2°) | ≤86.88 | ≤90.68 | ≤94.48 |
| Loudness (sone) for loft angle of 40° (±2°) | ≤85.27 | ≤90.72 | ≤98.05 |
| Loudness (sone) for loft angle of 35° (±2°) | ≤89.30 | ≤93.37 | ≤98.35 |
| Loudness (sone) for loft angle of 31° (±2°) | ≤89.91 | ≤95.43 | ≤101.72 |
| Loudness (sone) for loft angle of 27° (±2°) | ≤89.44 | ≤94.18 | ≤100.50 |
| Loudness (sone) for loft angle of 24° (±2°) | ≤91.65 | ≤95.51 | ≤101.60 |
| Loudness (sone) for loft angle of 21.5° (±2°) | ≤90.63 | ≤94.63 | ≤100.14 |

Figure 47:
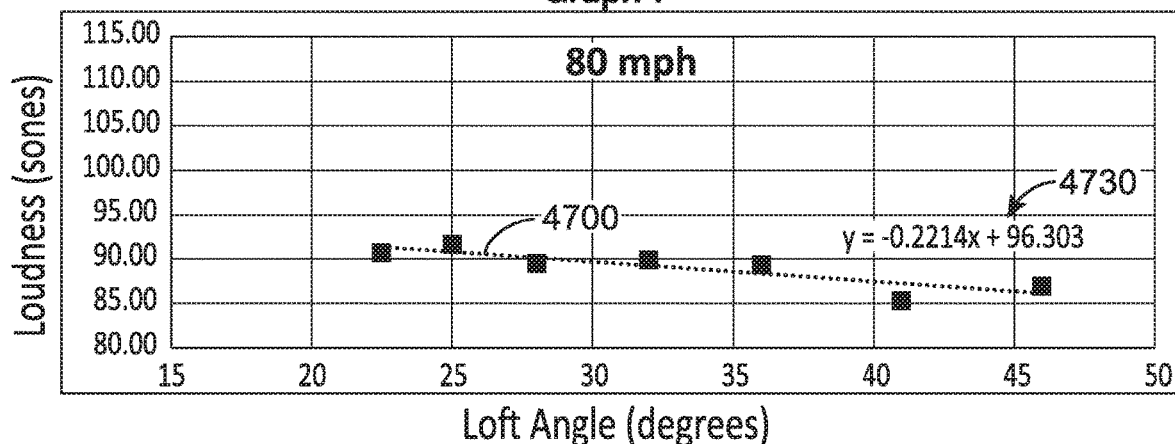
FIG. 47 illustrates a relationship between loudness and increasing loft angle at three different golf club head speeds according to another embodiment of the apparatus, methods, and articles of manufacture described herein.
Figure 47:
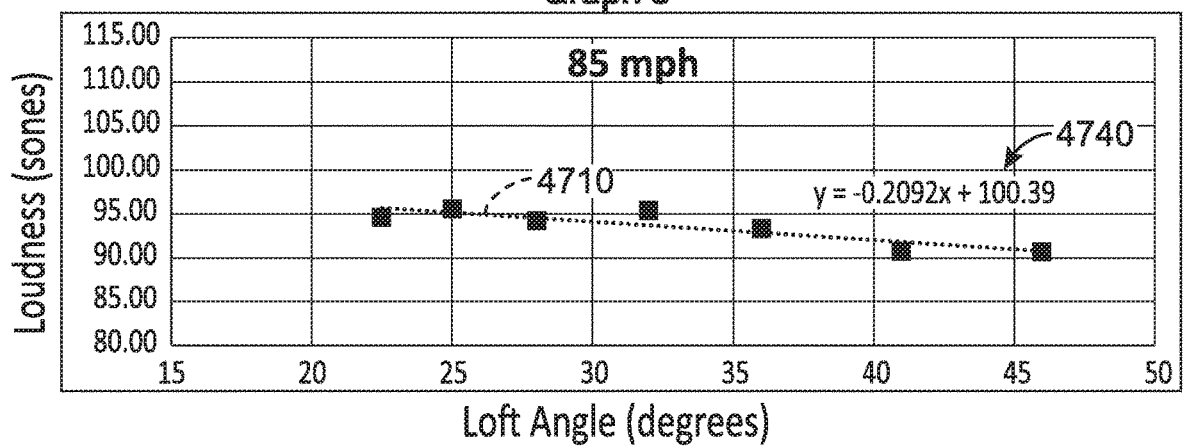
Figure 47:
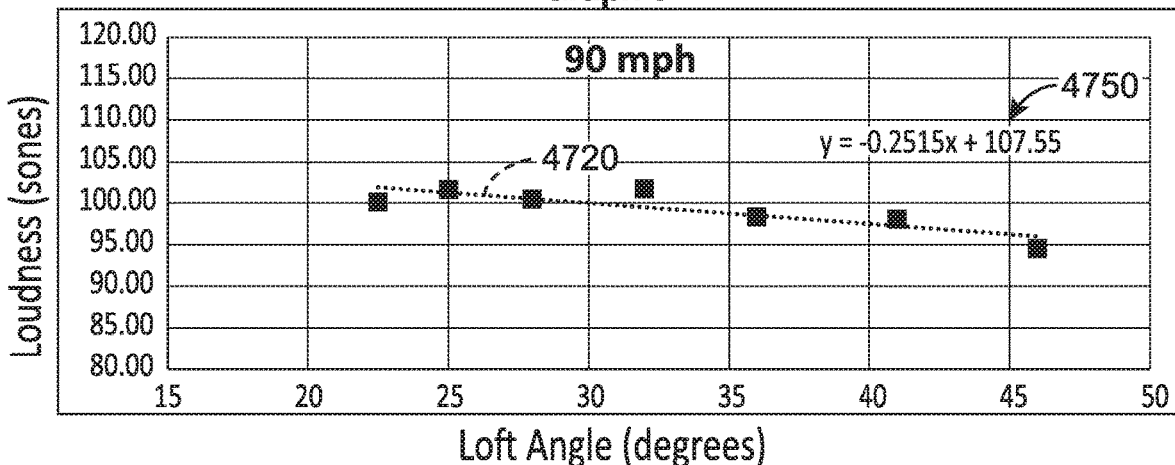

The data of Table 25 may be plotted to generate the three graphs shown in FIG. 47 as graphs 7, 8, and 9. The graphs 7, 8, and 9 illustrate a relationship between loudness (sone) and loft angle (degrees) at golf club head speeds of 80 mph, 85 mph, and 90 mph, respectively. A trendline 4700, 4710, and 4720 may be derived for each of the graphs 7, 8, and 9. The trendlines 4700, 4710, and 4720 may be define by the following corresponding equations 4730, 4740, and 4750) in slope-intercept form:

$$y=-0.2214x+96.303 \quad (4730)$$

$$y=-0.2092x+100.39 \quad (4740)$$

$$y=-0.2515x+107.55 \quad (4750)$$

Where: y is loudness in sones, and
x is the loft angle in degrees.

While the trendlines 4700, 4710, and 4720 are generally shown as linear trendlines, the trendlines 4700, 4710, and/or 4720 may be alternatively represented as other types of trendlines such as, but not limited to, logarithmic and moving average. For all three golf club head speeds of 80 mph, 85 mph, and 90 mph, the corresponding trendlines 4700, 4710, and 4720 may have negative slopes showing loudness tends to decrease with increasing loft angle, or in other words, changes in loudness may be inversely related to changes in loft angle. For example, for the golf club head speed of 80 mph, loudness may tend to decrease at a rate of 0.2214 (sones/degree loft angle) or approximately 0.2214 (sones/degree loft angle). For the golf club head speed of 85 mph, loudness may tend to decrease at a rate of 0.2092 (sones/degree loft angle) or approximately 0.2092 (sones/degree loft angle). For the golf club head speed of 90 mph, loudness may tend to decrease at a rate of 0.2515 (sones/degree loft angle) or approximately 0.2515 (sones/degree loft angle). Accordingly, with respect to the present example, the rate at which loudness decreases with increasing loft angle may be greatest for the golf club head speed of 90 mph, followed in turn by the golf club head speed of 80 mph and the golf club head speed of 85 mph. The apparatus, methods, and articles of manufacture described herein are not limited in this regard.

In another example, for a set of golf club heads according to any of the golf club heads described herein having loft angles of 45° (±2°), 40° (±2°), 35° (±2°), 31° (±2°), 27° (±2°), 24° (±2°), or 21.5° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in the following loudness (sone) for each loft angle at golf club head speeds of 80 mph, 85 mph, and 90 mph as shown in Table 26 below:

TABLE 26

| | Golf Club Head Speed | | |
|---|---|---|---|
| | 80 mph | 85 mph | 90 mph |
| Loudness (sone) for loft angle of 45° (±2°) | ≤85.99 | ≤90.68 | ≤94.48 |
| Loudness (sone) for loft angle of 40° (±2°) | ≤86.48 | ≤90.72 | ≤98.05 |
| Loudness (sone) for loft angle of 35° (±2°) | ≤90.69 | ≤93.37 | ≤98.35 |
| Loudness (sone) for loft angle of 31° (±2°) | ≤89.42 | ≤95.43 | ≤101.72 |
| Loudness (sone) for loft angle of 27° (±2°) | ≤90.34 | ≤94.18 | ≤100.50 |
| Loudness (sone) for loft angle of 24° (±2°) | ≤92.76 | ≤95.51 | ≤101.60 |
| Loudness (sone) for loft angle of 21.5° (±2°) | ≤92.47 | ≤94.63 | ≤100.14 |

Figure 48:
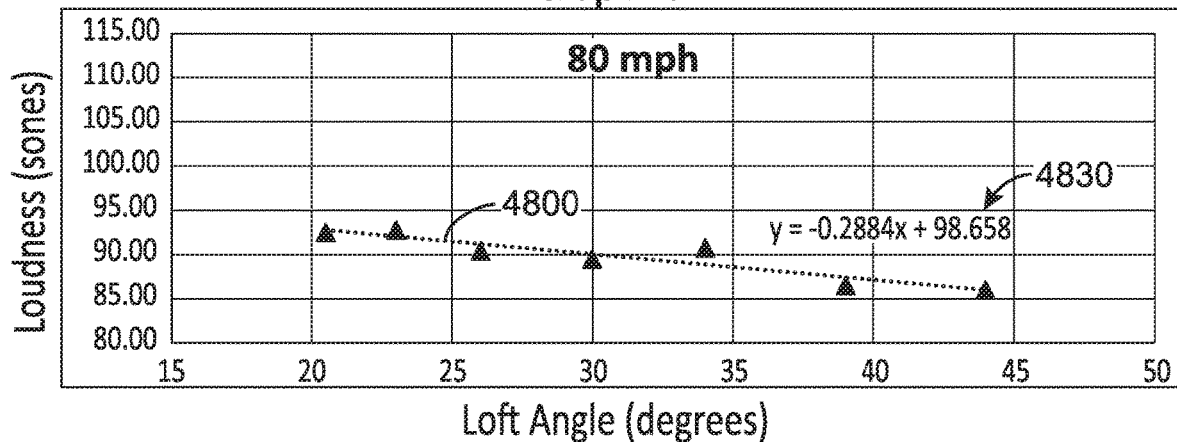
FIG. 48 illustrates a relationship between loudness and increasing loft angle at three different golf club head speeds according to another embodiment of the apparatus, methods, and articles of manufacture described herein.
Figure 48:
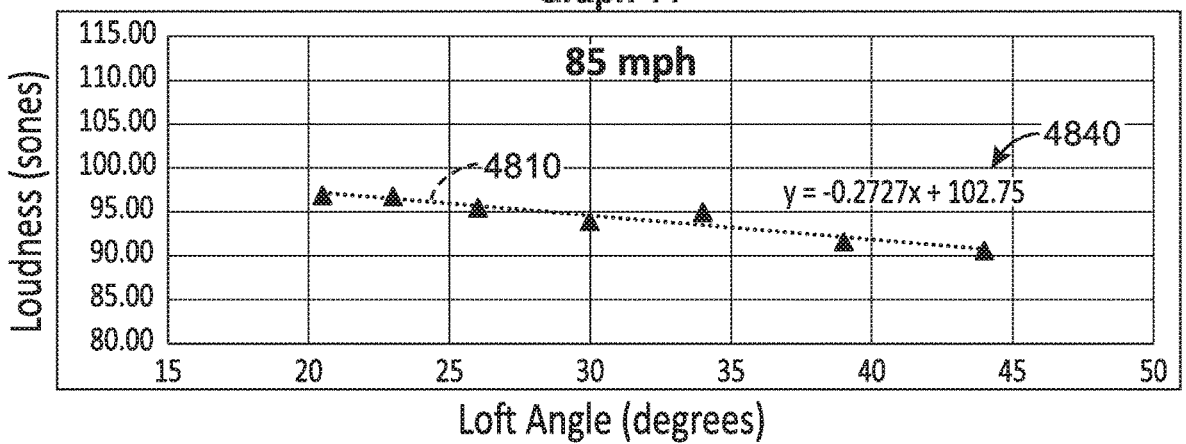
Figure 48:
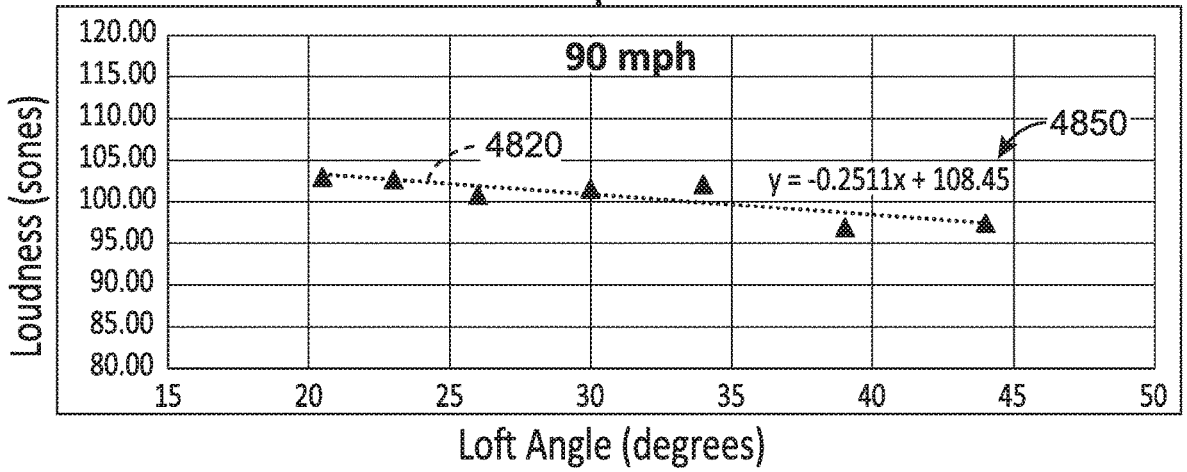

The data of Table 26 may be plotted to generate the three graphs shown in FIG. 48 as graphs 10, 11, and 12. The graphs 10, 11, and 12 illustrate a relationship between loudness (sone) and loft angle (degrees) at golf club head speeds of 80 mph, 85 mph, and 90 mph, respectively. A trendline 4800, 4810, and 4820 may be derived for each of the graphs 10, 11, and 12. The trendlines 4800, 4810, and 4820 may be defined by the following corresponding equations 4830, 4840, and 4850 in slope-intercept form:

$$y=-0.2884x+98.658 \quad (4830)$$

$$y=-0.2727x+102.75 \quad (4840)$$

$$y=-0.2511x+108.45 \quad (4850)$$

Where: y is loudness in sones, and
x is the loft angle in degrees.

While the trendlines 4800, 4810, and 4820 are generally shown as linear trendlines, the trendlines 4800, 4810, and/or 4820 may be alternatively represented as other types of trendlines such as, but not limited to, logarithmic and moving average. For all three golf club head speeds of 80 mph, 85 mph, and 90 mph, the corresponding trendlines 4800, 4810, and 4820 may have negative slopes showing loudness tends to decrease with increasing loft angle, or in other words, changes in loudness may be inversely related to changes in loft angle. For example, for the golf club head speed of 80 mph, loudness may tend to decrease at a rate of 0.2884 (sones/degree loft angle) or approximately 0.2884 (sones/degree loft angle). For the golf club head speed of 85 mph, loudness may tend to decrease at a rate of 0.2727 (sones/degree loft angle) or approximately 0.2727 (sones/degree loft angle). For the golf club head speed of 90 mph, loudness may tend to decrease at a rate of 0.2511 (sones/degree loft angle) or approximately 0.2511 (sones/degree loft angle). Accordingly, with respect to the present example, the rate at which loudness decreases with increasing loft angle may be greatest for the golf club head speed of 80 mph, followed in turn by the golf club head speed of 85 mph and the golf club head speed of 90 mph. The apparatus, methods, and articles of manufacture described herein are not limited in this regard.

In yet another example, for a set of golf club heads according to any of the golf club heads described herein having loft angles of 45° (±2°), 40° (±2°), 35° (±2°), 31° (±2°), 27° (±2°), 24° (±2°), or 21.5° (±2°), the sound pressure as described herein measured for a duration of approximately 300 milliseconds (i.e., dynamic sound pressure) with a microphone placed directly above a golf ball (i.e., approximately zero or zero horizontal distance relative to the ball) at a vertical distance of approximately 24 inches from the golf ball may result in the following loudness (sone) at each loft angle for golf club head speeds of 80 mph, 85 mph, and 90 mph as shown in Table 27 below:

TABLE 27

| | Golf Club Head Speed | | |
| --- | --- | --- | --- |
| | 80 mph | 85 mph | 90 mph |
| Loudness (sone) for loft angle of 45° (±2°) | ≤87.94 | ≤92.70 | ≤98.99 |
| Loudness (sone) for loft angle of 40° (±2°) | ≤86.04 | ≤91.46 | ≤97.61 |
| Loudness (sone) for loft angle of 35° (±2°) | ≤89.47 | ≤94.21 | ≤101.13 |
| Loudness (sone) for loft angle of 31° (±2°) | ≤86.66 | ≤91.69 | ≤97.38 |
| Loudness (sone) for loft angle of 27° (±2°) | ≤90.95 | ≤95.17 | ≤100.16 |
| Loudness (sone) for loft angle of 24° (±2°) | ≤89.17 | ≤93.93 | ≤98.84 |
| Loudness (sone) for loft angle of 21.5° (±2°) | ≤90.74 | ≤95.67 | ≤100.60 |

Figure 49:
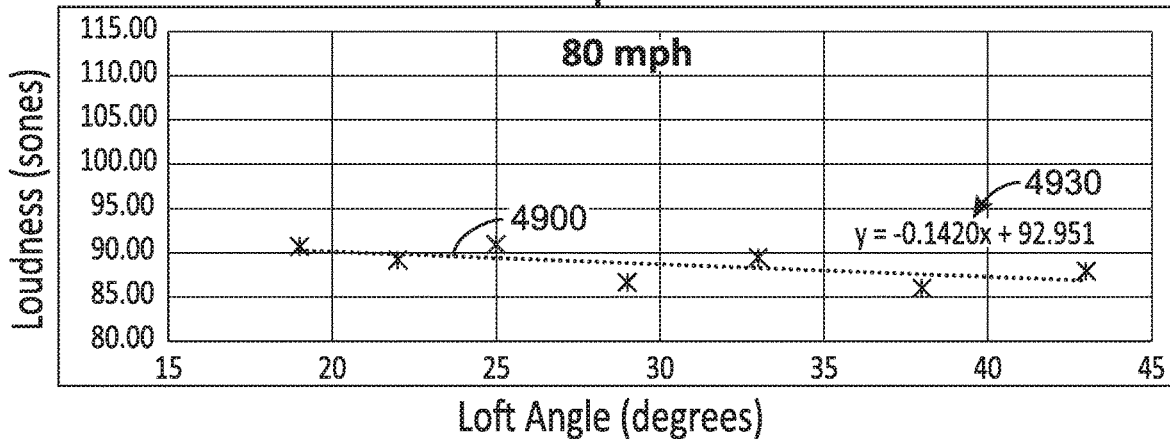
FIG. 49 illustrates a relationship between loudness and increasing loft angle at three different golf club head speeds according to yet another embodiment of the apparatus, methods, and articles of manufacture described herein.
Figure 49:
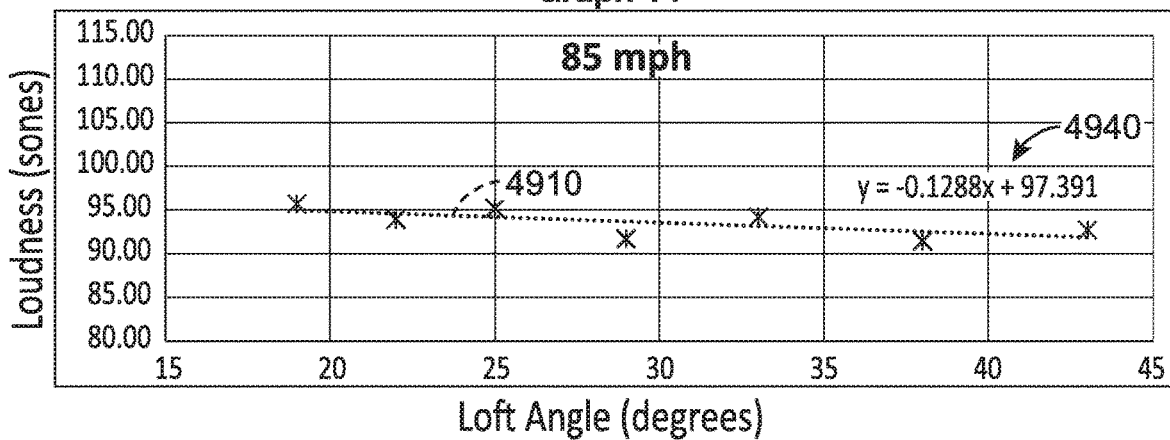
Figure 49:
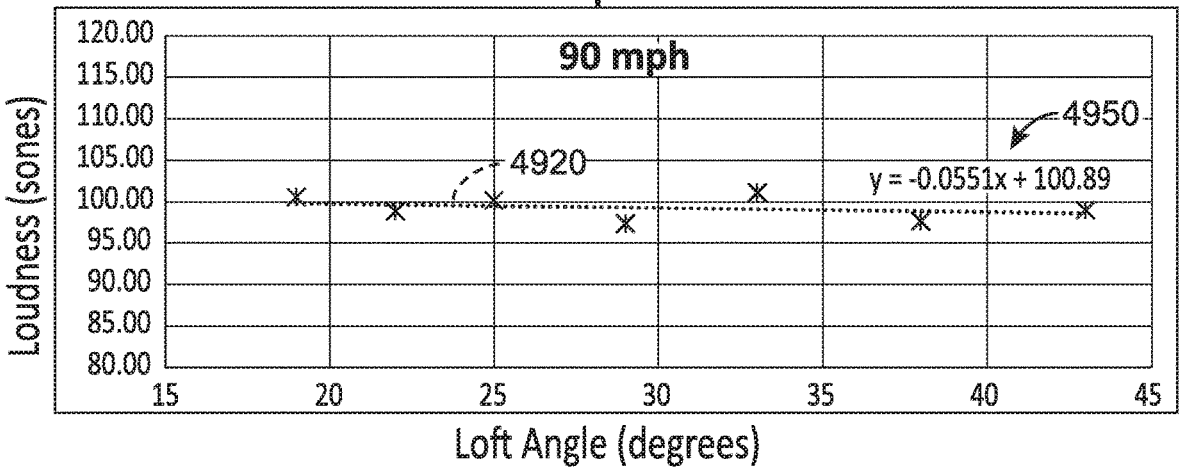

The data of Table 27 may be plotted to generate the three graphs shown in FIG. 49 as graphs 13, 14, and 15. The graphs 13, 14, and 15 illustrate a relationship between loudness (sone) and loft angle (degrees) at golf club head speeds of 80 mph, 85 mph, and 90 mph, respectively. A trendline 4900, 4910, and 4920 may be derived for each of the graphs 13, 14, and 15. The trendlines 4900, 4910, and 4920 may be defined by the following corresponding equations 4930, 4940, and 4950 slope-intercept form:

$$y=-0.1420x+92.951 \quad (4930)$$

$$y=-0.1288x+97.391 \quad (4940)$$

$$y=-0.0551x+100.89 \quad (4950)$$

Where: y is loudness in sones, and
x is the loft angle in degrees.

While the trendlines 4900, 4910, and 4920 are generally shown as linear trendlines, the trendlines 4900, 4910, and/or 4920 may be alternatively represented as other types of trendlines such as, but not limited to, logarithmic and moving average. For all three golf club head speeds of 80 mph, 85 mph, and 90 mph, the corresponding trendlines 4900, 4910, and 4920 may have negative slopes showing loudness tends to decrease with increasing loft angle, or in other words, changes in loudness may be inversely related to changes in loft angle. For example, for the golf club head speed of 80 mph, loudness may tend to decrease at a rate of 0.1420 (sones/degree loft angle) or approximately 0.1420 (sones/degree loft angle). For the golf club head speed of 85 mph, loudness may tend to decrease at a rate of 0.1288 (sones/degree loft angle) or approximately 0.1288 (sones/degree loft angle). For the golf club head speed of 90 mph, loudness may tend to decrease at a rate of 0.0551 (sones/degree loft angle) or approximately 0.0551 (sones/degree loft angle). Accordingly, with respect to the present example, the rate at which loudness decreases with increasing loft angle may be greatest for the golf club head speed of 80 mph, followed in turn by the golf club head speed of 85 mph and the golf club head speed of 90 mph. The apparatus, methods, and articles of manufacture described herein are not limited in this regard.

In the examples above, each of the loudness values in Tables 23-27 may be determined by performing the sound pressure measurement, as described herein, a certain number of times and averaging the measured loudness. In one example, each of the loudness values in Tables 23-27 may correspond to an average maximum loudness of 10 or more strikes at the indicated golf club head speed. As defined herein, "maximum loudness" may correspond to the highest loudness value measured for a given strike. Thus, the average maximum loudness of 10 or more strikes may be determined by measuring the maximum loudness for each of the 10 or more strikes and taking the average thereof. While the examples above generally indicate loudness decreasing with increasing loft angle, an alternative set of golf club heads may be configured to exhibit increasing loudness with increasing loft angle. Accordingly, for a set of golf club heads striking a golf ball at a particular golf club head speed, changes in loudness may be inversely or directly related to changes in loft angle. Depending on the golf club head speed, a relative rate of change between loudness and loft angle may vary. The apparatus, methods, and articles of manufacture described herein are not limited in this regard.

In the examples above, the data of Table 23 and corresponding FIG. 45 may be associated with a set of golf club heads each having an interior cavity partially or entirely filled with a TPE material as described herein, whereas the data of each of Tables 24-27 and corresponding FIGS. 46-49 may be associated with a set of golf club heads each having an interior cavity partially or entirely filled with a thermoset material as described herein. For a set of golf club heads with TPE material as the filler material, loudness across a range of increasing loft angles such as 21.5° or approximately 21.5° (e.g., 21.5° (±2°)) to 45° or approximately 45° (e.g., 45° (±2°)) may tend to decrease at rates of 0.4129 (sones/degree loft angle) or approximately 0.4129 (sones/degree loft angle), 0.5021 (sones/degree loft angle) or approximately 0.5021 (sones/degree loft angle), and 0.4366 (sones/degree loft angle) or approximately 0.4366 (sones/degree loft angle) at golf club head speeds of 80 mph, 85 mph, and 90 mph, respectively, as indicated in FIG. 45. In contrast, for a set of golf club heads with thermoset material as the filler material, loudness across a range of increasing loft angles such as 21.5° or approximately 21.5° (e.g., 21.5° (±2°)) to 45° or approximately 45° (e.g., 45° (±2°)) may tend to decrease at rates ranging from 0.1420-0.3427 (sones/degree loft angle) or approximately 0.1420-0.3427 (sones/degree loft angle), 0.1288-0.3914 (sones/degree loft angle) or approximately 0.1288-0.3914 (sones/degree loft angle), and 0.0551-0.3208 (sones/degree loft angle) or approximately 0.0551-0.3208 (sones/degree loft angle) at golf club head speeds of 80 mph, 85 mph, and 90 mph, respectively, as indicated in FIGS. 46-49. Accordingly, based on the data presented in Tables 23-27 and corresponding FIGS. 46-49, changes to loudness across a range of loft angles at one or more golf club head speeds may be less pronounced for a set of golf club heads using a thermoset material instead of a TPE material as the filler material. The apparatus, methods, and articles of manufacture described herein are not limited in this regard.

Although a particular order of actions may be described herein with respect to one or more processes, these actions may be performed in other temporal sequences. Further, two or more actions in any of the processes described herein may be performed sequentially, concurrently, or simultaneously.

While the above examples may describe an iron-type or a wedge-type golf club head, the apparatus, methods, and articles of manufacture described herein may be applicable to other types of golf club heads. Further, although the above examples may describe steel-based material, the apparatus, methods, and articles of manufacture described herein may be applicable to other types of metal materials, non-metal materials, or both.

A numerical range defined using the word "between" includes numerical values at both end points of the numerical range. A spatial range defined using the word "between" includes any point within the spatial range and the boundaries of the spatial range. A location expressed relative to two spaced apart or overlapping elements using the word "between" includes (i) any space between the elements, (ii) a portion of each element, and/or (iii) the boundaries of each element.

The terms "and" and "or" may have both conjunctive and disjunctive meanings. The terms "a" and "an" are defined as one or more unless this disclosure indicates otherwise. The term "coupled" and any variation thereof refer to directly or indirectly connecting two or more elements chemically, mechanically, and/or otherwise. The phrase "removably connected" is defined such that two elements that are "removably connected" may be separated from each other without breaking or destroying the utility of either element.

The term "substantially" when used to describe a characteristic, parameter, property, or value of an element may represent deviations or variations that do not diminish the characteristic, parameter, property, or value that the element may be intended to provide. Deviations or variations in a characteristic, parameter, property, or value of an element may be based on, for example, tolerances, measurement errors, measurement accuracy limitations and other factors. The term "proximate" is synonymous with terms such as "adjacent," "close," "immediate," "nearby", "neighboring", etc., and such terms may be used interchangeably as appearing in this disclosure.

The apparatus, methods, and articles of manufacture described herein may be implemented in a variety of embodiments, and the foregoing description of some of these embodiments does not necessarily represent a complete description of all possible embodiments. Instead, the description of the drawings, and the drawings themselves, disclose at least one embodiment, and may disclosure alternative embodiments.

As the rules of golf may change from time to time (e.g., new regulations may be adopted or old rules may be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

Although certain example apparatus, methods, and articles of manufacture have been described herein, the scope of coverage of this disclosure is not limited thereto. On the contrary, this disclosure covers all apparatus, methods, and articles of articles of manufacture fairly falling within the scope of the appended claims either literally or under the doctrine of equivalents.

What is claimed is:

1. A set of golf club heads comprising:
    at least two golf club heads, each of which includes a body portion having a toe portion, a heel portion, a top portion, a sole portion, a front portion, a back portion, a face portion coupled to the front portion and having a loft angle, and an interior cavity partially or entirely filled with a polymer material,
    wherein the loft angles of the golf club heads are different from each other and are in a range of 21.5° or approximately 21.5° to 45° or approximately 45°,
    wherein each of the golf club heads produces a loudness as a result of the face portion striking a golf ball at a golf club head speed,
    wherein the loudness is based on sound pressure measured for a duration of approximately 300 milliseconds with a microphone placed directly above the golf ball at a vertical distance of approximately 24 inches,
    wherein for a golf club head speed of 80 mph, the loudness tends to decrease with increasing loft angle at a rate ranging from 0.1420-0.3427 (sones/degree loft angle),
    wherein for a golf club head speed of 85 mph, the loudness tends to decrease with increasing loft angle at a rate ranging from 0.1288-0.3914 (sones/degree loft angle), and wherein for a golf club head speed of 90 mph, the loudness tends to decrease with increasing loft angle at a rate ranging from 0.0551-0.3208 (sones/degree loft angle).

2. A set of golf club heads as defined in claim 1, wherein the polymer material comprises a thermoset material.

3. A set of golf club heads as defined in claim 1, wherein for the golf club head speeds of 80 mph, 85 mph, and 90 mph, the corresponding rates at which loudness tends to decrease with increasing loft angle are each based on a relationship between an average maximum loudness for each golf club head and the loft angles of the golf club heads.

4. A set of golf club heads as defined in claim 1, wherein for the golf club head speeds of 80 mph, 85 mph, and 90 mph, the corresponding rates at which loudness tends to decrease with increasing loft angle each correspond to a slope of a trendline derived from a relationship between loudness measured for each of the golf club heads and the loft angles of the golf club heads.

5. A set of golf club heads as defined in claim 1, wherein the rate at which loudness decreases with increasing loft angle is greatest for the golf club head speed of 80 mph, followed in turn by the rate at which loudness decreases with increasing loft angle for the golf club head speed of 85 mph and the golf club head speed of 90 mph.

6. A set of golf club heads as defined in claim 1, wherein the rate at which loudness decreases with increasing loft angle is greatest for the golf club head speed of 85 mph, followed in turn by the rate at which loudness decreases with increasing loft angle for the golf club head speed of 80 mph and the golf club head speed of 90 mph.

7. A set of golf club heads as defined in claim 1, wherein the rate at which loudness decreases with increasing loft angle is greatest for the golf club head speed of 90 mph, followed in turn by the rate at which loudness decreases with increasing loft angle for the golf club head speed of 80 mph and the golf club head speed of 85 mph.

8. A set of golf club heads comprising:
a first golf club head having an interior cavity partially or entirely filled with a thermoset material, and a loft angle of 21.5° or approximately 21.5°;
a second golf club head having an interior cavity partially or entirely filled with a thermoset material, and a loft angle of 24° or approximately 24°;
a third golf club head having an interior cavity partially or entirely filled with a thermoset material, and a loft angle of 27° or approximately 27°;
a fourth golf club head having an interior cavity partially or entirely filled with a thermoset material, and a loft angle of 31° or approximately 31°;
a fifth golf club head having an interior cavity partially or entirely filled with a thermoset material, and a loft angle of 35° or approximately 35°;
a sixth golf club head having an interior cavity partially or entirely filled with a thermoset material, and a loft angle of 40° or approximately 40°; and
a seventh golf club head having an interior cavity partially or entirely filled with a thermoset material, and a loft angle of 45° or approximately 45°,
wherein each of the golf club heads produces loudness as a result of striking a golf ball at a golf club head speed,
wherein loudness is based on sound pressure measured for a duration of approximately 300 milliseconds with a microphone placed directly above the golf ball at a vertical distance of approximately 24 inches,
wherein loudness produced by the golf club heads tends to decrease with increasing loft angle for golf club head speeds of 80 mph, 85 mph, and 90 mph, and
wherein for the golf club head speed of 80 mph, loudness tends to decrease at a rate of 0.3427 (sones/degree loft angle) or approximately 0.3427 (sones/degree loft angle), wherein for the golf club head speed of 85 mph, loudness tends to decrease at a rate of 0.3914 (sones/degree loft angle) or approximately 0.3914 (sones/degree loft angle), and wherein for the golf club head speed of 90 mph, loudness tends to decrease at a rate of 0.3208 (sones/degree loft angle) or approximately 0.3208 (sones/degree loft angle).

9. A set of golf club heads as defined in claim 8, wherein for each of the golf club head speeds of 80 mph, 85 mph, and 90 mph, loudness tends to decrease with increasing loft angle at a rate that is based on a relationship between an average maximum loudness for each golf club head and the loft angles of the golf club heads.

10. A set of golf club heads comprising:
a plurality of golf club heads, each of which includes a body portion having a toe portion, a heel portion, a top portion, a sole portion, a front portion, a back portion, a face portion coupled to the front portion and having a loft angle, and an interior cavity partially or entirely filled with a thermoset material,
wherein the loft angles of the golf club heads are different from each other and are in a range of 21.5° or approximately 21.5° to 45° or approximately 45°,
wherein each of the golf club heads produces loudness as a result of the face portion striking a golf ball at a golf club head speed,
wherein loudness is based on sound pressure measured for a duration of approximately 300 milliseconds with a microphone placed directly above the golf ball at a vertical distance of approximately 24 inches,
wherein for golf club head speeds of 80 mph, 85 mph, and 90 mph, changes in loudness of the golf club heads are inversely related to changes in loft angle, and
wherein for the golf club head speed of 80 mph, loudness tends to decrease with increasing loft angle at a rate ranging from 0.1420-0.3427 (sones/degree loft angle), wherein for the golf club head speed of 85 mph, loudness tends to decrease with increasing loft angle at a rate ranging from 0.1288-0.3914 (sones/degree loft angle), and wherein for the golf club head speed of 90 mph, loudness tends to decrease with increasing loft angle at a rate ranging from 0.0551-0.3208 (sones/degree loft angle).

11. A set of golf club heads as defined in claim 10, wherein for each of the golf club head speeds of 80 mph, 85 mph, and 90 mph, a relative rate of change between loudness and loft angle corresponds to a slope of a trendline derived from a relationship between an average maximum loudness of each of the golf club heads and the loft angles of the golf club heads.

12. A set of golf club heads as defined in claim 10, wherein for each of the golf club head speeds of 80 mph, 85 mph, and 90 mph, loudness tends to decrease with increasing loft angle at a rate that is based on a relationship between an average maximum loudness for each golf club head and the loft angles of the golf club heads.

13. A set of golf club heads as defined in claim 10, wherein a relative rate of change between loudness and loft angle is greatest for the golf club head speed of 80 mph, followed in turn by the golf club head speed of 85 mph and the golf club head speed of 90 mph.

14. A set of golf club heads as defined in claim 10, wherein a relative rate of change between loudness and loft angle is greatest for the golf club head speed of 85 mph, followed in turn by the rate at which loudness decreases with increasing loft angle for the golf club head speed of 80 mph and the golf club head speed of 90 mph.

15. A set of golf club heads as defined in claim 10, wherein a relative rate of change between loudness and loft angle is greatest for the golf club head speed of 90 mph, followed in turn by the rate at which loudness decreases with increasing loft angle for the golf club head speed of 80 mph and the golf club head speed of 85 mph.

* * * * *